US012800881B2

(12) United States Patent
Chen et al.

(10) Patent No.: US 12,800,881 B2
(45) Date of Patent: Nov. 17, 2026

(54) PHOTOGRAPHING OPTICAL SYSTEM COMPRISING SIX LENSES, IMAGE CAPTURING UNIT AND ELECTRONIC DEVICE

(71) Applicant: LARGAN PRECISION CO., LTD., Taichung City (TW)

(72) Inventors: Chun-Yen Chen, Taichung City (TW); Guan-Jr Liao, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 240 days.

(21) Appl. No.: 18/823,360

(22) Filed: Sep. 3, 2024

(65) Prior Publication Data

US 2026/0029618 A1 Jan. 29, 2026

(30) Foreign Application Priority Data

Jul. 26, 2024 (TW) ................................ 113127823

(51) Int. Cl.
*G02B 13/00* (2006.01)
*G02B 1/04* (2006.01)
*G02B 9/62* (2006.01)

(52) U.S. Cl.
CPC ......... *G02B 13/0045* (2013.01); *G02B 1/041* (2013.01); *G02B 9/62* (2013.01); *G02B 13/0055* (2013.01)

(58) Field of Classification Search
CPC .................................................. G02B 13/0055
See application file for complete search history.

(56) References Cited

U.S. PATENT DOCUMENTS

| | | | | |
|---|---|---|---|---|
| 10,795,119 | B2 | 10/2020 | Chen et al. | |
| 10,928,608 | B2 | 2/2021 | Hsueh et al. | |
| 2013/0286484 | A1 | 10/2013 | Baba | |
| 2020/0150391 | A1* | 5/2020 | Hsueh | G02B 9/62 |
| 2021/0109326 | A1 | 4/2021 | Jia et al. | |
| 2021/0389557 | A1 | 12/2021 | Zou et al. | |

(Continued)

FOREIGN PATENT DOCUMENTS

| | | |
|---|---|---|
| CN | 111025579 A | 4/2020 |
| CN | 210775999 U | 6/2020 |

(Continued)

OTHER PUBLICATIONS

TW Office Action dated May 5, 2025 as received in Application No. 113127823.

*Primary Examiner* — Paul C Lee
(74) *Attorney, Agent, or Firm* — Maschoff Brennan

(57) ABSTRACT

A photographing optical system includes six lens elements which are, in order from an object side to an image side along an optical path: a first lens element, a second lens element, a third lens element, a fourth lens element, a fifth lens element and a sixth lens element. The first lens element with negative refractive power has an object-side surface being concave in a paraxial region thereof and having at least one inflection point. The third lens element with negative refractive power has an object-side surface being concave in a paraxial region thereof. The fifth lens element has positive refractive power. The sixth lens element has an object-side surface being convex in a paraxial region thereof and an image-side surface being concave in a paraxial region thereof.

24 Claims, 38 Drawing Sheets

(56) References Cited

U.S. PATENT DOCUMENTS

| | | | | |
|---|---|---|---|---|
| 2022/0187574 | A1* | 6/2022 | Yamazaki ................ | G02B 9/62 |
| 2022/0187575 | A1* | 6/2022 | Oinuma ............. | G02B 13/0045 |
| 2022/0187576 | A1* | 6/2022 | Sakaguchi ............. | G02B 13/06 |
| 2023/0078816 | A1 | 3/2023 | Zhuang et al. | |

FOREIGN PATENT DOCUMENTS

| | | | |
|---|---|---|---|
| CN | 111913278 | A | 11/2020 |
| CN | 111983784 | A | 11/2020 |
| CN | 212540839 | U | 2/2021 |
| CN | 112684584 | A | 4/2021 |
| CN | 112799214 | A | 5/2021 |
| CN | 114063245 | A | 2/2022 |
| CN | 219143185 | U | 6/2023 |
| CN | 116400483 | A | 7/2023 |
| CN | 219552749 | U | 8/2023 |
| CN | 117784369 | A | 3/2024 |
| JP | 2014-010399 | A | 1/2014 |
| TW | 202018361 | A | 5/2020 |
| TW | I816248 | B | 9/2023 |

* cited by examiner

PHOTOGRAPHING OPTICAL SYSTEM COMPRISING SIX LENSES, IMAGE CAPTURING UNIT AND ELECTRONIC DEVICE

RELATED APPLICATIONS

This application claims priority to Taiwan Application 113127823, filed on Jul. 26, 2024, which is incorporated by reference herein in its entirety.

BACKGROUND

Technical Field

The present disclosure relates to a photographing optical system, an image capturing unit and an electronic device, more particularly to a photographing optical system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing optical system includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

Preferably, the first lens element has negative refractive power. Preferably, the object-side surface of the first lens element is concave in a paraxial region thereof. Preferably, the object-side surface of the first lens element has at least one inflection point. Preferably, the third lens element has negative refractive power. Preferably, the object-side surface of the third lens element is concave in a paraxial region thereof. Preferably, the fifth lens element has positive refractive power. Preferably, the object-side surface of the sixth lens element is convex in a paraxial region thereof. Preferably, the image-side surface of the sixth lens element is concave in a paraxial region thereof. Preferably, the photographing optical system further includes an aperture stop.

A curvature radius of the image-side surface of the fourth lens element is R8, and a curvature radius of the object-side surface of the fifth lens element is R9; with a wavelength of helium d-line as a reference wavelength for the photographing optical system, a focal length of the photographing optical system is fd, a focal length of the third lens element is f3d, a focal length of the fifth lens element is f5d, and an axial distance between the aperture stop and an image surface is SLd; and the following conditions are preferably satisfied:

$$1.00 < |R8/R9| < 5.00;$$

$$0.20 < |f3d/f5d| < 7.00; \text{ and}$$

$$2.80 < SLd/fd < 4.50.$$

According to another aspect of the present disclosure, a photographing optical system includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

Preferably, the first lens element has negative refractive power. Preferably, the object-side surface of the first lens element is concave in a paraxial region thereof. Preferably, the object-side surface of the first lens element has at least one inflection point. Preferably, the third lens element has negative refractive power. Preferably, the object-side surface of the third lens element is concave in a paraxial region thereof. Preferably, the fifth lens element has positive refractive power. Preferably, the object-side surface of the sixth lens element is convex in a paraxial region thereof. Preferably, the image-side surface of the sixth lens element is concave in a paraxial region thereof.

A curvature radius of the image-side surface of the fourth lens element is R8, a curvature radius of the object-side surface of the fifth lens element is R9, an axial distance between the object-side surface of the first lens element and the image-side surface of the sixth lens element is TD, a central thickness of the second lens element is CT2, and a central thickness of the fourth lens element is CT4; with a wavelength of helium d-line as a reference wavelength for the photographing optical system, a focal length of the photographing optical system is fd, a focal length of the third lens element is f3d, and a focal length of the fifth lens element is f5d; and the following conditions are preferably satisfied:

$$1.00 < |R8/R9| < 5.00;$$

$$0.20 < |f3d/f5d| < 7.00;$$

$$2.80 < TD/fd < 4.50; \text{ and}$$

$$0.80 < CT4/CT2 < 5.00.$$

According to another aspect of the present disclosure, an image capturing unit includes one of the aforementioned photographing optical systems and an image sensor, wherein the image sensor is disposed on the image surface of the photographing optical system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical system includes six lens elements. The six lens elements are, in order from an object side to an image side along an optical path, a first lens element, a second lens element, a third lens element, a fourth lens element, a fifth lens element and a sixth lens element. Each of the six lens elements of the photographing optical system has an object-side surface facing toward the object side and an image-side surface facing toward the image side.

The first lens element can have negative refractive power. Therefore, it is favorable for increasing the field of view of the photographing optical system. The object-side surface of the first lens element can be concave in a paraxial region thereof. Therefore, it is favorable for adjusting the refractive power of the first lens element.

The second lens element can have positive refractive power. Therefore, it is favorable for correcting spherical aberration.

The third lens element can have negative refractive power. Therefore, it is favorable for correcting chromatic aberration. The object-side surface of the third lens element can be concave in a paraxial region thereof. Therefore, it is favorable for adjusting the surface shape and refractive power of the third lens element to correct chromatic aberration.

The fifth lens element can have positive refractive power. Therefore, it is favorable for reducing the size of the image-side end of the photographing optical system. The object-side surface of the fifth lens element can be convex in a paraxial region thereof. Therefore, it is favorable for adjusting the surface shape of the fifth lens element to enhance its positive refractive power.

The object-side surface of the sixth lens element can be convex in a paraxial region thereof. Therefore, it is favorable for reducing field curvature and reducing the back focal length. The image-side surface of the sixth lens element can be concave in a paraxial region thereof. Therefore, it is favorable for reducing the back focal length.

Figure 35:
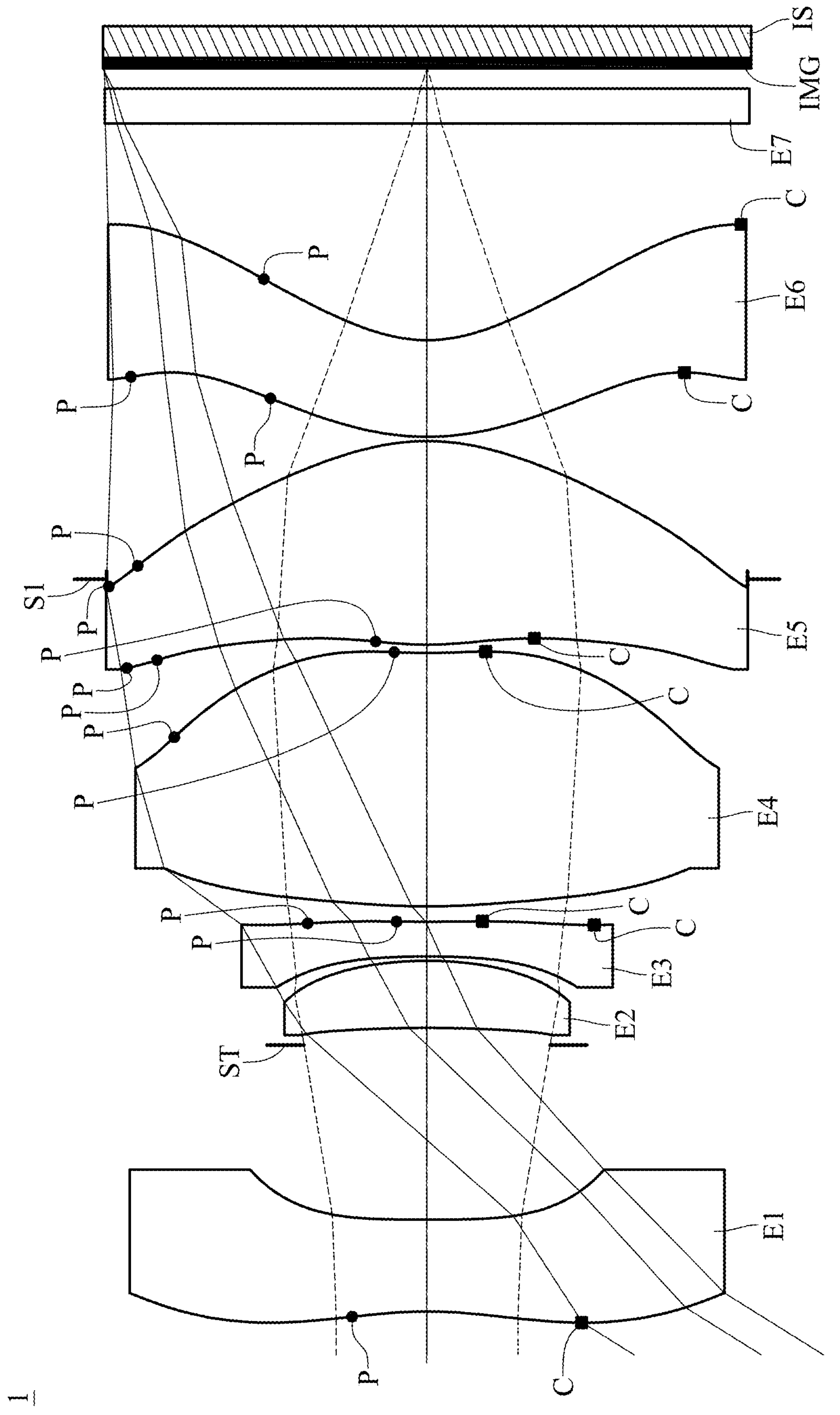
FIG. 35 shows a schematic view of inflection points on lens surfaces and critical points on lens surfaces according to the 1st embodiment of the present disclosure.

The object-side surface of the first lens element can have at least one inflection point. Therefore, it is favorable for preventing the effective diameter of the first lens element from being too large, thereby controlling the size of the photographing optical system. Please refer to FIG. 35, which shows a schematic view of inflection points P on the lens surfaces according to the 1st embodiment of the present disclosure. In FIG. 35, the object-side surface of the first lens element E1 and the image-side surface of the sixth lens element E6 each have one inflection point P, the image-side surface of the third lens element E3, the image-side surface of the fourth lens element E4, the image-side surface of the fifth lens element E5 and the object-side surface of the sixth lens element E6 each have two inflection points P, and the object-side surface of the fifth lens element E5 has three inflection points P. The 1st embodiment of the present disclosure shown in FIG. 35 is only exemplary. Each of the lens elements in various embodiments of the present disclosure can have one or more inflection points.

The object-side surface of the first lens element can have at least one critical point in an off-axis region thereof. Therefore, it is favorable for adjusting the angle at which wide-angle light enters the photographing optical system to enhance the illuminance and image quality at the periphery of the image surface. Please refer to FIG. 35, which shows a schematic view of critical points C on the lens surfaces according to the 1st embodiment of the present disclosure. In FIG. 35, the object-side surface of the first lens element E1, the image-side surface of the fourth lens element E4, the object-side surface of the fifth lens element E5 and the object-side surface and the image-side surface of the sixth lens element E6 each have one critical point C in an off-axis region thereof, and the image-side surface of the third lens element E3 has two critical points C in an off-axis region thereof. The 1st embodiment of the present disclosure shown in FIG. 35 is only exemplary. Each of the lens elements in various embodiments of the present disclosure can have one or more critical points in an off-axis region thereof.

According to the present disclosure, an axial distance between the first lens element and the second lens element can be a maximum among axial distances between each of all adjacent lens elements of the photographing optical system. Therefore, it is favorable for enhancing the light-gathering capability of the photographing optical system and reducing the assembly difficulty of the photographing optical system.

According to the present disclosure, some optical parameters can be measured at a wavelength of helium d-line (587.6 nm) by using the wavelength of helium d-line as a reference wavelength for the photographing optical system. More specifically, the photographing optical system of the present disclosure is applicable within a wide range of wavelength of light, for example, within a wavelength of light from 780 nm to 1200 nm. However, during the design of the photographing optical system of the present disclosure, one or more optical parameters of the photographing optical system may be determined or measured by using an incident light source having the wavelength of helium d-line.

When a curvature radius of the image-side surface of the fourth lens element is R8, and a curvature radius of the object-side surface of the fifth lens element is R9, the following condition can be satisfied: $1.00<|R8/R9|<5.00$. Therefore, it is favorable for the image-side surface of the fourth lens element to be coordinated in surface shape with the object-side surface of the fifth lens element to adjust the light path. Moreover, the following condition can also be satisfied: $1.20<|R8/R9|<3.50$. Moreover, the following condition can also be satisfied: $1.54\leq|R8/R9|\leq2.23$.

With a wavelength of helium d-line as a reference wavelength for the photographing optical system, a focal length of the third lens element is f3d, and a focal length of the fifth lens element is f5d, and the following condition can be satisfied: $0.20<|f3d/f5d|<7.00$. Therefore, it is favorable for balancing the distribution of refractive power and correcting aberrations. Moreover, the following condition can also be satisfied: $0.70<|f3d/f5d|<6.00$. Moreover, the following condition can also be satisfied: $1.00<|f3d/f5d|<5.00$. Moreover, the following condition can also be satisfied: $1.24\leq|f3d/f5d|\leq4.25$. In the present disclosure, when parameters (e.g., f3d and f5d) of the photographing optical system are defined with a wavelength of helium d-line as a reference wavelength, these parameters are measured at the wavelength of helium d-line as a reference wavelength.

According to the present disclosure, the photographing optical system can further include an aperture stop. With the wavelength of helium d-line as the reference wavelength for the photographing optical system, an axial distance between the aperture stop and the image surface is SLd, and a focal length of the photographing optical system is fd, and the following condition can be satisfied: $2.80<SLd/fd<4.50$. Therefore, it is favorable for controlling the incident angle of light on the image surface, thereby enhancing the illuminance of the peripheral field of view in the photographing optical system. Moreover, the following condition can also be satisfied: $3.00<SLd/fd<4.00$. Moreover, the following condition can also be satisfied: $3.29\leq SLd/fd\leq3.89$.

An axial distance between the object-side surface of the first lens element and the image-side surface of the sixth lens element is TD; with the wavelength of helium d-line as the reference wavelength for the photographing optical system, the focal length of the photographing optical system is fd, and the following condition can be satisfied: $2.50<TD/fd<4.50$. Therefore, it is favorable for balancing the total track length and field of view of the photographing optical system for providing wide-angle characteristics. Moreover, the following condition can also be satisfied: $3.00<TD/fd<4.30$. Moreover, the following condition can also be satisfied: $3.35\leq TD/fd\leq4.04$.

When a central thickness of the second lens element is CT2, and a central thickness of the fourth lens element is CT4, the following condition can be satisfied: $0.80<CT4/CT2<5.00$. Therefore, it is favorable for lens molding and improving yield. Moreover, the following condition can also be satisfied: $0.90<CT4/CT2<4.50$. Moreover, the following condition can also be satisfied: $1.00<CT4/CT2<4.00$. Moreover, the following condition can also be satisfied: $0.98\leq CT4/CT2\leq3.78$.

When an f-number of the photographing optical system is Fno, the following condition can be satisfied: $Fno\leq1.90$. Therefore, it is favorable for adjusting the size of aperture stop to increase the light incident amount of the photographing optical system, thereby enhancing the illuminance of the peripheral field of view. Moreover, the following condition can also be satisfied: $Fno\leq1.80$.

With the wavelength of helium d-line as the reference wavelength for the photographing optical system, a maximum field of view of the photographing optical system is FOVd, and the following condition can be satisfied: 90.0 degrees<FOVd<150.0 degrees. Therefore, it is favorable for the photographing optical system to achieve a larger field of view and increase the image capture range. Moreover, the following condition can also be satisfied: 100.0 degrees<FOVd<140.0 degrees.

A maximum image height of the photographing optical system (which can be half of a diagonal length of an effective photosensitive area of an image sensor) is ImgH; with the wavelength of helium d-line as the reference wavelength for the photographing optical system, an axial distance between the object-side surface of the first lens element and the image surface is TLd, and the following condition can be satisfied: $2.50<TLd/ImgH<4.50$. Therefore, it is favorable for achieving a balance between reducing the total track length of the photographing optical system and increasing the size of the image surface. Moreover, the following condition can also be satisfied: $3.00<TLd/ImgH<4.30$. Said axial distance between the object-side surface of the first lens element and the image surface is can refer to the total track length of the photographing optical system.

With the wavelength of helium d-line as the reference wavelength for the photographing optical system, the focal length of the photographing optical system is fd, and a focal length of the fourth lens element is f4d, and the following condition can be satisfied: $-0.70<fd/f4d<0.60$. Therefore, it is favorable for controlling the refractive power of the fourth lens element to adjust the refractive power distribution of the photographing optical system and to control the size of the photographing optical system. Moreover, the following condition can also be satisfied: $-0.50<fd/f4d<0.40$.

With the wavelength of helium d-line as the reference wavelength for the photographing optical system, the axial distance between the aperture stop and the image surface is SLd, and the axial distance between the object-side surface of the first lens element and the image surface is TLd, and the following condition can be satisfied: $0.60<SLd/TLd<0.90$. Therefore, it is favorable for effectively balancing the position of the aperture stop to control the size and field of view of the photographing optical system. Moreover, the following condition can also be satisfied:

$$0.65<SLd/TLd<0.88.$$

The maximum image height of the photographing optical system is ImgH; with the wavelength of helium d-line as the reference wavelength for the photographing optical system, an axial distance between the image-side surface of the sixth lens element and the image surface is BLd, and the following condition can be satisfied: $0.50<BLd/ImgH<1.00$. Therefore, it is favorable for reducing the back focal length of the photographing optical system and controlling the total track length of the photographing optical system. Said axial distance between the image-side surface of the sixth lens element and the image surface can refer to the back focal length of the photographing optical system.

When the central thickness of the second lens element is CT2, a central thickness of the third lens element is CT3, and the central thickness of the fourth lens element is CT4, the following condition can be satisfied: $0.15<(CT2+CT3)/CT4<2.00$. Therefore, it is favorable for preventing excessively thin second and third lens elements to increase the assembly yield of the photographing optical system. Moreover, the following condition can also be satisfied: $0.30<(CT2+CT3)/CT4<1.50$.

When a curvature radius of the object-side surface of the second lens element is R3, and the curvature radius of the image-side surface of the fourth lens element is R8, the following condition can be satisfied: $0.00<|R8/R3|<1.50$. Therefore, it is favorable for adjusting the ratio of the curvature radius of the image-side surface of the fourth lens element to the curvature radius of the object-side surface of the second lens element, thereby controlling the light path and correcting aberrations. Moreover, the following condition can also be satisfied: $0.00<|R8/R3|<1.20$. Moreover, the following condition can also be satisfied: $0.02<|R8/R3|<1.00$.

With the wavelength of helium d-line as the reference wavelength for the photographing optical system, an Abbe number of the fifth lens element is Vd5, and a refractive index of the fifth lens element is Nd5, and the following condition can be satisfied: $20.0<Vd5/Nd5<45.0$. Therefore, it is favorable for adjusting the configuration of the material of the lens element. According to the present disclosure, the Abbe number Vd of one lens element is obtained from the following equation: $Vd=(Nd-1)/(NF-NC)$, wherein Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm). The refractive index of one lens element is measured at the wavelength of helium d-line as a reference wavelength.

Figure 34:
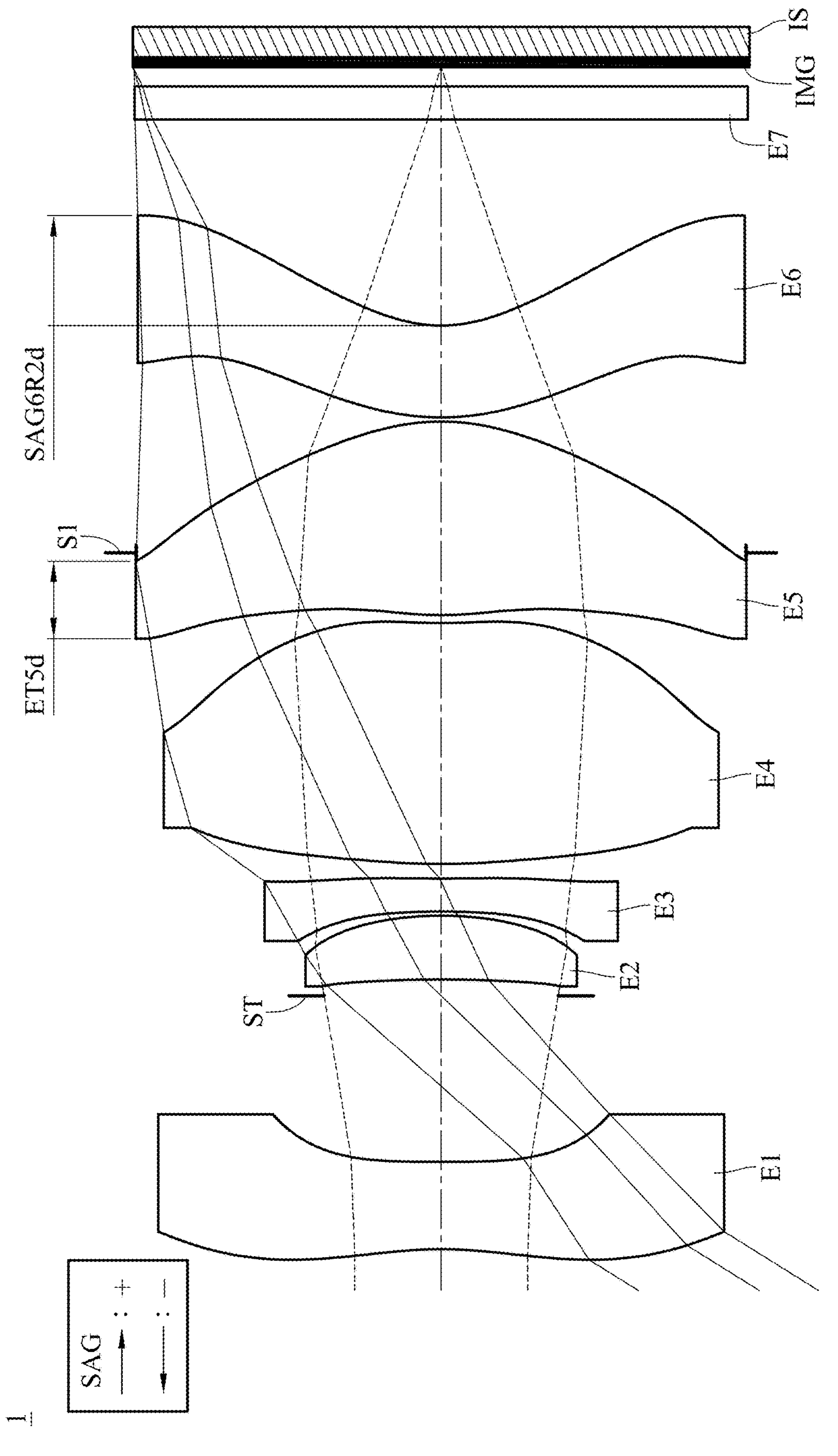
FIG. 34 shows a schematic view of ET5d and SAG6R2d according to the 1st embodiment of the present disclosure.

A central thickness of the sixth lens element is CT6; with the wavelength of helium d-line as the reference wavelength for the photographing optical system, a displacement in parallel with an optical axis from an axial vertex of the image-side surface of the sixth lens element to a maximum effective radius position of the image-side surface of the sixth lens element is SAG6R2d, and the following condition can be satisfied: $0.65<SAG6R2d/CT6<2.00$. Therefore, it is favorable for adjusting the curvature of the peripheral shape of the image-side surface of the sixth lens element to enhance the illuminance of the photographing optical system. Please refer to FIG. 34, which shows a schematic view of SAG6R2d according to the 1st embodiment of the present disclosure. When the direction from the axial vertex of one surface to the maximum effective radius position of the same surface is facing towards the image side of the photographing optical system, the value of displacement is positive; when the direction from the axial vertex of the surface to the maximum effective radius position of the same surface is facing towards the object side of the photographing optical system, the value of displacement is negative.

A central thickness of the fifth lens element is CT5; with the wavelength of helium d-line as the reference wavelength for the photographing optical system, a distance in parallel with the optical axis between a maximum effective radius position of the object-side surface of the fifth lens element and a maximum effective radius position of the image-side surface of the fifth lens element is ET5d, and the following condition can be satisfied: $0.30<ET5d/CT5<0.55$. Therefore, it is favorable for adjusting the ratio of the edge thickness to the central thickness of the fifth lens element to ensure that the edge thickness of the fifth lens element is not too thin, thereby reducing the difficulty of manufacturing the fifth lens element. Please refer to FIG. 34, which shows a schematic view of ET5d according to the 1st embodiment of the present disclosure.

When a curvature radius of the object-side surface of the third lens element is R5, and a curvature radius of the image-side surface of the third lens element is R6, the following condition can be satisfied: $-8.00<(R5+R6)/(R5-R6)<0.80$. Therefore, it is favorable for adjusting the surface shape and refractive power of the third lens element and enhancing the light-gathering quality at the center and adjacent fields of view. Moreover, the following condition can also be satisfied: $-5.00<(R5+R6)/(R5-R6)<0.60$.

When a curvature radius of the image-side surface of the first lens element is R2, and the curvature radius of the object-side surface of the fifth lens element is R9, the following condition can be satisfied: $0.00<|R9/R2|<1.00$. Therefore, it is favorable for improving the capability to control the refractive power of the fifth lens element. Moreover, the following condition can also be satisfied: $0.02<|R9/R2|<0.80$. Moreover, the following condition can also be satisfied: $0.05<|R9/R2|<0.60$.

With the wavelength of helium d-line as the reference wavelength for the photographing optical system, an Abbe number of the sixth lens element is Vd6, and a refractive index of the sixth lens element is Nd6, and the following condition can be satisfied: $5.0<Vd6/Nd6<20.0$. Therefore, it is favorable for restricting the choice of materials for the sixth lens element to adjust the incident angle on the image surface.

When a sum of central thicknesses of all lens elements of the photographing optical system is ΣCT, and the axial distance between the object-side surface of the first lens element and the image-side surface of the sixth lens element is TD, the following condition can be satisfied: $0.65<\Sigma CT/TD<0.90$. Therefore, it is favorable for increasing the spatial utilization efficiency of the photographing optical system. Moreover, the following condition can also be satisfied: $0.70<\Sigma CT/TD<0.85$.

According to the present disclosure, if the parameters of the photographing optical system, the image capturing unit and the electronic device are not specifically defined for a reference wavelength, the parameters may be determined based on the reference wavelength of the system.

According to the present disclosure, the aforementioned features and conditions can be utilized in numerous combinations so as to achieve corresponding effects.

According to the present disclosure, the lens elements of the photographing optical system can be made of either glass or plastic material. When the lens elements are made of glass material, the refractive power distribution of the photographing optical system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing optical system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing optical system, based on the corresponding image sensor, can be flat or curved, especially a curved surface being concave facing towards the object side of the photographing optical system.

According to the present disclosure, an image correction unit, such as a field flattener, can be optionally disposed between the lens element closest to the image side of the photographing optical system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 36:
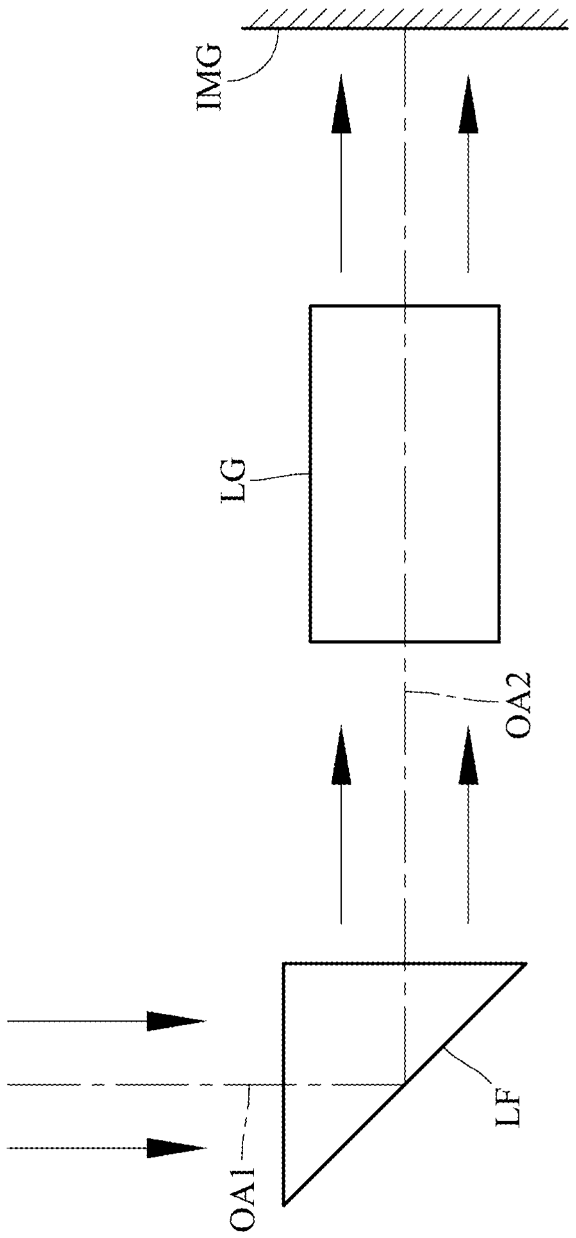
FIG. 36 shows a schematic view of a configuration of one light-folding element in a photographing optical system according to one embodiment of the present disclosure.
Figure 37:
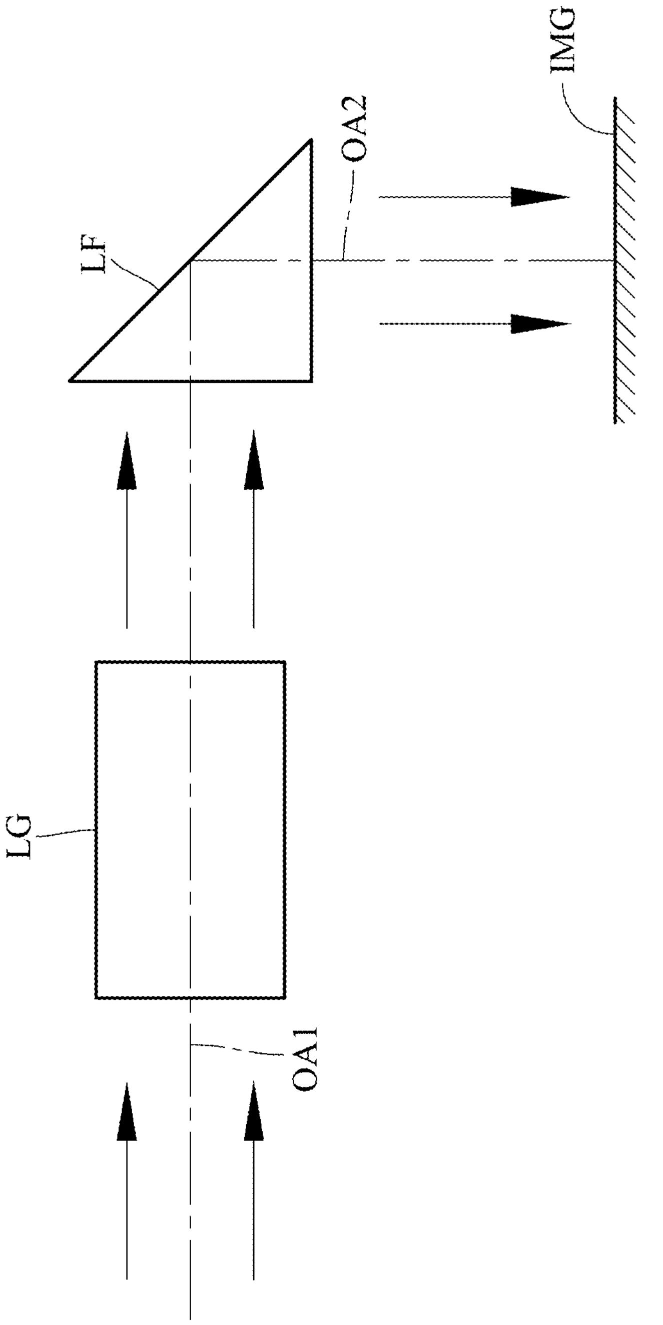
FIG. 37 shows a schematic view of another configuration of one light-folding element in a photographing optical system according to one embodiment of the present disclosure.
Figure 38:
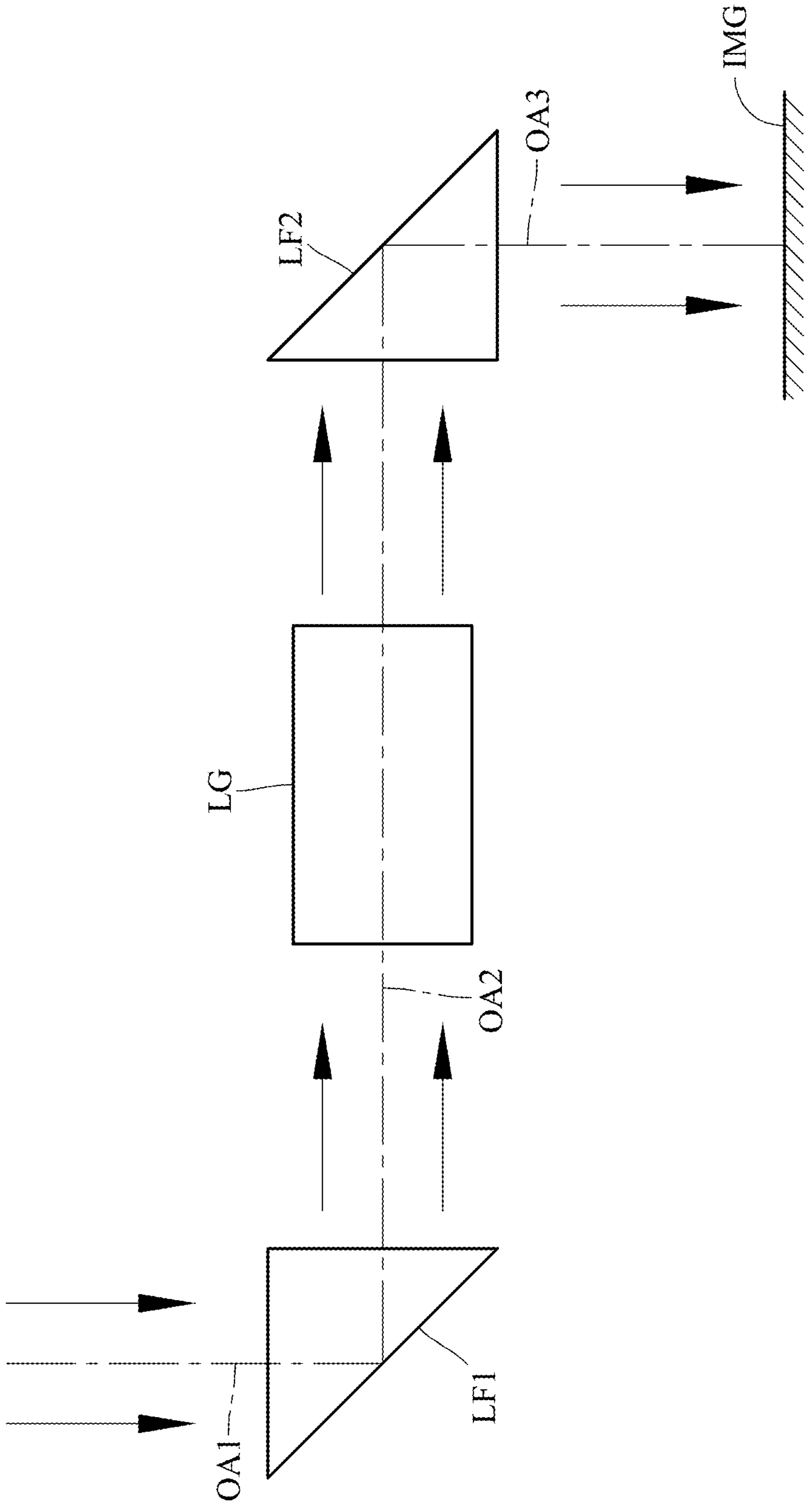
FIG. 38 shows a schematic view of a configuration of two light-folding elements in a photographing optical system according to one embodiment of the present disclosure.

According to the present disclosure, at least one light-folding element, such as a prism or a mirror, can be optionally provided between an imaged object and the image surface on the imaging optical path, and the surface shape of the prism or mirror can be planar, spherical, aspheric or freeform surface, such that the photographing optical system can be more flexible in space arrangement, and therefore the dimensions of an electronic device is not restricted by the total track length of the photographing optical system. Specifically, please refer to FIG. 36 and FIG. 37. FIG. 36 shows a schematic view of a configuration of one light-folding element in a photographing optical system according to one embodiment of the present disclosure, and FIG. 37 shows a schematic view of another configuration of one light-folding element in a photographing optical system according to one embodiment of the present disclosure. In FIG. 36 and FIG. 37, the photographing optical system can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the photographing optical system as shown in FIG. 36, or disposed between a lens group LG and the image surface IMG of the photographing optical system as shown in FIG. 37. Furthermore, please refer to FIG. 38, which shows a schematic view of a configuration of two light-folding elements in a photographing optical system according to one embodiment of the present disclosure. In FIG. 38, the photographing optical system can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the photographing optical system, the second light-folding element LF2 is disposed between the lens group LG and the image surface IMG of the photographing optical system, and the travelling direction of light on the first optical axis OA1 can be the same direction as the travelling direction of light on the third optical axis OA3 as shown in FIG. 38. The photographing optical system can be optionally provided with three or more light-folding elements, and the present disclosure is not limited to the type, amount and position of the light-folding elements of the embodiments disclosed in the aforementioned figures.

According to the present disclosure, the photographing optical system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. Afront stop disposed between an imaged object and the first lens element can provide a longer distance between an exit pupil of the photographing optical system and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical system and thereby provides a wider field of view for the same.

According to the present disclosure, the photographing optical system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the photographing optical system can include one or more optical elements for limiting the form of light passing through the photographing optical system. Each optical element can be, but not limited to, a filter, a polarizer, etc., and each optical element can be, but not limited to, a single-piece element, a composite component, a thin film, etc. The optical element can be located at the object side or the image side of the photographing optical system or between any two adjacent lens elements so as to allow light in a specific form to pass through, thereby meeting application requirements.

According to the present disclosure, the photographing optical system can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element (e.g., a reflective element), a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is deflected by a light-folding element, the axial optical data are also calculated along the deflected optical axis.

According to the above description of the present disclosure, the following specific embodiments are provided for further explanation.

1st Embodiment

Figure 1:
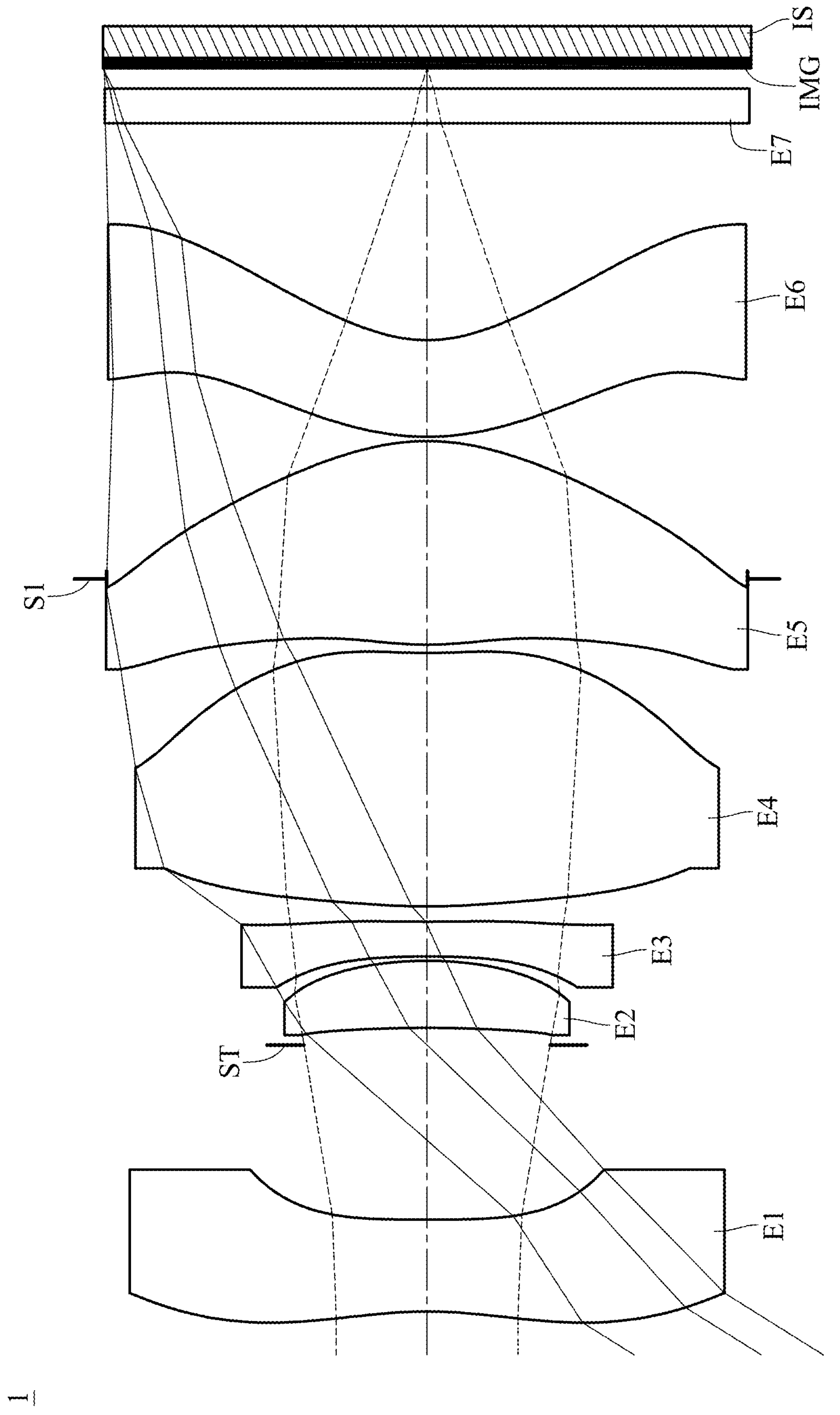
FIG. 1 is a schematic view of an image capturing unit according to the 1st embodiment of the present disclosure.
Figure 2:
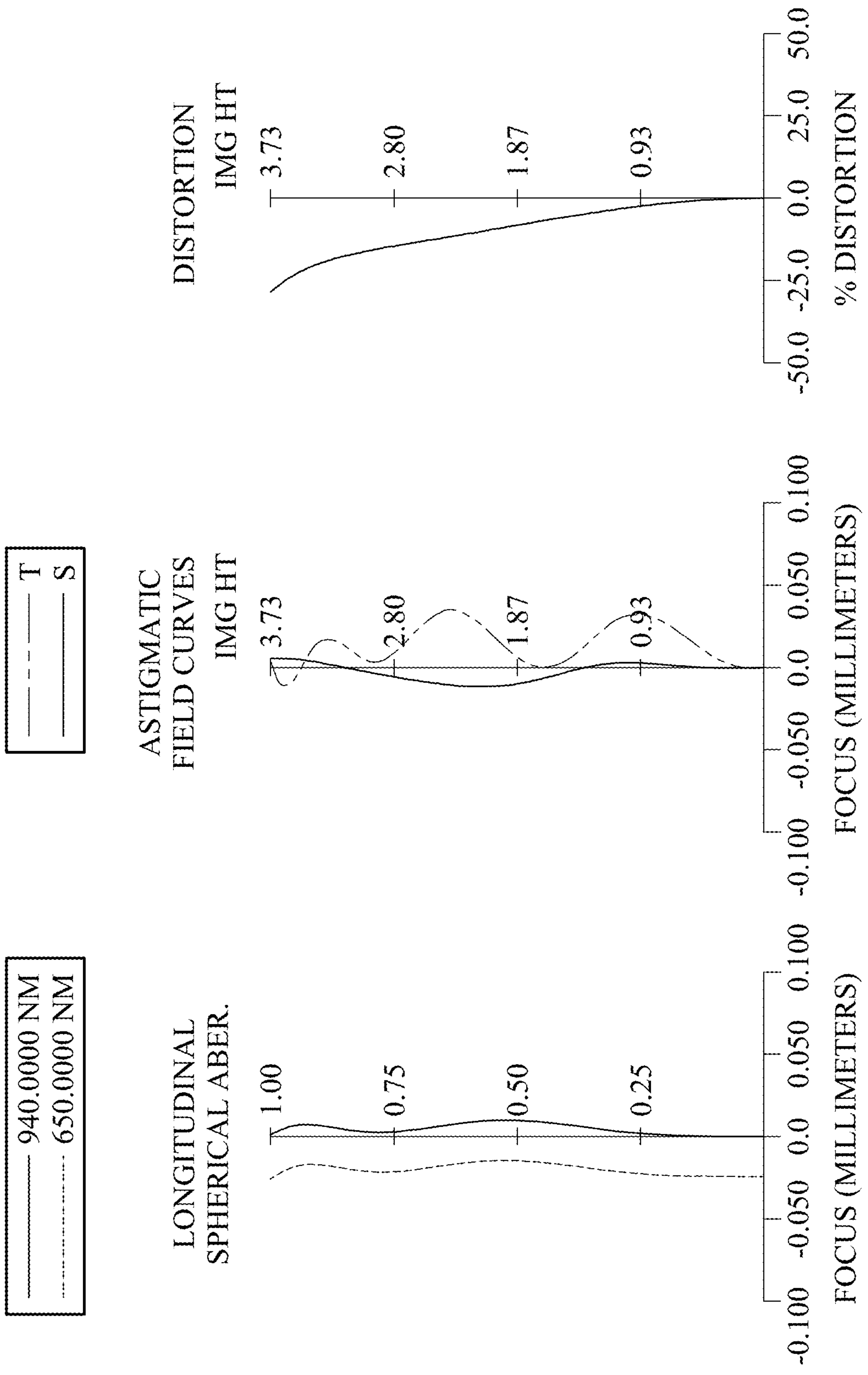
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The image-side surface of the third lens element E3 has two inflection points. The image-side surface of the third lens element E3 has two critical points in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has two inflection points. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system. That is, the axial distance between the first lens element E1 and the second lens element E2 is larger than an axial distance between the second lens element E2 and the third lens element E3, an axial distance between the third lens element E3 and the fourth lens element E4, an axial distance between the fourth lens element E4 and the fifth lens element E5 and an axial distance between the fifth lens element E5 and the sixth lens element E6.

In this embodiment, an axial distance between two adjacent lens elements is a distance in a paraxial region between two adjacent lens surfaces of the two adjacent lens elements.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

- X is the displacement in parallel with an optical axis from an axial vertex on the aspheric surface to a point at a distance of Y from the optical axis on the aspheric surface;
- Y is the vertical distance from the point on the aspheric surface to the optical axis;
- R is the curvature radius;
- k is the conic coefficient; and
- Ai is the i-th aspheric coefficient, and in the embodiments, i may be, but is not limited to, 4, 6, 8, 10, 12, 14 and 16.

In this embodiment, with a wavelength of 940.0 nm as a reference wavelength for the photographing optical system of the image capturing unit 1 according to the 1st embodiment, a focal length of the photographing optical system is f, an f-number of the photographing optical system is Fno, and half of a maximum field of view of the photographing optical system is HFOV, and these parameters have the following values: f=3.26 millimeters (mm), Fno=1.56, and HFOV=58.0 degrees (deg.). With a wavelength of helium d-line as a reference wavelength for the photographing optical system of the image capturing unit 1 according to the 1st embodiment, a focal length of the photographing optical system is fd, half of a maximum field of view of the photographing optical system is HFOVd, a total track length of the photographing optical system is TLd, an axial distance between the aperture stop ST and the image surface IMG is SLd, and a back focal length of the photographing optical system is BLd, and these parameters have the following values: fd=3.19 mm, HFOVd=59.3 degrees, TLd=14.27 mm, SLd=11.21 mm and BLd=3.10 mm.

Some of the following parameters are measured at the wavelength of helium d-line, and there would be descriptions of "at the wavelength of helium d-line" noted in the definitions of these parameters. However, if the parameters are not specifically defined for a reference wavelength, these parameters may be determined according to a default of the reference wavelength for the photographing optical system, such as 940.0 nm in this embodiment.

When the maximum field of view of the photographing optical system at the wavelength of helium d-line is FOVd, the following condition is satisfied: FOVd=118.5 degrees.

When an axial distance between the object-side surface of the first lens element E1 and the image surface IMG at the wavelength of helium d-line is TLd, and a maximum image height of the photographing optical system is ImgH, the following condition is satisfied: TLd/ImgH=3.83.

When an axial distance between the image-side surface of the sixth lens element E6 and the image surface IMG at the wavelength of helium d-line is BLd, and the maximum image height of the photographing optical system is ImgH, the following condition is satisfied: BLd/ImgH=0.83.

When an axial distance between the object-side surface of the first lens element E1 and the image-side surface of the sixth lens element E6 is TD, and the focal length of the photographing optical system at the wavelength of helium d-line is fd, the following condition is satisfied: TD/fd=3.50.

When the axial distance between the aperture stop ST and the image surface IMG at the wavelength of helium d-line is SLd, and the focal length of the photographing optical system at the wavelength of helium d-line is fd, the following condition is satisfied: SLd/fd=3.51.

When the axial distance between the aperture stop ST and the image surface IMG at the wavelength of helium d-line is SLd, and the axial distance between the object-side surface of the first lens element E1 and the image surface IMG at the wavelength of helium d-line is TLd, the following condition is satisfied: SLd/TLd=0.79.

When the focal length of the photographing optical system at the wavelength of helium d-line is fd, and a focal length of the fourth lens element E4 at the wavelength of helium d-line is f4d, the following condition is satisfied: fd/f4d=0.01.

When a focal length of the third lens element E3 at the wavelength of helium d-line is f3d, and a focal length of the fifth lens element E5 at the wavelength of helium d-line is f5d, the following condition is satisfied: |f3d/f5d|=3.52.

When a sum of central thicknesses of all lens elements of the photographing optical system is ΣCT, and the axial distance between the object-side surface of the first lens element E1 and the image-side surface of the sixth lens element E6 is TD, the following condition is satisfied: ΣCT/TD=0.77. In this embodiment, ΣCT is the sum of a central thickness of the first lens element E1, a central thickness of the second lens element E2, a central thickness of the third lens element E3, a central thickness of the fourth lens element E4, a central thickness of the fifth lens element E5 and a central thickness of the sixth lens element E6.

When the central thickness of the second lens element E2 is CT2, and the central thickness of the fourth lens element E4 is CT4, the following condition is satisfied: CT4/CT2=3.78.

When the central thickness of the second lens element E2 is CT2, the central thickness of the third lens element E3 is CT3, and the central thickness of the fourth lens element E4 is CT4, the following condition is satisfied: (CT2+CT3)/CT4=0.40.

When a curvature radius of the object-side surface of the second lens element E2 is R3, and a curvature radius of the image-side surface of the fourth lens element E4 is R8, the following condition is satisfied: |R8/R3|=0.50.

When the curvature radius of the image-side surface of the fourth lens element E4 is R8, and a curvature radius of the object-side surface of the fifth lens element E5 is R9, the following condition is satisfied: |R8/R9|=1.85.

When a curvature radius of the image-side surface of the first lens element E1 is R2, and the curvature radius of the object-side surface of the fifth lens element E5 is R9, the following condition is satisfied: |R9/R2|=0.08.

When a curvature radius of the object-side surface of the third lens element E3 is R5, and a curvature radius of the image-side surface of the third lens element E3 is R6, the following condition is satisfied: (R5+R6)/(R5−R6)=−0.44.

When an Abbe number of the fifth lens element E5 at the wavelength of helium d-line is Vd5, and a refractive index of the fifth lens element E5 at the wavelength of helium d-line is Nd5, the following condition is satisfied: Vd5/Nd5=36.5.

When an Abbe number of the sixth lens element E6 at the wavelength of helium d-line is Vd6, and a refractive index of the sixth lens element E6 at the wavelength of helium d-line is Nd6, the following condition is satisfied: Vd6/Nd6=14.3.

When a distance in parallel with the optical axis between a maximum effective radius position of the object-side surface of the fifth lens element E5 and a maximum effective radius position of the image-side surface of the fifth lens element E5 at the wavelength of helium d-line is ET5d, and the central thickness of the fifth lens element E5 is CT5, the following condition is satisfied: ET5d/CT5=0.40.

When a displacement in parallel with the optical axis from an axial vertex of the image-side surface of the sixth lens element E6 to a maximum effective radius position of the image-side surface of the sixth lens element E6 at the wavelength of helium d-line is SAG6R2d, and the central thickness of the sixth lens element E6 is CT6, the following condition is satisfied: SAG6R2d/CT6=1.20. In this embodiment, the direction of SAG6R2d faces towards the image side of the photographing optical system, and the value of SAG6R2d is positive.

The detailed optical data of the 1st embodiment are shown in Table 1A and the aspheric surface data are shown in Table 1B below.

TABLE 1A

1st Embodiment
f = 3.26 mm, Fno = 1.56, HFOV = 58.0 deg.

| Surface # | | Curvature Radius | | Thickness | Material | Index 940.0 nm | Index d-line | Abbe # | Focal Length 940.0 nm | Focal Length d-line |
|---|---|---|---|---|---|---|---|---|---|---|
| 0 | Object | Infinity | | Infinity | | | | | | |
| 1 | Lens 1 | −4.9569 | (ASP) | 1.057 | Plastic | 1.553 | 1.567 | 37.4 | −8.08 | −7.89 |
| 2 | | 48.9091 | (ASP) | 2.009 | | | | | | |
| 3 | Ape. Stop | Plano | | 0.198 | | | | | | |
| 4 | Lens 2 | −14.5297 | (ASP) | 0.772 | Plastic | 1.535 | 1.544 | 56.0 | 10.85 | 10.67 |
| 5 | | −4.2265 | (ASP) | 0.050 | | | | | | |
| 6 | Lens 3 | −10.4979 | (ASP) | 0.400 | Plastic | 1.616 | 1.639 | 23.5 | −12.20 | −11.77 |
| 7 | | 26.8596 | (ASP) | 0.176 | | | | | | |
| 8 | Lens 4 | 7.8330 | (ASP) | 2.917 | Plastic | 1.535 | 1.544 | 56.0 | 273.72 | 261.95 |
| 9 | | 7.2010 | (ASP) | 0.095 | | | | | | |
| 10 | Lens 5 | 3.9016 | (ASP) | 2.342 | Plastic | 1.526 | 1.534 | 56.0 | 3.39 | 3.35 |
| 11 | | −2.6086 | (ASP) | −1.587 | | | | | | |
| 12 | Stop | Plano | | 1.637 | | | | | | |
| 13 | Lens 6 | 2.9981 | (ASP) | 1.112 | Plastic | 1.616 | 1.639 | 23.5 | −9.48 | −9.24 |
| 14 | | 1.7007 | (ASP) | 2.495 | | | | | | |
| 15 | Filter | Plano | | 0.400 | Glass | 1.508 | 1.517 | 64.2 | — | — |
| 16 | | Plano | | 0.234 | | | | | | |
| 17 | Image | Plano | | — | | | | | | |

Note:
Reference wavelength is 940.0 nm.
An effective radius of the stop S1 (Surface 12) is 3.690 mm.
When reference wavelength is 587.6 nm (d-line), fd = 3.19 mm, HFOVd = 59.3 degrees, TLd = 14.27 mm, SLd = 11.21 mm, and BLd = 3.10 mm.

TABLE 1B

| Aspheric Coefficients | | | | | | |
|---|---|---|---|---|---|---|
| Surface # | 1 | 2 | 4 | 5 | 6 | 7 |
| k = | 5.73279E−01 | −9.00000E+01 | 1.68440E+01 | −3.57670E+00 | −4.93345E+01 | 7.07232E+01 |
| A4 = | 3.13911E−02 | 3.79267E−02 | 5.88044E−03 | −8.49313E−03 | −2.50691E−02 | −2.55674E−02 |
| A6 = | −5.20061E−03 | −5.74456E−03 | −3.30982E−03 | −1.51039E−02 | −1.37033E−02 | 3.71210E−03 |
| A8 = | 8.27884E−04 | 2.24185E−03 | 1.59862E−03 | 1.05897E−02 | 1.25339E−02 | 1.48455E−03 |
| A10 = | −9.44348E−05 | −6.88248E−04 | −8.60836E−04 | −3.89198E−03 | −4.31113E−03 | −4.64659E−04 |
| A12 = | 7.07083E−06 | 1.39821E−04 | — | 4.35054E−04 | 5.30993E−04 | 3.57449E−05 |
| A14 = | −3.04352E−07 | −1.13150E−05 | — | — | — | — |
| A16 = | 5.70454E−09 | — | — | — | — | — |
| Surface # | 8 | 9 | 10 | 11 | 13 | 14 |
| k = | 3.25361E+00 | 3.03316E+00 | −1.06075E+00 | −5.41597E−01 | −1.52887E+00 | −3.26182E+00 |
| A4 = | −1.88239E−02 | −9.54161E−02 | −8.23587E−02 | 2.42235E−02 | −9.43308E−03 | −5.45363E−05 |
| A6 = | 4.75443E−03 | 3.01363E−02 | 2.63253E−02 | −4.82514E−03 | 1.45502E−03 | 4.33467E−04 |
| A8 = | −6.34947E−04 | −6.61830E−03 | −5.33844E−03 | 9.96380E−04 | −3.42530E−04 | −2.55787E−04 |
| A10 = | 4.44835E−05 | 9.43665E−04 | 6.96263E−04 | −1.37160E−04 | 4.46237E−05 | 4.31215E−05 |
| A12 = | −1.29148E−06 | −8.45860E−05 | −5.68553E−05 | 1.17735E−05 | −3.99032E−06 | −3.77684E−06 |
| A14 = | — | 4.30177E−06 | 2.61815E−06 | −5.71229E−07 | 2.20130E−07 | 1.70075E−07 |
| A16 = | — | −9.34609E−08 | −5.12106E−08 | 1.23039E−08 | −5.07653E−09 | −3.08661E−09 |

In Table 1A, the curvature radius, the thickness and the focal length are shown in millimeters (mm). Surface numbers 0-17 represent the surfaces sequentially arranged from the object side to the image side along the optical axis. In Table 1B, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
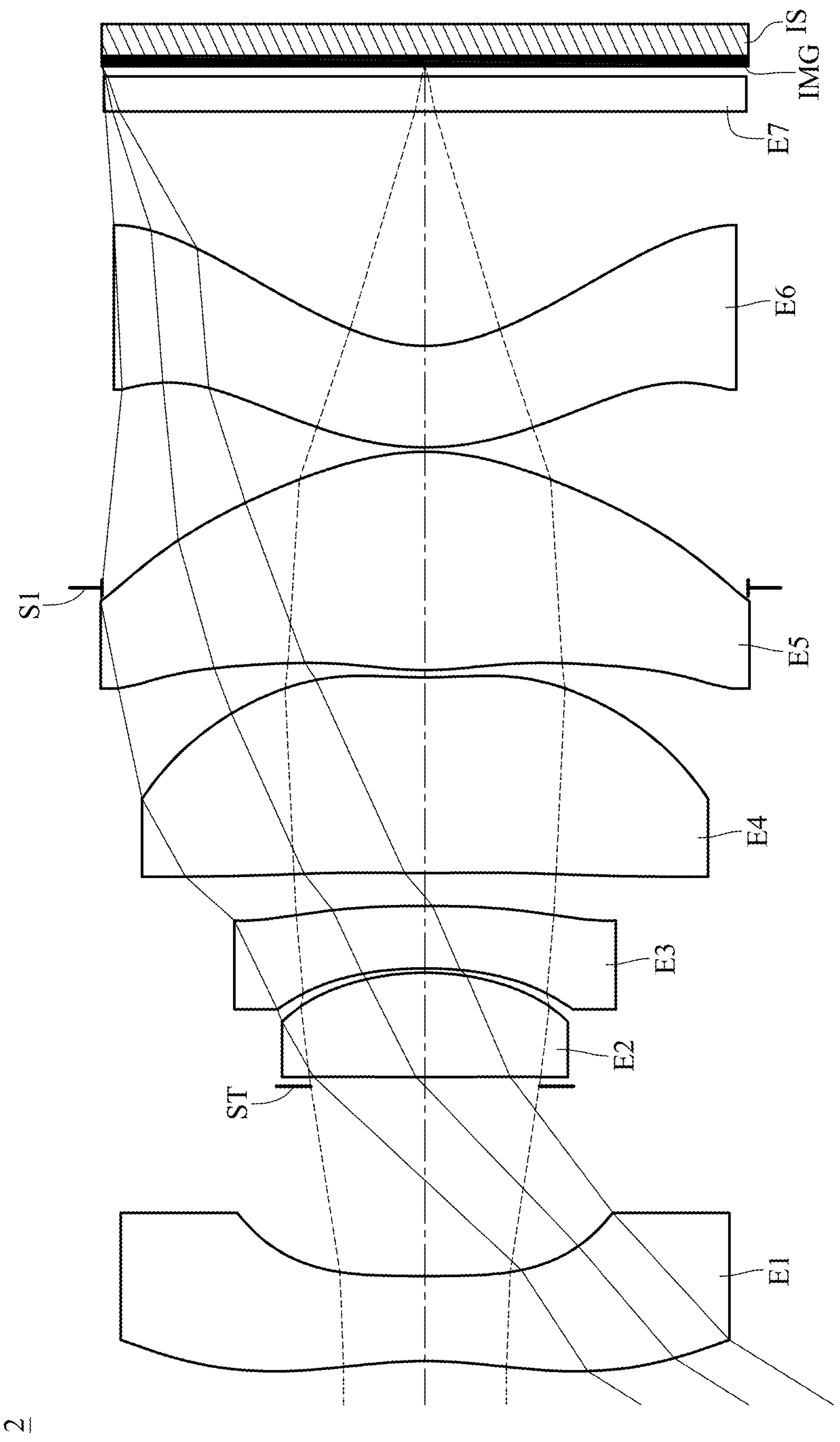
FIG. 3 is a schematic view of an image capturing unit according to the 2nd embodiment of the present disclosure.
Figure 4:
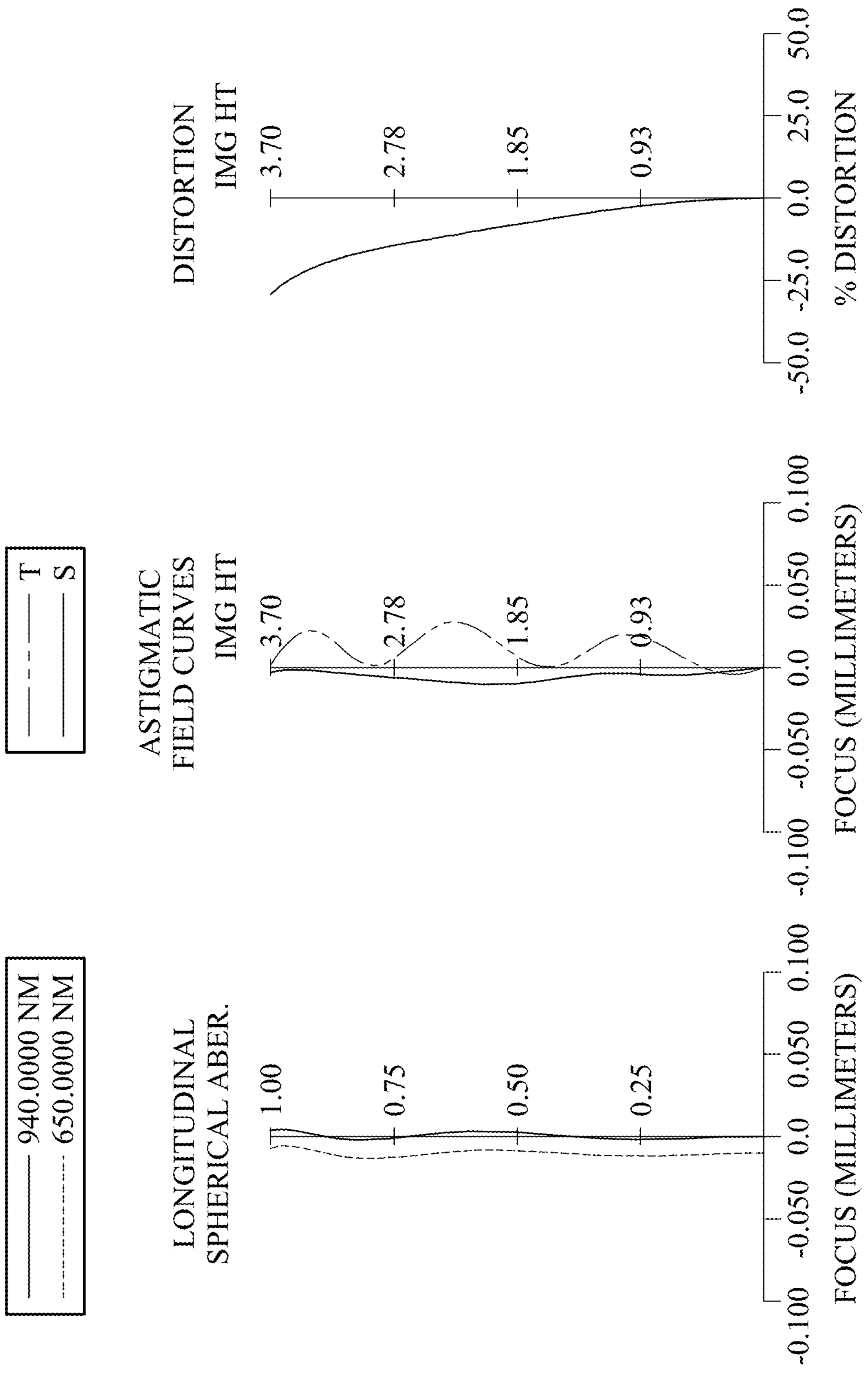
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The object-side surface of the first lens element E1 has one critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point. The image-side surface of the third lens element E3 has one critical point in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has one inflection point. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system.

The detailed optical data of the 2nd embodiment are shown in Table 2A and the aspheric surface data are shown in Table 2B below.

TABLE 2A

| 2nd Embodiment<br>f = 3.27 mm, Fno = 1.75, HFOV = 58.0 deg. | | | | | | | | | |
|---|---|---|---|---|---|---|---|---|---|
| Surface | | | | | Index | | Abbe | Focal Length | |
| # | | Curvature Radius | Thickness | Material | 940.0 nm | d-line | # | 940.0 nm | d-line |
| 0 | Object | Infinity | Infinity | | | | | | |
| 1 | Lens 1 | −4.9884 (ASP) | 0.974 | Plastic | 1.594 | 1.614 | 26.0 | −7.22 | −6.98 |
| 2 | | 32.7547 (ASP) | 2.172 | | | | | | |
| 3 | Ape. Stop | Plano | 0.107 | | | | | | |
| 4 | Lens 2 | 180.5349 (ASP) | 1.195 | Plastic | 1.526 | 1.534 | 56.0 | 5.78 | 5.69 |
| 5 | | −3.0825 (ASP) | 0.050 | | | | | | |
| 6 | Lens 3 | −4.5549 (ASP) | 0.715 | Plastic | 1.616 | 1.639 | 23.5 | −9.95 | −9.60 |
| 7 | | −18.7970 (ASP) | 0.377 | | | | | | |
| 8 | Lens 4 | 35.9452 (ASP) | 2.241 | Plastic | 1.535 | 1.544 | 56.0 | −14.97 | −14.73 |
| 9 | | 6.4092 (ASP) | 0.084 | | | | | | |
| 10 | Lens 5 | 3.7847 (ASP) | 2.500 | Plastic | 1.535 | 1.544 | 56.0 | 3.41 | 3.36 |
| 11 | | −2.7179 (ASP) | −1.559 | | | | | | |
| 12 | Stop | Plano | 1.609 | | | | | | |
| 13 | Lens 6 | 3.0448 (ASP) | 1.162 | Plastic | 1.616 | 1.639 | 23.5 | −9.22 | −8.99 |
| 14 | | 1.6940 (ASP) | 2.686 | | | | | | |
| 15 | Filter | Plano | 0.400 | Glass | 1.508 | 1.517 | 64.2 | — | — |
| 16 | | Plano | 0.118 | | | | | | |
| 17 | Image | Plano | — | | | | | | |

Note:
Reference wavelength is 940.0 nm.
An effective radius of the stop S1 (Surface 12) is 3.700 mm.
When reference wavelength is 587.6 nm (d-line), fd = 3.20 mm, HFOVd = 59.2 degrees, TLd = 14.82 mm, SLd = 11.67 mm, and BLd = 3.19 mm.

TABLE 2B

| Aspheric Coefficients | | | | | | |
|---|---|---|---|---|---|---|
| Surface # | 1 | 2 | 4 | 5 | 6 | 7 |
| k = | 6.63527E−01 | −9.00000E+01 | −9.00000E+01 | −3.23038E+00 | −1.70704E+01 | −7.10763E+01 |
| A4 = | 3.37552E−02 | 3.80937E−02 | 2.83311E−03 | −2.20294E−02 | −4.87829E−02 | −2.48939E−02 |
| A6 = | −5.88635E−03 | −3.36130E−03 | −2.49598E−03 | 1.05833E−02 | 2.05350E−02 | 9.49980E−03 |
| A8 = | 9.47694E−04 | 1.52078E−04 | 1.19604E−03 | −8.86108E−03 | −1.00484E−02 | −1.93242E−03 |
| A10 = | −1.08627E−04 | 1.11266E−04 | −7.27641E−04 | 2.38296E−03 | 2.21161E−03 | 2.68066E−04 |
| A12 = | 8.18835E−06 | −1.05932E−05 | — | −2.64144E−04 | −1.36832E−04 | −1.59384E−05 |
| A14 = | −3.58425E−07 | −5.27553E−07 | — | — | — | — |
| A16 = | 6.93695E−09 | — | — | — | — | — |
| Surface # | 8 | 9 | 10 | 11 | 13 | 14 |
| k = | 8.33976E+01 | 2.40118E+00 | −1.01716E+00 | −5.15780E−01 | −1.44139E+00 | −3.40741E+00 |
| A4 = | −1.73115E−02 | −9.72736E−02 | −7.98991E−02 | 2.57387E−02 | −7.63955E−03 | 4.21582E−03 |
| A6 = | 5.14504E−03 | 2.87986E−02 | 2.47630E−02 | −5.30400E−03 | 7.05770E−04 | −9.05249E−04 |
| A8 = | −7.42874E−04 | −5.84929E−03 | −4.79228E−03 | 1.02433E−03 | −2.05674E−04 | 4.43685E−05 |
| A10 = | 5.32669E−05 | 7.72038E−04 | 5.92324E−04 | −1.33400E−04 | 3.28793E−05 | 3.60116E−07 |
| A12 = | −1.53932E−06 | −6.45003E−05 | −4.59599E−05 | 1.08399E−05 | −3.80118E−06 | −2.75953E−07 |
| A14 = | — | 3.07466E−06 | 2.02396E−06 | −4.94817E−07 | 2.54019E−07 | 2.14314E−08 |
| A16 = | — | −6.40818E−08 | −3.80713E−08 | 9.97015E−09 | −6.68308E−09 | −5.85887E−10 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Values of Optical and Physical Parameters/Definitions | | | |
|---|---|---|---|
| fd [mm] | 3.20 | \|f3d/f5d\| | 2.85 |
| Fno | 1.75 | ΣCT/TD | 0.76 |
| HFOVd [deg.] | 59.2 | CT4/CT2 | 1.88 |
| FOVd [deg.] | 118.5 | (CT2 + CT3)/CT4 | 0.85 |
| TLd [mm] | 14.82 | \|R8/R3\| | 0.04 |
| SLd [mm] | 11.67 | \|R8/R9\| | 1.69 |
| BLd [mm] | 3.19 | \|R9/R2\| | 0.12 |
| TLd/ImgH | 4.00 | (R5 + R6)/(R5 − R6) | −1.64 |
| BLd/ImgH | 0.86 | Vd5/Nd5 | 36.3 |
| TD/fd | 3.64 | Vd6/Nd6 | 14.3 |
| SLd/fd | 3.65 | ET5d/CT5 | 0.40 |
| SLd/TLd | 0.79 | SAG6R2d/CT6 | 1.19 |
| fd/f4d | −0.22 | — | — |

3rd Embodiment

Figure 5:
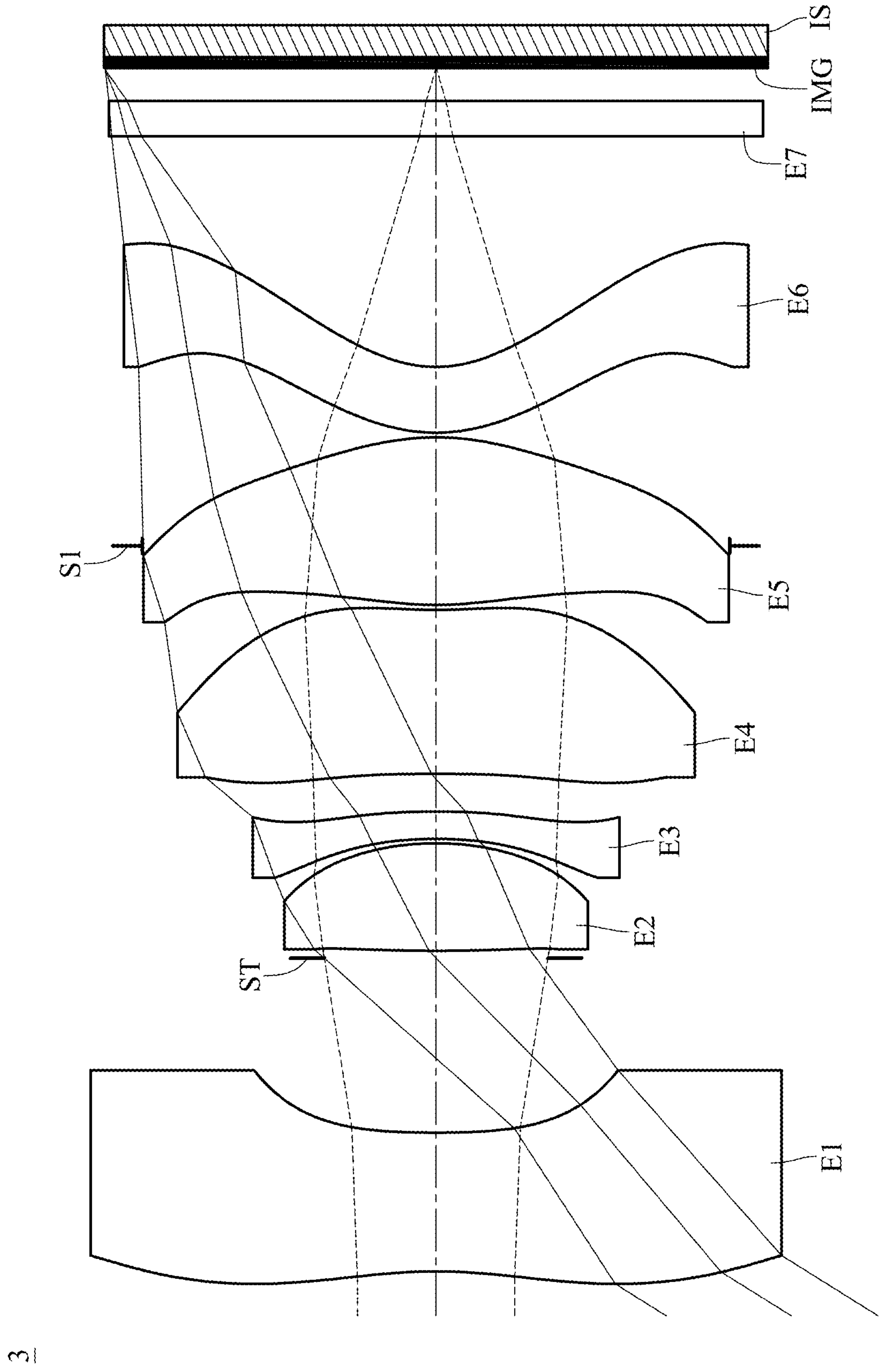
FIG. 5 is a schematic view of an image capturing unit according to the 3rd embodiment of the present disclosure.
Figure 6:
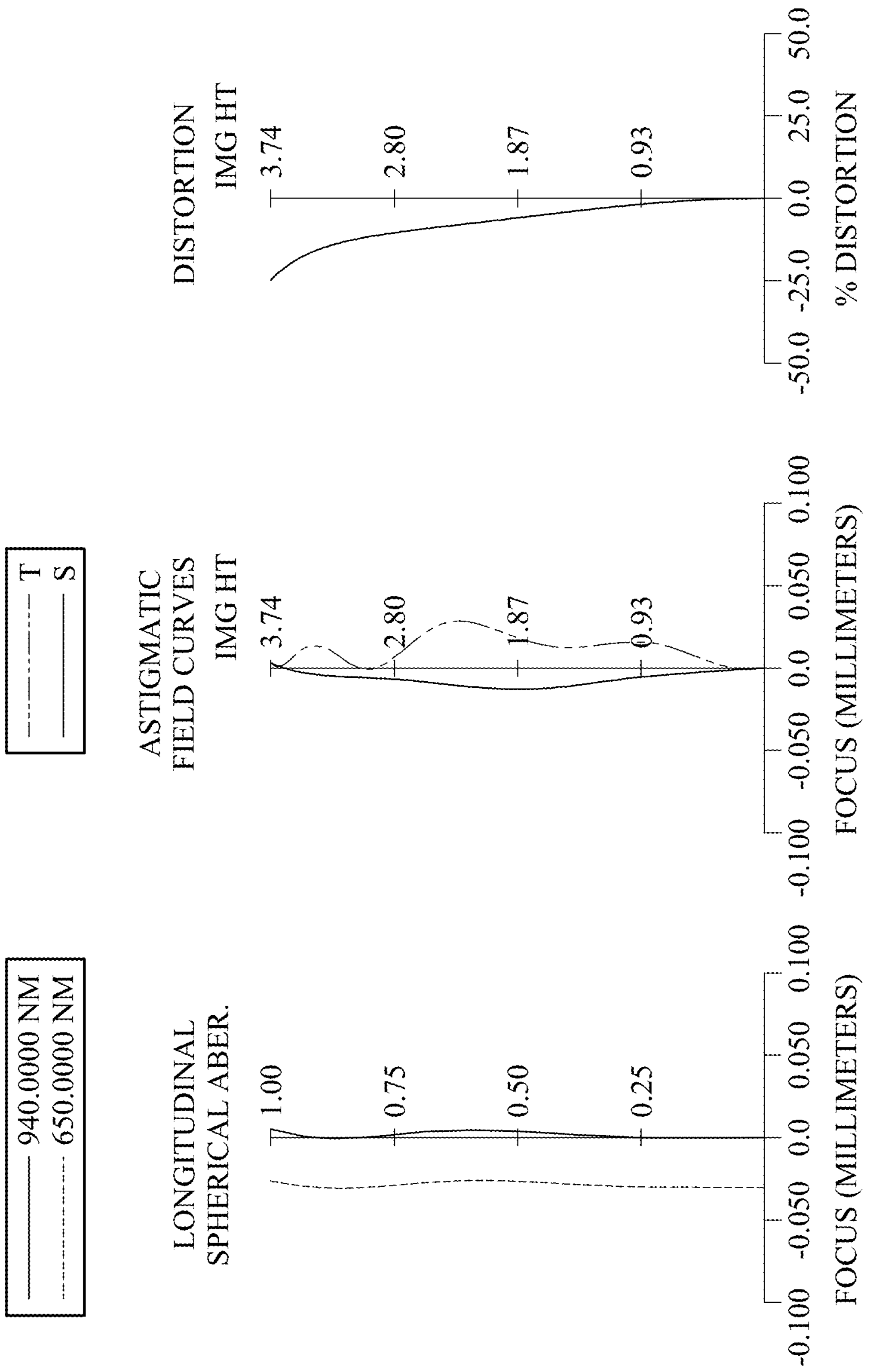
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The object-side surface of the first lens element E1 has one critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The image-side surface of the third lens element E3 has one critical point in an off-axis region thereof.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has two inflection points. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has one inflection point. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

The detailed optical data of the 3rd embodiment are shown in Table 3A and the aspheric surface data are shown in Table 3B below.

TABLE 3A

| 3rd Embodiment f = 3.11 mm, Fno = 1.75, HFOV = 58.0 deg. | | | | | | | | | | |
|---|---|---|---|---|---|---|---|---|---|---|
| Surface | | | | | | Index | | Abbe | Focal Length | |
| # | | Curvature Radius | | Thickness | Material | 940.0 nm | d-line | # | 940.0 nm | d-line |
| 0 | Object | Infinity | | Infinity | | | | | | |
| 1 | Lens 1 | −5.6802 | (ASP) | 1.564 | Plastic | 1.553 | 1.567 | 37.4 | −6.74 | −6.58 |
| 2 | | 11.9133 | (ASP) | 1.968 | | | | | | |
| 3 | Ape. Stop | Plano | | 0.082 | | | | | | |
| 4 | Lens 2 | 19.9920 | (ASP) | 1.211 | Plastic | 1.526 | 1.534 | 56.0 | 5.45 | 5.36 |
| 5 | | −3.2733 | (ASP) | 0.050 | | | | | | |
| 6 | Lens 3 | −4.7217 | (ASP) | 0.308 | Plastic | 1.616 | 1.639 | 23.5 | −14.56 | −14.06 |
| 7 | | −10.2157 | (ASP) | 0.425 | | | | | | |
| 8 | Lens 4 | −28.7957 | (ASP) | 1.848 | Plastic | 1.540 | 1.551 | 44.8 | −8.85 | −8.68 |
| 9 | | 5.8592 | (ASP) | 0.056 | | | | | | |
| 10 | Lens 5 | 3.8021 | (ASP) | 1.890 | Plastic | 1.535 | 1.544 | 56.0 | 3.36 | 3.31 |
| 11 | | −2.8138 | (ASP) | −1.225 | | | | | | |
| 12 | Stop | Plano | | 1.276 | | | | | | |
| 13 | Lens 6 | 1.9704 | (ASP) | 0.742 | Plastic | 1.594 | 1.614 | 26.0 | −16.78 | −16.58 |
| 14 | | 1.4143 | (ASP) | 2.599 | | | | | | |
| 15 | Filter | Plano | | 0.400 | Glass | 1.508 | 1.517 | 64.2 | — | — |
| 16 | | Plano | | 0.371 | | | | | | |
| 17 | Image | Plano | | — | | | | | | |

Note:
Reference wavelength is 940.0 nm.
An effective radius of the stop S1 (Surface 12) is 3.312 mm.
When reference wavelength is 587.6 nm (d-line), fd = 3.04 mm, HFOVd = 59.4 degrees, TLd = 13.52 mm, SLd = 9.99 mm, and BLd = 3.33 mm.

TABLE 3B

| Aspheric Coefficients | | | | | | |
|---|---|---|---|---|---|---|
| Surface # | 1 | 2 | 4 | 5 | 6 | 7 |
| k = | 7.35536E−01 | −8.99631E+01 | −8.77243E+01 | −2.28345E+00 | −2.18488E+01 | −6.01955E+01 |
| A4 = | 2.23396E−02 | 3.78948E−02 | 1.39641E−03 | −2.56082E−02 | −6.82002E−02 | −4.22546E−02 |
| A6 = | −3.10497E−03 | −3.58393E−03 | −3.40759E−03 | 1.30281E−02 | 4.06690E−02 | 2.62477E−02 |
| A8 = | 4.06338E−04 | 6.20929E−04 | 1.00308E−03 | −1.13855E−02 | −1.72261E−02 | −5.67238E−03 |
| A10 = | −3.79832E−05 | −5.48482E−05 | −8.74890E−04 | 3.49651E−03 | 3.94738E−03 | 6.04319E−04 |
| A12 = | 2.33315E−06 | 2.94249E−05 | — | −4.20761E−04 | −3.29759E−04 | −2.68562E−05 |
| A14 = | −8.29109E−08 | −4.74837E−06 | — | — | — | — |
| A16 = | 1.29652E−09 | — | — | — | — | — |
| Surface # | 8 | 9 | 10 | 11 | 13 | 14 |
| k = | −7.80951E+01 | 8.87055E−01 | −1.12777E+00 | −4.92415E−01 | −1.98842E+00 | −2.81136E+00 |
| A4 = | −2.36691E−02 | −9.42282E−02 | −6.25803E−02 | 3.30394E−02 | −1.22876E−03 | 1.48110E−02 |
| A6 = | 9.60861E−03 | 2.76051E−02 | 2.12906E−02 | −7.64090E−03 | −2.01996E−03 | −5.62980E−03 |
| A8 = | −1.45466E−03 | −6.12267E−03 | −4.78561E−03 | 1.75958E−03 | 2.25695E−04 | 8.65684E−04 |
| A10 = | 1.09222E−04 | 8.92676E−04 | 6.84905E−04 | −2.85567E−04 | −2.00576E−05 | −8.60135E−05 |
| A12 = | −3.41421E−06 | −8.34898E−05 | −6.27857E−05 | 2.75308E−05 | 8.27380E−07 | 5.62512E−06 |
| A14 = | — | 4.60902E−06 | 3.23863E−06 | −1.45259E−06 | 3.51215E−08 | −2.26734E−07 |
| A16 = | — | −1.12732E−07 | −6.81401E−08 | 3.32405E−08 | −2.46180E−09 | 4.29764E−09 |

In the 3rd embodiment, the equation of the aspheric surface profiles of the aforementioned lens elements is the same as the equation of the 1st embodiment. Also, the definitions of these parameters shown in Table 30 below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Optical and Physical Parameters/Definitions | | | |
|---|---|---|---|
| fd [mm] | 3.04 | \|f3d/f5d\| | 4.25 |
| Fno | 1.75 | ΣCT/TD | 0.74 |
| HFOVd [deg.] | 59.4 | CT4/CT2 | 1.53 |
| FOVd [deg.] | 118.7 | (CT2 + CT3)/CT4 | 0.82 |
| TLd [mm] | 13.52 | \|R8/R3\| | 0.29 |
| SLd [mm] | 9.99 | \|R8/R9\| | 1.54 |
| BLd [mm] | 3.33 | \|R9/R2\| | 0.32 |

TABLE 3C-continued

| Values of Optical and Physical Parameters/Definitions | | | |
|---|---|---|---|
| TLd/ImgH | 3.62 | (R5 + R6)/(R5 − R6) | −2.72 |
| BLd/ImgH | 0.89 | Vd5/Nd5 | 36.3 |
| TD/fd | 3.36 | Vd6/Nd6 | 16.1 |
| SLd/fd | 3.29 | ET5d/CT5 | 0.40 |
| SLd/TLd | 0.74 | SAG6R2d/CT6 | 1.85 |
| fd/f4d | −0.35 | — | — |

4th Embodiment

Figure 7:
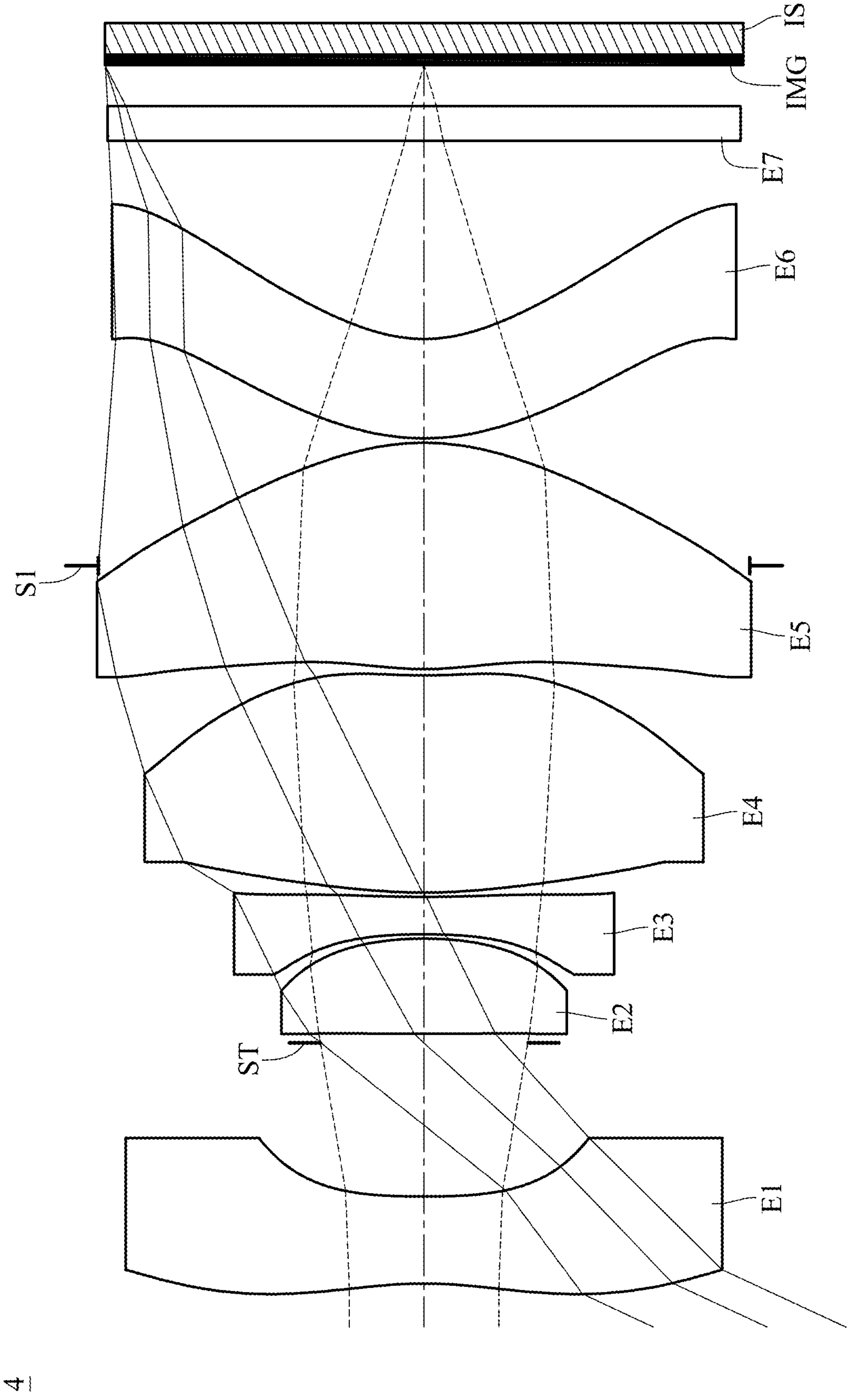
FIG. 7 is a schematic view of an image capturing unit according to the 4th embodiment of the present disclosure.
Figure 8:
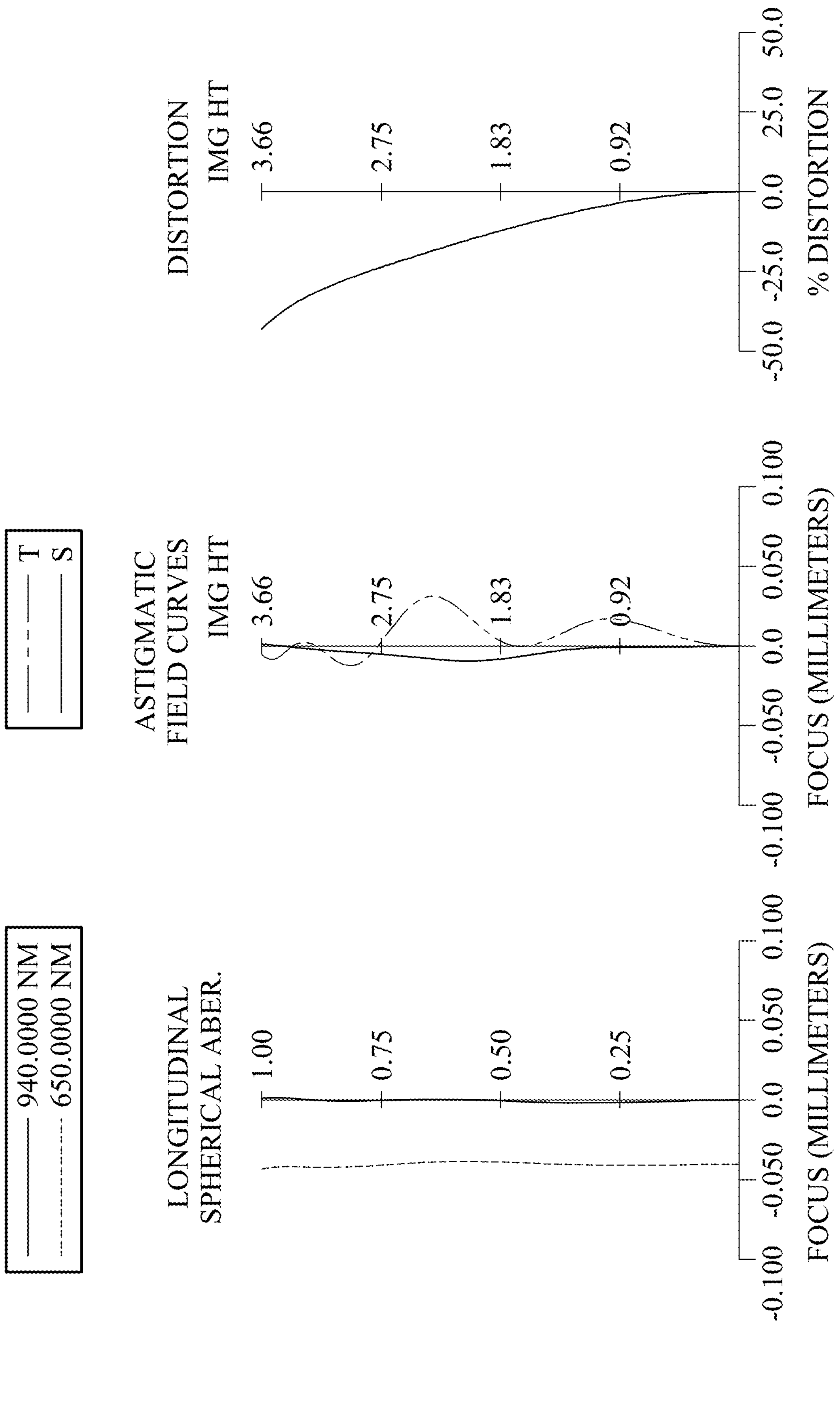
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The object-side surface of the first lens element E1 has one critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system.

The detailed optical data of the 4th embodiment are shown in Table 4A and the aspheric surface data are shown in Table 4B below.

TABLE 4A

4th Embodiment
f = 3.01 mm, Fno = 1.75, HFOV = 65.0 deg.

| Surface # | | Curvature Radius | | Thickness | Material | Index 940.0 nm | Index d-line | Abbe # | Focal Length 940.0 nm | Focal Length d-line |
|---|---|---|---|---|---|---|---|---|---|---|
| 0 | Object | Infinity | | Infinity | | | | | | |
| 1 | Lens 1 | −4.8768 | (ASP) | 1.000 | Plastic | 1.540 | 1.551 | 44.8 | −6.14 | −6.02 |
| 2 | | 11.0828 | (ASP) | 1.766 | | | | | | |
| 3 | Ape. Stop | Plano | | 0.103 | | | | | | |
| 4 | Lens 2 | 88.0880 | (ASP) | 1.093 | Plastic | 1.526 | 1.535 | 55.9 | 7.41 | 7.29 |
| 5 | | −4.0583 | (ASP) | 0.050 | | | | | | |
| 6 | Lens 3 | −7.0844 | (ASP) | 0.429 | Plastic | 1.664 | 1.697 | 16.3 | −7.03 | −6.70 |
| 7 | | 14.0599 | (ASP) | 0.050 | | | | | | |

TABLE 4A-continued

| 4th Embodiment f = 3.01 mm, Fno = 1.75, HFOV = 65.0 deg. | | | | | | | | | | |
|---|---|---|---|---|---|---|---|---|---|---|
| Surface | | | | | Index | | Abbe | Focal Length | |
| # | | Curvature Radius | Thickness | Material | 940.0 nm | d-line | # | 940.0 nm | d-line |
| 8 | Lens 4 | 6.5596 (ASP) | 2.494 | Plastic | 1.564 | 1.582 | 30.2 | 80.01 | 76.09 |
| 9 | | 6.6217 (ASP) | 0.072 | | | | | | |
| 10 | Lens 5 | 3.8385 (ASP) | 2.600 | Plastic | 1.553 | 1.567 | 37.4 | 3.38 | 3.31 |
| 11 | | −2.7604 (ASP) | −1.413 | | | | | | |
| 12 | Stop | Plano | 1.463 | | | | | | |
| 13 | Lens 6 | 2.7575 (ASP) | 1.141 | Plastic | 1.664 | 1.697 | 16.3 | −12.83 | −12.52 |
| 14 | | 1.7393 (ASP) | 2.275 | | | | | | |
| 15 | Filter | Plano | 0.400 | Glass | 1.508 | 1.517 | 64.2 | — | — |
| 16 | | Plano | 0.471 | | | | | | |
| 17 | Image | Plano | — | | | | | | |

Note:
Reference wavelength is 940.0 nm.
An effective radius of the stop S1 (Surface 12) is 3.740 mm.
When reference wavelength is 587.6 nm (d-line), fd = 2.92 mm, HFOVd = 67.3 degrees, TLd = 13.94 mm, SLd = 11.18 mm, and BLd = 3.09 mm.

TABLE 4B

| Aspheric Coefficients | | | | | | |
|---|---|---|---|---|---|---|
| Surface # | 1 | 2 | 4 | 5 | 6 | 7 |
| k = | 5.92482E−01 | 1.07509E+01 | 9.00000E+01 | 5.86480E−01 | −4.37634E+00 | 3.51199E+01 |
| A4 = | 3.53502E−02 | 4.35497E−02 | 2.08995E−03 | −3.88879E−02 | −4.25846E−02 | −1.66377E−02 |
| A6 = | −6.56122E−03 | −4.76282E−03 | −1.08282E−03 | 1.65953E−02 | 9.55191E−03 | 7.41321E−04 |
| A8 = | 1.08848E−03 | 1.79197E−03 | −4.63613E−04 | −1.06056E−02 | −5.32874E−03 | 8.09677E−04 |
| A10 = | −1.27685E−04 | −7.61193E−04 | −6.01349E−04 | 2.65834E−03 | 1.22784E−03 | −1.80909E−04 |
| A12 = | 9.77007E−06 | 2.50536E−04 | — | −2.76603E−04 | −8.93072E−06 | 1.04432E−05 |
| A14 = | −4.30384E−07 | −2.97349E−05 | — | — | — | — |
| A16 = | 8.31080E−09 | — | — | — | — | — |
| Surface # | 8 | 9 | 10 | 11 | 13 | 14 |
| k = | 1.69502E+00 | 2.56599E+00 | −8.27979E−01 | −5.22618E−01 | −1.05409E+00 | −3.43848E+00 |
| A4 = | −1.56252E−02 | −9.19897E−02 | −7.67066E−02 | 2.15197E−02 | −9.90748E−03 | 3.20353E−03 |
| A6 = | 3.49159E−03 | 2.59368E−02 | 2.18707E−02 | −3.91603E−03 | 1.55498E−03 | 3.72046E−04 |
| A8 = | −5.03705E−04 | −4.98780E−03 | −3.88834E−03 | 6.81484E−04 | −2.80955E−04 | −2.35530E−04 |
| A10 = | 3.60103E−05 | 6.38076E−04 | 4.50512E−04 | −7.53888E−05 | 3.11759E−05 | 3.68878E−05 |
| A12 = | −9.57523E−07 | −5.36494E−05 | −3.33773E−05 | 5.43516E−06 | −2.39709E−06 | −3.21782E−06 |
| A14 = | — | 2.66653E−06 | 1.42180E−06 | −2.37664E−07 | 1.07840E−07 | 1.50774E−07 |
| A16 = | — | −5.83561E−08 | −2.60772E−08 | 4.87224E−09 | −2.04739E−09 | −2.95582E−09 |

In the 4th embodiment, the equation of the aspheric surface profiles of the aforementioned lens elements is the same as the equation of the 1st embodiment. Also, the definitions of these parameters shown in Table 40 below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Values of Optical and Physical Parameters/Definitions | | | |
|---|---|---|---|
| fd [mm] | 2.92 | \|f3d/f5d\| | 2.03 |
| Fno | 1.75 | ΣCT/TD | 0.81 |
| HFOVd [deg.] | 67.3 | CT4/CT2 | 2.28 |
| FOVd [deg.] | 134.7 | (CT2 + CT3)/CT4 | 0.61 |
| TLd [mm] | 13.94 | \|R8/R3\| | 0.08 |
| SLd [mm] | 11.18 | \|R8/R9\| | 1.73 |
| BLd [mm] | 3.09 | \|R9/R2\| | 0.35 |
| TLd/ImgH | 3.81 | (R5 + R6)/(R5 − R6) | −0.33 |

TABLE 4C-continued

| Values of Optical and Physical Parameters/Definitions | | | |
|---|---|---|---|
| BLd/ImgH | 0.84 | Vd5/Nd5 | 23.9 |
| TD/fd | 3.72 | Vd6/Nd6 | 9.6 |
| SLd/fd | 3.83 | ET5d/CT5 | 0.42 |
| SLd/TLd | 0.80 | SAG6R2d/CT6 | 1.35 |
| fd/f4d | 0.04 | — | — |

5th Embodiment

Figure 9:
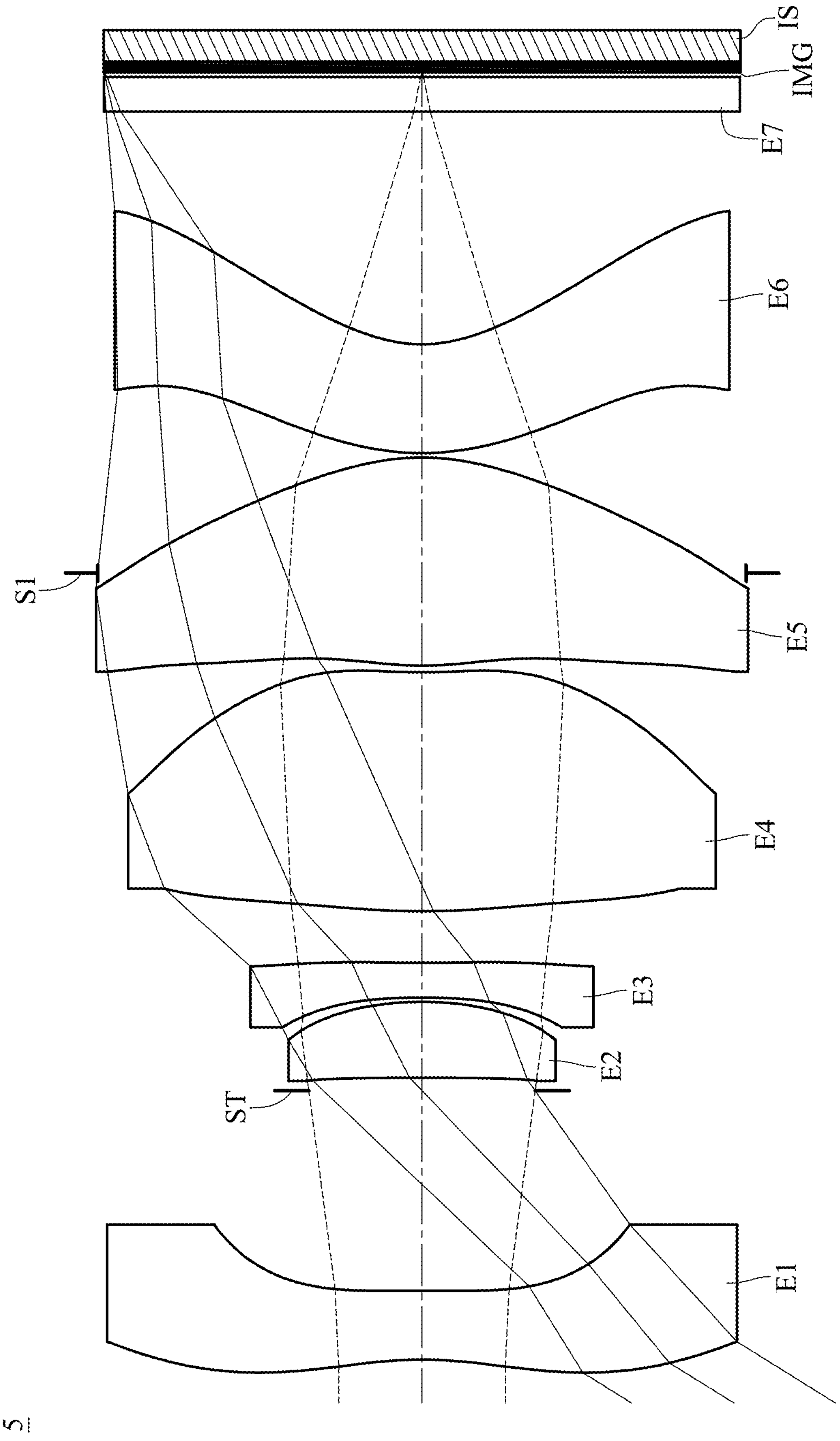
FIG. 9 is a schematic view of an image capturing unit according to the 5th embodiment of the present disclosure.
Figure 10:
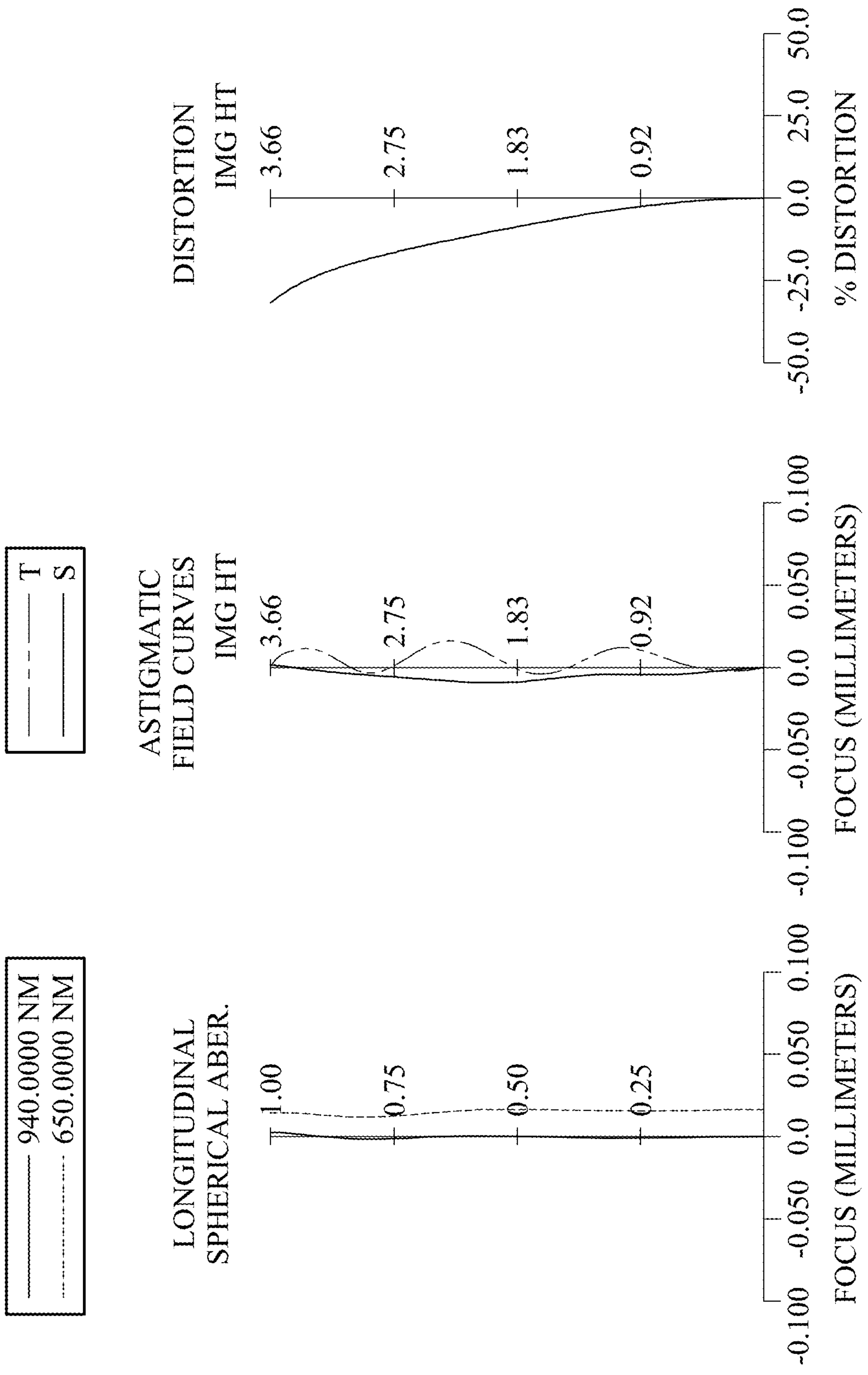
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being convex in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point. The object-side surface of the first lens element E1 has one critical point in an off-axis region thereof. The image-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The image-side surface of the third lens element E3 has two inflection points. The image-side surface of the third lens element E3 has one critical point in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has five inflection points. The image-side surface of the fifth lens element E5 has two inflection points. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system.

The detailed optical data of the 5th embodiment are shown in Table 5A and the aspheric surface data are shown in Table 5B below.

TABLE 5A

5th Embodiment
f = 3.36 mm, Fno = 1.75, HFOV = 58.0 deg.

| Surface # | | Curvature Radius | | Thickness | Material | Index 940.0 nm | Index d-line | Abbe # | Focal Length 940.0 nm | Focal Length d-line |
|---|---|---|---|---|---|---|---|---|---|---|
| 0 | Object | Infinity | | Infinity | | | | | | |
| 1 | Lens 1 | −4.4120 | (ASP) | 0.791 | Plastic | 1.594 | 1.614 | 26.0 | −8.42 | −8.14 |
| 2 | | −40.1998 | (ASP) | 2.300 | | | | | | |
| 3 | Ape. Stop | Plano | | 0.148 | | | | | | |
| 4 | Lens 2 | −52.6316 | (ASP) | 0.872 | Plastic | 1.526 | 1.534 | 56.0 | 7.74 | 7.61 |
| 5 | | −3.7984 | (ASP) | 0.050 | | | | | | |
| 6 | Lens 3 | −7.5311 | (ASP) | 0.400 | Plastic | 1.664 | 1.697 | 16.3 | −8.32 | −7.93 |
| 7 | | 21.2404 | (ASP) | 0.592 | | | | | | |
| 8 | Lens 4 | 8.2984 | (ASP) | 2.747 | Plastic | 1.540 | 1.551 | 44.8 | −133.39 | −132.96 |
| 9 | | 6.5774 | (ASP) | 0.077 | | | | | | |
| 10 | Lens 5 | 3.8435 | (ASP) | 2.392 | Plastic | 1.535 | 1.544 | 56.0 | 3.41 | 3.36 |
| 11 | | −2.7233 | (ASP) | −1.329 | | | | | | |
| 12 | Stop | Plano | | 1.379 | | | | | | |
| 13 | Lens 6 | 3.0400 | (ASP) | 1.251 | Plastic | 1.625 | 1.650 | 21.8 | −8.40 | −8.18 |
| 14 | | 1.6204 | (ASP) | 2.673 | | | | | | |
| 15 | Filter | Plano | | 0.400 | Glass | 1.508 | 1.517 | 64.2 | — | — |
| 16 | | Plano | | 0.055 | | | | | | |
| 17 | Image | Plano | | — | | | | | | |

Note:
Reference wavelength is 940.0 nm.
An effective radius of the stop S1 (Surface 12) is 3.730 mm.
When reference wavelength is 587.6 nm (d-line), fd = 3.30 mm, HFOVd = 59.0 degrees, TLd = 14.83 mm, SLd = 11.73 mm, and BLd = 3.16 mm.

TABLE 5B

| Aspheric Coefficients | | | | | | |
|---|---|---|---|---|---|---|
| Surface # | 1 | 2 | 4 | 5 | 6 | 7 |
| k = | 2.80455E−01 | 9.00000E+01 | 9.00000E+01 | −2.09211E+00 | −1.78037E+01 | 9.00000E+01 |
| A4 = | 3.52802E−02 | 3.48517E−02 | −1.30698E−03 | −1.99615E−02 | −3.95631E−02 | −2.77728E−02 |
| A6 = | −6.02537E−03 | −3.18338E−03 | −1.91554E−03 | −1.95147E−03 | 5.34366E−03 | 7.97413E−03 |
| A8 = | 9.43244E−04 | −4.23563E−05 | 8.39040E−04 | 3.11402E−03 | 1.62538E−03 | −1.52916E−03 |
| A10 = | −1.05232E−04 | 1.51688E−04 | −7.39110E−04 | −2.15777E−03 | −1.67222E−03 | 2.25182E−04 |
| A12 = | 7.75806E−06 | −2.61020E−05 | — | 3.25147E−04 | 3.30579E−04 | −1.92499E−05 |
| A14 = | −3.32517E−07 | 1.62049E−06 | — | — | — | — |
| A16 = | 6.32513E−09 | — | — | — | — | — |
| Surface # | 8 | 9 | 10 | 11 | 13 | 14 |
| k = | 1.72469E+00 | 2.31387E+00 | −7.58606E−01 | −5.37799E−01 | −1.33661E+00 | −3.27290E+00 |
| A4 = | −1.26752E−02 | −9.07553E−02 | −7.49305E−02 | 2.47791E−02 | −9.87532E−03 | 4.19816E−03 |
| A6 = | 1.42924E−03 | 2.39627E−02 | 2.03837E−02 | −4.30052E−03 | 1.76615E−03 | −2.76920E−04 |
| A8 = | −4.80185E−05 | −4.35011E−03 | −3.41628E−03 | 6.87490E−04 | −4.73442E−04 | −1.87983E−04 |
| A10 = | −1.86855E−06 | 5.25419E−04 | 3.74227E−04 | −6.99364E−05 | 7.21734E−05 | 4.16616E−05 |
| A12 = | 1.45251E−07 | −4.12591E−05 | −2.63464E−05 | 4.42991E−06 | −7.01779E−06 | −4.21199E−06 |
| A14 = | — | 1.88857E−06 | 1.06827E−06 | −1.65358E−07 | 3.92252E−07 | 2.18675E−07 |
| A16 = | — | −3.77507E−08 | −1.86570E−08 | 3.05393E−09 | −9.14420E−09 | −4.70629E−09 |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Values of Optical and Physical Parameters/Definitions | | | |
|---|---|---|---|
| fd [mm] | 3.30 | \|f3d/f5d\| | 2.36 |
| Fno | 1.75 | ΣCT/TD | 0.72 |
| HFOVd [deg.] | 59.0 | CT4/CT2 | 3.15 |
| FOVd [deg.] | 117.9 | (CT2 + CT3)/CT4 | 0.46 |
| TLd [mm] | 14.83 | \|R8/R3\| | 0.12 |
| SLd [mm] | 11.73 | \|R8/R9\| | 1.71 |
| BLd [mm] | 3.16 | \|R9/R2\| | 0.10 |
| TLd/ImgH | 4.05 | (R5 + R6)/(R5 − R6) | −0.48 |
| BLd/ImgH | 0.86 | Vd5/Nd5 | 36.3 |
| TD/fd | 3.54 | Vd6/Nd6 | 13.2 |
| SLd/fd | 3.55 | ET5d/CT5 | 0.40 |
| SLd/TLd | 0.79 | SAG6R2d/CT6 | 1.22 |
| fd/f4d | −0.02 | — | — |

6th Embodiment

Figure 11:
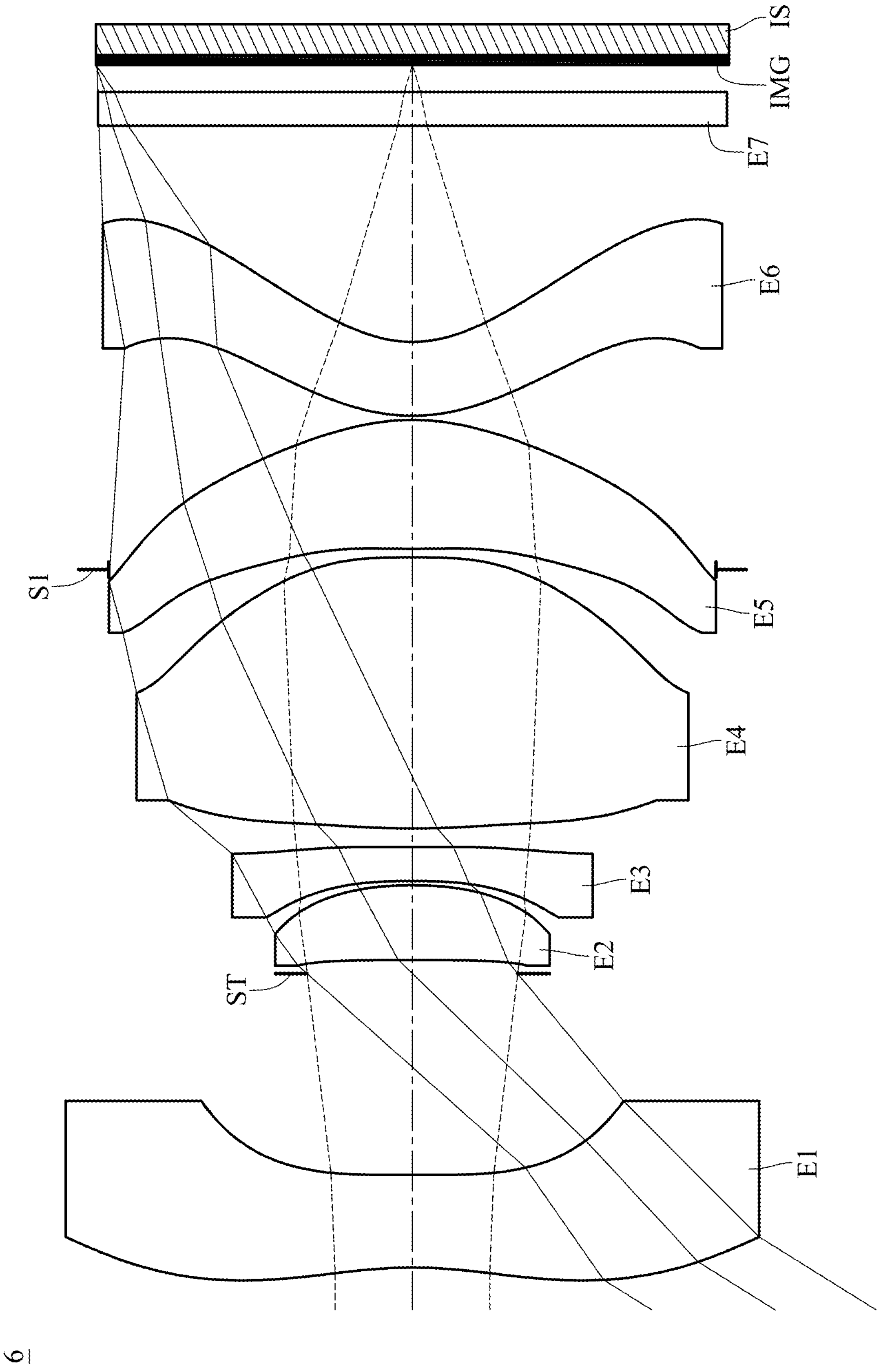
FIG. 11 is a schematic view of an image capturing unit according to the 6th embodiment of the present disclosure.
Figure 12:
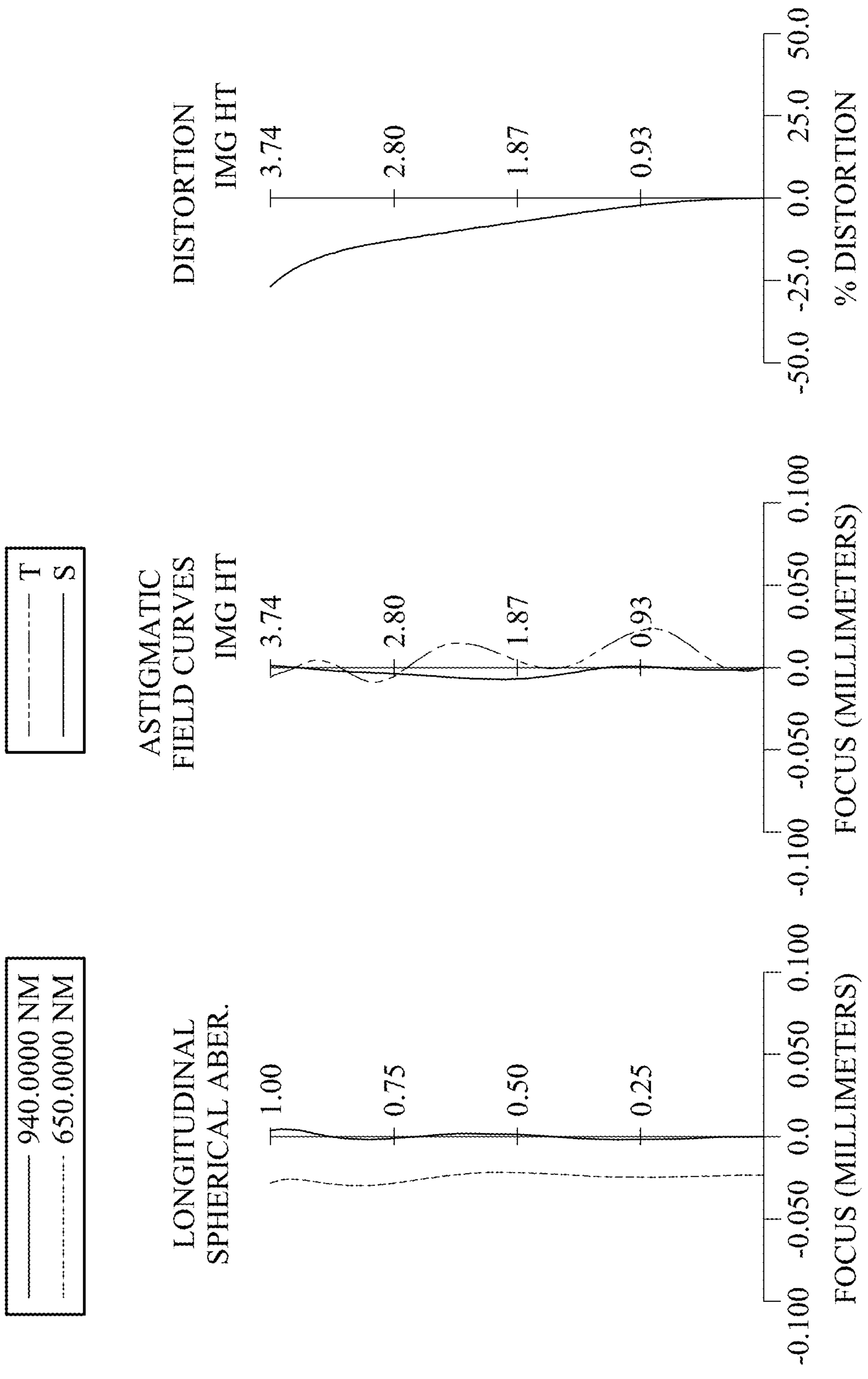
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The image-side surface of the third lens element E3 has one critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has one inflection point. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system.

The detailed optical data of the 6th embodiment are shown in Table 6A and the aspheric surface data are shown in Table 6B below.

TABLE 6A

6th Embodiment
f = 3.19 mm, Fno = 1.75, HFOV = 58.0 deg.

| Surface # | | Curvature Radius | | Thickness | Material | Index 940.0 nm | Index d-line | Abbe # | Focal Length 940.0 nm | Focal Length d-line |
|---|---|---|---|---|---|---|---|---|---|---|
| 0 | Object | Infinity | | Infinity | | | | | | |
| 1 | Lens 1 | −5.0837 | (ASP) | 1.093 | Plastic | 1.551 | 1.562 | 44.6 | −8.80 | −8.62 |
| 2 | | 110.3607 | (ASP) | 2.377 | | | | | | |
| 3 | Ape. Stop | Plano | | 0.162 | | | | | | |
| 4 | Lens 2 | −45.4545 | (ASP) | 0.882 | Plastic | 1.526 | 1.534 | 56.0 | 9.25 | 9.10 |
| 5 | | −4.4205 | (ASP) | 0.050 | | | | | | |
| 6 | Lens 3 | −8.6495 | (ASP) | 0.400 | Plastic | 1.664 | 1.697 | 16.3 | −10.30 | −9.81 |
| 7 | | 33.3041 | (ASP) | 0.221 | | | | | | |
| 8 | Lens 4 | 8.7836 | (ASP) | 3.200 | Plastic | 1.553 | 1.567 | 37.4 | 12.09 | 11.81 |
| 9 | | −24.3902 | (ASP) | 0.102 | | | | | | |
| 10 | Lens 5 | 14.6007 | (ASP) | 1.522 | Plastic | 1.526 | 1.534 | 56.0 | 4.37 | 4.30 |
| 11 | | −2.6260 | (ASP) | −1.768 | | | | | | |
| 12 | Stop | Plano | | 1.818 | | | | | | |
| 13 | Lens 6 | 2.2687 | (ASP) | 0.870 | Plastic | 1.664 | 1.697 | 16.3 | −10.06 | −9.79 |
| 14 | | 1.4344 | (ASP) | 2.553 | | | | | | |
| 15 | Filter | Plano | | 0.400 | Glass | 1.508 | 1.517 | 64.2 | — | — |
| 16 | | Plano | | 0.316 | | | | | | |
| 17 | Image | Plano | | — | | | | | | |

Note:
Reference wavelength is 940.0 nm.
An effective radius of the stop S1 (Surface 12) is 3.585 mm.
When reference wavelength is 587.6 nm (d-line), fd = 3.13 mm, HFOVd = 59.2 degrees, TLd = 14.17 mm, SLd = 10.70 mm, and BLd = 3.24 mm.

TABLE 6B

Aspheric Coefficients

| Surface # | 1 | 2 | 4 | 5 | 6 | 7 |
|---|---|---|---|---|---|---|
| k = | 3.23510E−01 | −9.00000E+01 | 9.00000E+01 | 2.04842E+00 | 2.55537E−02 | 7.46499E+01 |
| A4 = | 2.54854E−02 | 2.74265E−02 | −4.69128E−03 | −4.68351E−02 | −5.73406E−02 | −3.47286E−02 |
| A6 = | −3.52137E−03 | −1.81935E−03 | −3.50705E−03 | 1.87520E−02 | 1.81247E−02 | 1.08814E−02 |
| A8 = | 4.43371E−04 | −5.33750E−05 | 1.32719E−03 | −6.48429E−03 | −2.60612E−03 | −1.12424E−03 |
| A10 = | −3.92520E−05 | 7.29974E−05 | −1.18887E−03 | 2.74890E−04 | −1.01747E−03 | −2.65958E−05 |
| A12 = | 2.27240E−06 | −7.85699E−06 | — | 4.67815E−05 | 3.10937E−04 | 8.27487E−06 |
| A14 = | −7.59769E−08 | 2.17878E−07 | — | — | — | — |
| A16 = | 1.11755E−09 | — | — | — | — | — |

| Surface # | 8 | 9 | 10 | 11 | 13 | 14 |
|---|---|---|---|---|---|---|
| k = | 3.63058E+00 | −9.00000E+01 | 8.80339E+00 | −5.24353E−01 | −1.72573E+00 | −2.85842E+00 |
| A4 = | −2.33502E−02 | −9.41776E−02 | −8.54432E−02 | 3.14457E−02 | −4.82213E−03 | 1.01592E−02 |
| A6 = | 5.94936E−03 | 3.54103E−02 | 3.33862E−02 | −8.57175E−03 | −6.61026E−04 | −3.68170E−03 |
| A8 = | −7.04417E−04 | −8.47747E−03 | −7.59630E−03 | 2.00804E−03 | 2.80072E−05 | 5.44340E−04 |
| A10 = | 4.34198E−05 | 1.29533E−03 | 1.08114E−03 | −2.96246E−04 | 9.97294E−06 | −5.39541E−05 |
| A12 = | −1.16297E−06 | −1.24367E−04 | −9.64940E−05 | 2.58481E−05 | −2.71692E−06 | 3.45832E−06 |
| A14 = | — | 6.82406E−06 | 4.85147E−06 | −1.24544E−06 | 2.55630E−07 | −1.28650E−07 |
| A16 = | — | −1.60225E−07 | −1.02563E−07 | 2.61914E−08 | −8.19310E−09 | 2.04514E−09 |

In the 6th embodiment, the equation of the aspheric surface profiles of the aforementioned lens elements is the same as the equation of the 1st embodiment. Also, the definitions of these parameters shown in Table 60 below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Values of Optical and Physical Parameters/Definitions | | | |
|---|---|---|---|
| fd [mm] | 3.13 | \|f3d/f5d\| | 2.28 |
| Fno | 1.75 | ΣCT/TD | 0.73 |
| HFOVd [deg.] | 59.2 | CT4/CT2 | 3.63 |
| FOVd [deg.] | 118.3 | (CT2 + CT3)/CT4 | 0.40 |
| TLd [mm] | 14.17 | \|R8/R3\| | 0.54 |
| SLd [mm] | 10.70 | \|R8/R9\| | 1.67 |
| BLd [mm] | 3.24 | \|R9/R2\| | 0.13 |
| TLd/ImgH | 3.79 | (R5 + R6)/(R5 − R6) | −0.59 |
| BLd/ImgH | 0.87 | Vd5/Nd5 | 36.5 |
| TD/fd | 3.49 | Vd6/Nd6 | 9.6 |
| SLd/fd | 3.42 | ET5d/CT5 | 0.40 |
| SLd/TLd | 0.76 | SAG6R2d/CT6 | 1.57 |
| fd/f4d | 0.27 | — | — |

7th Embodiment

Figure 13:
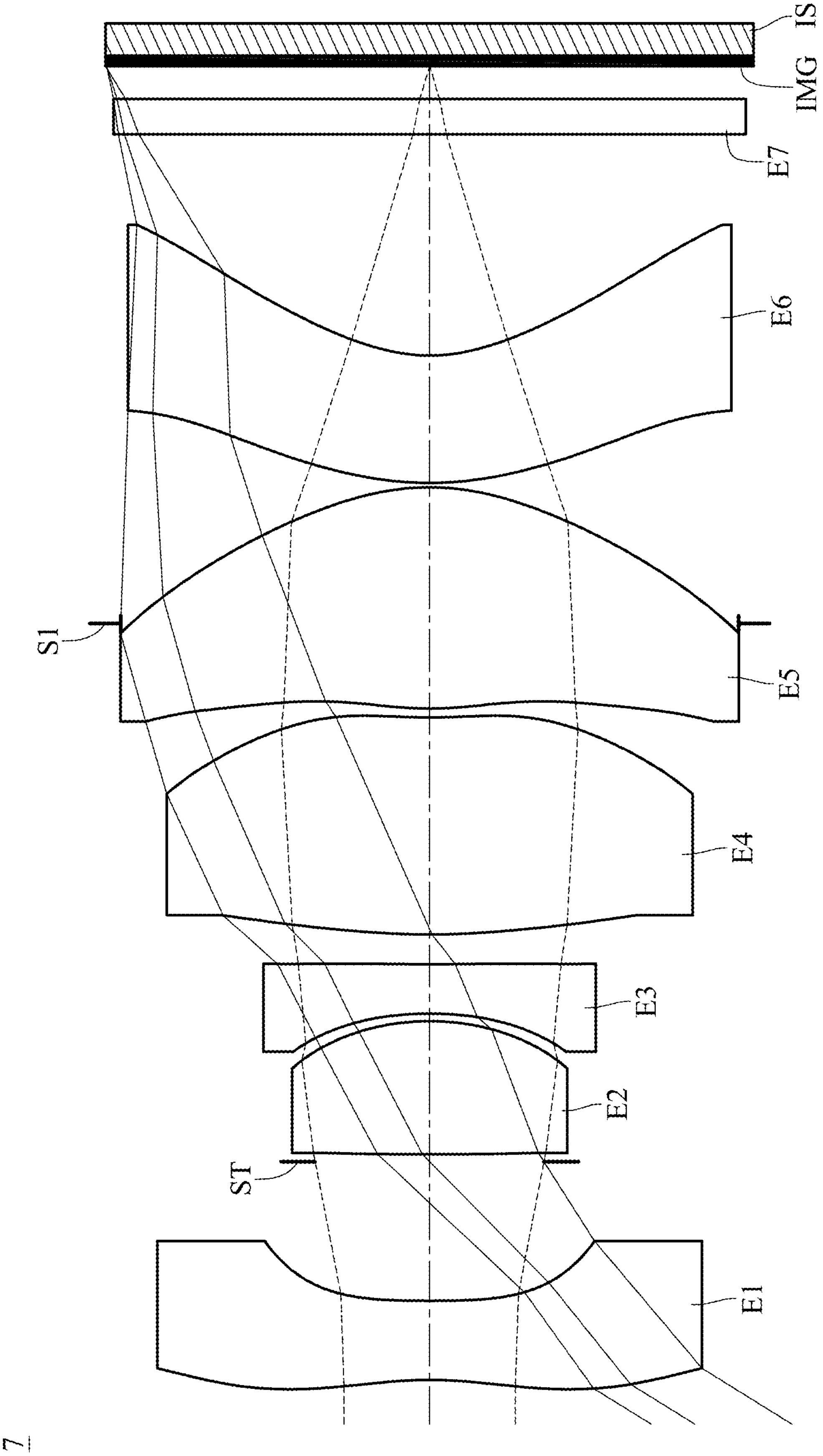
FIG. 13 is a schematic view of an image capturing unit according to the 7th embodiment of the present disclosure.
Figure 14:
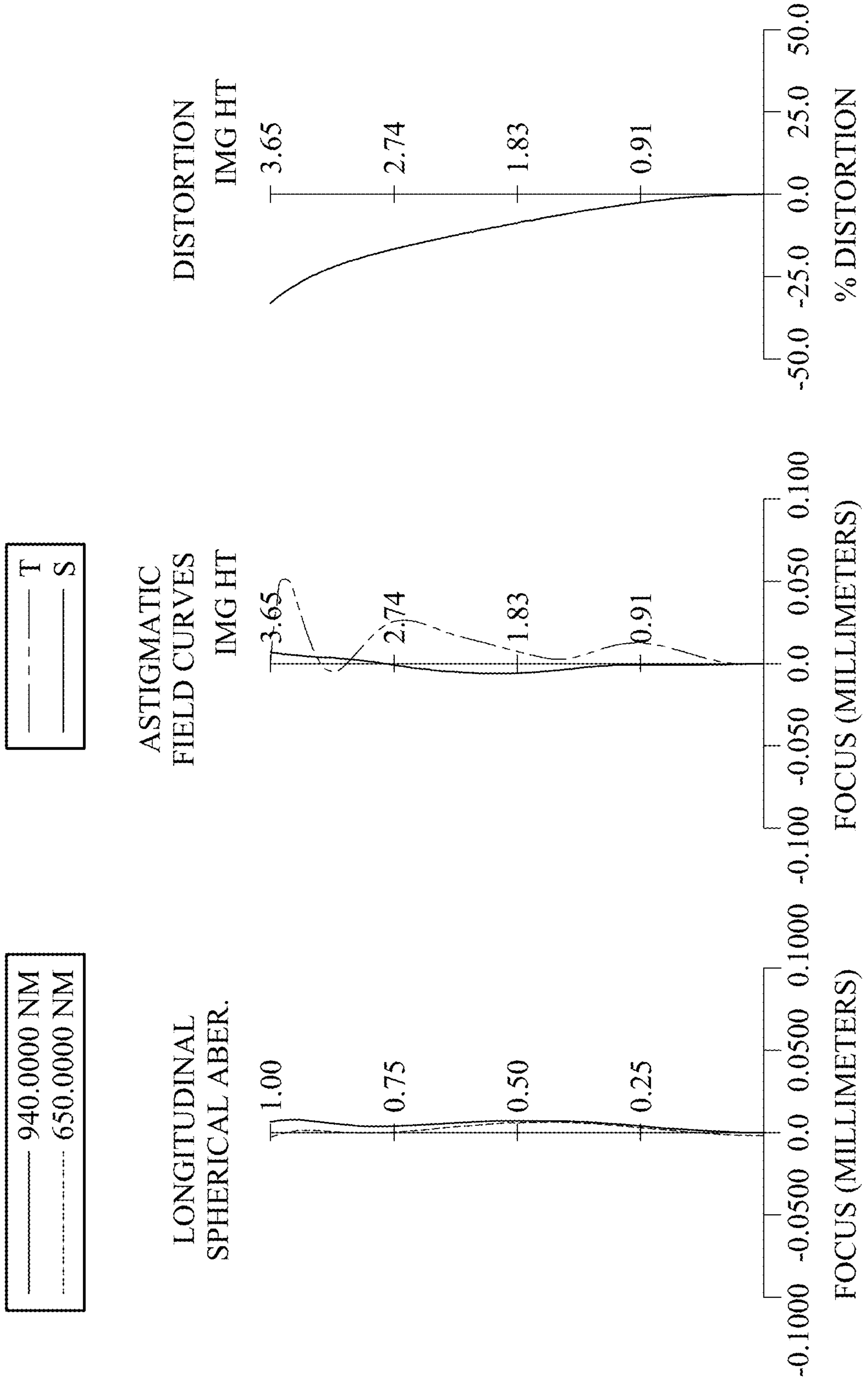
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The object-side surface of the first lens element E1 has one critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The image-side surface of the third lens element E3 has two inflection points. The image-side surface of the third lens element E3 has two critical points in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system.

The detailed optical data of the 7th embodiment are shown in Table 7A and the aspheric surface data are shown in Table 7B below.

TABLE 7A

| 7th Embodiment<br>f = 3.39 mm, Fno = 1.75, HFOV = 58.2 deg. | | | | | | | | | | |
|---|---|---|---|---|---|---|---|---|---|---|
| Surface | | | | | | Index | | Abbe | Focal Length | |
| # | | Curvature Radius | | Thickness | Material | 940.0 nm | d-line | # | 940.0 nm | d-line |
| 0 | Object | Infinity | | Infinity | | | | | | |
| 1 | Lens 1 | −4.5598 | (ASP) | 0.894 | Plastic | 1.536 | 1.545 | 56.1 | −6.65 | −6.54 |
| 2 | | 17.5020 | (ASP) | 1.571 | | | | | | |
| 3 | Ape. Stop | Plano | | 0.085 | | | | | | |
| 4 | Lens 2 | 84.0011 | (ASP) | 1.504 | Plastic | 1.535 | 1.544 | 56.0 | 5.12 | 5.03 |
| 5 | | −2.8127 | (ASP) | 0.085 | | | | | | |
| 6 | Lens 3 | −4.0097 | (ASP) | 0.558 | Plastic | 1.616 | 1.639 | 23.5 | −5.44 | −5.24 |
| 7 | | 21.3910 | (ASP) | 0.337 | | | | | | |
| 8 | Lens 4 | 7.9475 | (ASP) | 2.452 | Plastic | 1.535 | 1.544 | 56.0 | −112.92 | −112.34 |
| 9 | | 6.2684 | (ASP) | 0.101 | | | | | | |
| 10 | Lens 5 | 3.7287 | (ASP) | 2.500 | Plastic | 1.535 | 1.544 | 56.0 | 3.39 | 3.34 |
| 11 | | −2.7037 | (ASP) | −1.538 | | | | | | |
| 12 | Stop | Plano | | 1.588 | | | | | | |
| 13 | Lens 6 | 3.8011 | (ASP) | 1.440 | Plastic | 1.616 | 1.639 | 23.5 | −8.83 | −8.60 |
| 14 | | 1.9146 | (ASP) | 2.500 | | | | | | |
| 15 | Filter | Plano | | 0.400 | Glass | 1.508 | 1.517 | 64.2 | — | — |
| 16 | | Plano | | 0.369 | | | | | | |
| 17 | Image | Plano | | — | | | | | | |

Note:
Reference wavelength is 940.0 nm.
An effective radius of the stop S1 (Surface 12) is 3.490 mm.
When reference wavelength is 587.6 nm (d-line), fd = 3.34 mm, HFOVd = 59.0 degrees, TLd = 14.84 mm, SLd = 12.38 mm, and BLd = 3.27 mm.

TABLE 7B

Aspheric Coefficients

| Surface # | 1 | 2 | 4 | 5 | 6 | 7 |
|---|---|---|---|---|---|---|
| k = | 7.39724E−01 | −9.00000E+01 | 3.22792E+00 | −2.43614E+00 | −8.72299E+00 | 8.30835E+01 |
| A4 = | 4.52688E−02 | 5.65592E−02 | 6.10188E−03 | −3.25564E−02 | −6.01902E−02 | −2.99222E−02 |
| A6 = | −9.87283E−03 | −5.13497E−03 | −1.88269E−03 | 1.68283E−02 | 3.03923E−02 | 1.60233E−02 |
| A8 = | 2.00174E−03 | −5.71009E−04 | 7.09299E−04 | −9.33989E−03 | −1.26951E−02 | −4.84101E−03 |
| A10 = | −2.91274E−04 | 1.02903E−03 | −5.97071E−04 | 1.85584E−03 | 2.08694E−03 | 7.59765E−04 |
| A12 = | 2.77401E−05 | −2.33749E−04 | — | −1.41660E−04 | −6.12824E−05 | −4.85518E−05 |
| A14 = | −1.53001E−06 | 1.62339E−05 | — | — | — | — |
| A16 = | 3.72626E−08 | — | — | — | — | — |

| Surface # | 8 | 9 | 10 | 11 | 13 | 14 |
|---|---|---|---|---|---|---|
| k = | 2.68745E+00 | 2.35261E+00 | −1.08763E+00 | −5.13108E−01 | −7.84760E−01 | −3.85329E+00 |
| A4 = | −1.54610E−02 | −9.32510E−02 | −7.95035E−02 | 1.85629E−02 | −9.23438E−03 | 2.98155E−03 |
| A6 = | 4.87544E−03 | 2.72553E−02 | 2.29228E−02 | −2.67431E−03 | 2.17019E−03 | 1.92664E−04 |
| A8 = | −9.36635E−04 | −5.65148E−03 | −4.23660E−03 | 4.04299E−04 | −5.69148E−04 | −1.45560E−04 |
| A10 = | 8.70810E−05 | 8.11773E−04 | 5.26008E−04 | −4.29334E−05 | 8.93273E−05 | 3.06268E−05 |
| A12 = | −3.12714E−06 | −7.66430E−05 | −4.25396E−05 | 3.23395E−06 | −8.78839E−06 | −4.15032E−06 |
| A14 = | — | 4.15531E−06 | 1.98999E−06 | −1.53354E−07 | 4.80803E−07 | 2.97944E−07 |
| A16 = | — | −9.68944E−08 | −4.02274E−08 | 3.56111E−09 | −1.08534E−08 | −8.37623E−09 |

In the 7th embodiment, the equation of the aspheric surface profiles of the aforementioned lens elements is the same as the equation of the 1st embodiment. Also, the definitions of these parameters shown in Table 70 below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Optical and Physical Parameters/Definitions | | | |
|---|---|---|---|
| fd [mm] | 3.34 | \|f3d/f5d\| | 1.57 |
| Fno | 1.75 | ΣCT/TD | 0.81 |
| HFOVd [deg.] | 59.0 | CT4/CT2 | 1.63 |
| FOVd [deg.] | 118.1 | (CT2 + CT3)/CT4 | 0.84 |
| TLd [mm] | 14.84 | \|R8/R3\| | 0.07 |
| SLd [mm] | 12.38 | \|R8/R9\| | 1.68 |
| BLd [mm] | 3.27 | \|R9/R2\| | 0.21 |

TABLE 7C-continued

| Values of Optical and Physical Parameters/Definitions | | | |
|---|---|---|---|
| TLd/ImgH | 4.07 | (R5 + R6)/(R5 − R6) | −0.68 |
| BLd/ImgH | 0.90 | Vd5/Nd5 | 36.3 |
| TD/fd | 3.47 | Vd6/Nd6 | 14.3 |
| SLd/fd | 3.71 | ET5d/CT5 | 0.40 |
| SLd/TLd | 0.83 | SAG6R2d/CT6 | 1.02 |
| fd/f4d | −0.03 | — | — |

8th Embodiment

Figure 15:
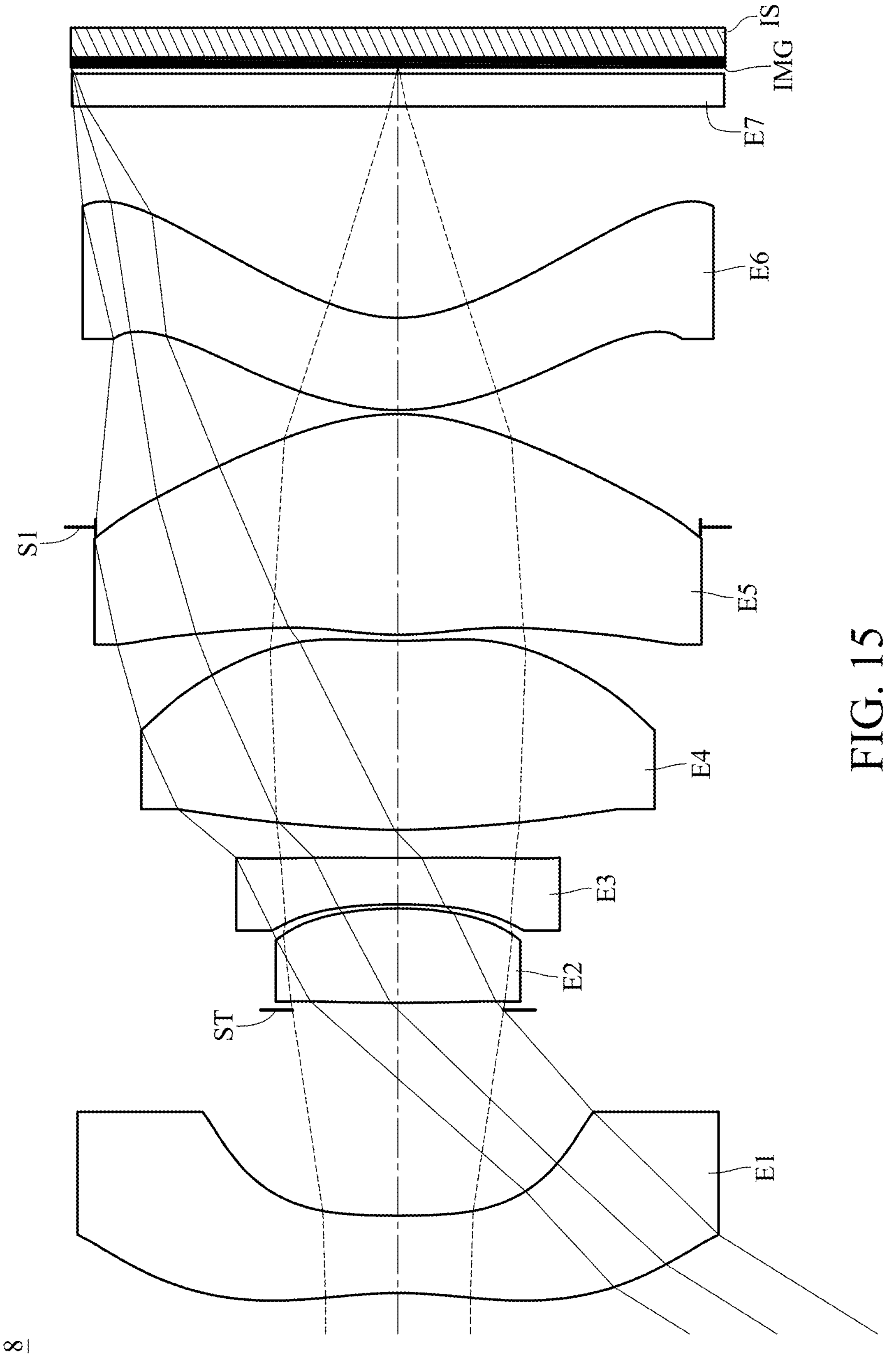
FIG. 15 is a schematic view of an image capturing unit according to the 8th embodiment of the present disclosure.
Figure 16:
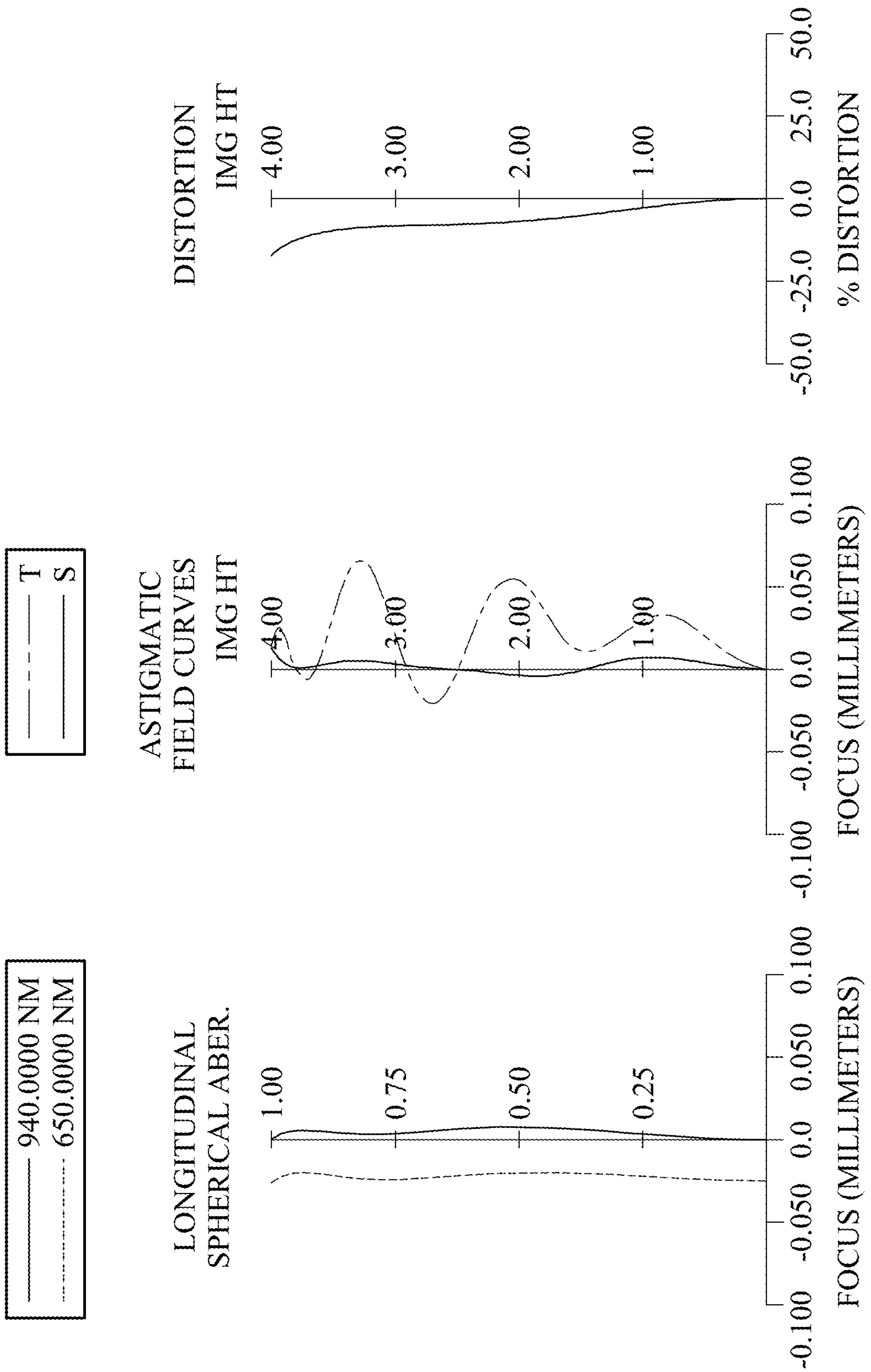
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point. The object-side surface of the first lens element E1 has one critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The image-side surface of the third lens element E3 has two inflection points. The image-side surface of the third lens element E3 has two critical points in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system.

The detailed optical data of the 8th embodiment are shown in Table 8A and the aspheric surface data are shown in Table 8B below.

TABLE 8A

| 8th Embodiment<br>f = 3.01 mm, Fno = 1.70, HFOV = 58.0 deg. | | | | | | | | | |
|---|---|---|---|---|---|---|---|---|---|
| Surface | | | | | Index | | Abbe | Focal Length | |
| # | | Curvature Radius | Thickness | Material | 940.0 nm | d-line | # | 940.0 nm | d-line |
| 0 | Object | Infinity | Infinity | | | | | | |
| 1 | Lens 1 | −5.1858 (ASP) | 0.947 | Plastic | 1.535 | 1.544 | 56.0 | −6.96 | −6.85 |
| 2 | | 14.0764 (ASP) | 2.517 | | | | | | |
| 3 | Ape. Stop | Plano | 0.088 | | | | | | |
| 4 | Lens 2 | 29.8248 (ASP) | 1.154 | Plastic | 1.526 | 1.534 | 56.0 | 7.33 | 7.21 |
| 5 | | −4.3640 (ASP) | 0.050 | | | | | | |

TABLE 8A-continued

| 8th Embodiment f = 3.01 mm, Fno = 1.70, HFOV = 58.0 deg. | | | | | | | | | | |
|---|---|---|---|---|---|---|---|---|---|---|
| Surface | | | | | Index | | Abbe | Focal Length | |
| # | | Curvature Radius | | Thickness | Material | 940.0 nm | d-line | # | 940.0 nm | d-line |
| 6 | Lens 3 | −6.9881 | (ASP) | 0.566 | Plastic | 1.616 | 1.639 | 23.5 | −8.55 | −8.24 |
| 7 | | 22.0040 | (ASP) | 0.346 | | | | | | |
| 8 | Lens 4 | 8.0568 | (ASP) | 2.311 | Plastic | 1.540 | 1.551 | 44.8 | −100.55 | −99.68 |
| 9 | | 6.3100 | (ASP) | 0.077 | | | | | | |
| 10 | Lens 5 | 3.7288 | (ASP) | 2.700 | Plastic | 1.526 | 1.534 | 56.0 | 3.51 | 3.46 |
| 11 | | −2.7486 | (ASP) | −1.384 | | | | | | |
| 12 | Stop | Plano | | 1.434 | | | | | | |
| 13 | Lens 6 | 2.8781 | (ASP) | 1.127 | Plastic | 1.616 | 1.639 | 23.5 | −12.02 | −11.76 |
| 14 | | 1.7632 | (ASP) | 2.588 | | | | | | |
| 15 | Filter | Plano | | 0.400 | Glass | 1.508 | 1.517 | 64.2 | — | — |
| 16 | | Plano | | 0.079 | | | | | | |
| 17 | Image | Plano | | — | | | | | | |

Note:
Reference wavelength is 940.0 nm.
An effective radius of the stop S1 (Surface 12) is 3.700 mm.
When reference wavelength is 587.6 nm (d-line), fd = 2.95 mm, HFOVd = 59.1 degrees, TLd = 14.97 mm, SLd = 11.50 mm, and BLd = 3.03 mm.

TABLE 8B

Aspheric Coefficients

| Surface # | 1 | 2 | 4 | 5 | 6 | 7 |
|---|---|---|---|---|---|---|
| k = | 5.75787E−01 | −9.00000E+01 | 2.50869E−01 | −1.00088E+00 | −1.77555E+01 | 8.50069E+01 |
| A4 = | 3.60085E−02 | 4.56332E−02 | 2.17666E−03 | −1.06980E−02 | −3.40695E−02 | −3.06702E−02 |
| A6 = | −6.08205E−03 | −4.19000E−03 | −3.70914E−03 | −4.14333E−03 | 6.26392E−03 | 1.34539E−02 |
| A8 = | 8.97660E−04 | 6.35538E−04 | 1.51877E−03 | −3.88842E−03 | −5.16279E−03 | −3.16434E−03 |
| A10 = | −9.14054E−05 | −1.24005E−04 | −9.22258E−04 | 1.62035E−03 | 1.39133E−03 | 4.12366E−04 |
| A12 = | 5.99164E−06 | 4.52412E−05 | — | −2.18813E−04 | −6.26227E−05 | −2.34653E−05 |
| A14 = | −2.25252E−07 | −5.40241E−06 | — | — | — | — |
| A16 = | 3.69336E−09 | — | — | — | — | — |
| Surface # | 8 | 9 | 10 | 11 | 13 | 14 |
| k = | 2.57203E+00 | 2.32846E+00 | −9.74240E−01 | −5.21380E−01 | −1.20439E+00 | −3.90767E+00 |
| A4 = | −2.00201E−02 | −9.10238E−02 | −7.68392E−02 | 2.23451E−02 | −1.42887E−02 | 8.78305E−04 |
| A6 = | 6.30447E−03 | 2.55689E−02 | 2.21235E−02 | −3.22079E−03 | 4.17349E−03 | 8.30734E−04 |
| A8 = | −1.04634E−03 | −5.13374E−03 | −4.15033E−03 | 4.51889E−04 | −1.02974E−03 | −2.73542E−04 |
| A10 = | 8.10918E−05 | 7.02883E−04 | 5.21105E−04 | −4.78593E−05 | 1.52991E−04 | 3.24196E−05 |
| A12 = | −2.32749E−06 | −6.18293E−05 | −4.18726E−05 | 4.03873E−06 | −1.43259E−05 | −1.90469E−06 |
| A14 = | — | 3.02731E−06 | 1.90910E−06 | −2.17866E−07 | 7.69339E−07 | 5.11725E−08 |
| A16 = | — | −6.10144E−08 | −3.69503E−08 | 5.18858E−09 | −1.79783E−08 | −4.69640E−10 |

In the 8th embodiment, the equation of the aspheric surface profiles of the aforementioned lens elements is the same as the equation of the 1st embodiment. Also, the definitions of these parameters shown in Table 80 below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

| Values of Optical and Physical Parameters/Definitions | | | |
|---|---|---|---|
| fd [mm] | 2.95 | \|f3d/f5d\| | 2.38 |
| Fno | 1.70 | ΣCT/TD | 0.74 |
| HFOVd [deg.] | 59.1 | CT4/CT2 | 2.00 |
| FOVd [deg.] | 118.2 | (CT2 + CT3)/CT4 | 0.74 |
| TLd [mm] | 14.97 | \|R8/R3\| | 0.21 |
| SLd [mm] | 11.50 | \|R8/R9\| | 1.69 |

TABLE 8C-continued

| Values of Optical and Physical Parameters/Definitions | | | |
|---|---|---|---|
| BLd [mm] | 3.03 | \|R9/R2\| | 0.26 |
| TLd/ImgH | 3.74 | (R5 + R6)/(R5 − R6) | −0.52 |
| BLd/ImgH | 0.76 | Vd5/Nd5 | 36.5 |
| TD/fd | 4.04 | Vd6/Nd6 | 14.3 |
| SLd/fd | 3.89 | ET5d/CT5 | 0.48 |
| SLd/TLd | 0.77 | SAG6R2d/CT6 | 1.23 |
| fd/f4d | −0.03 | — | — |

9th Embodiment

Figure 17:
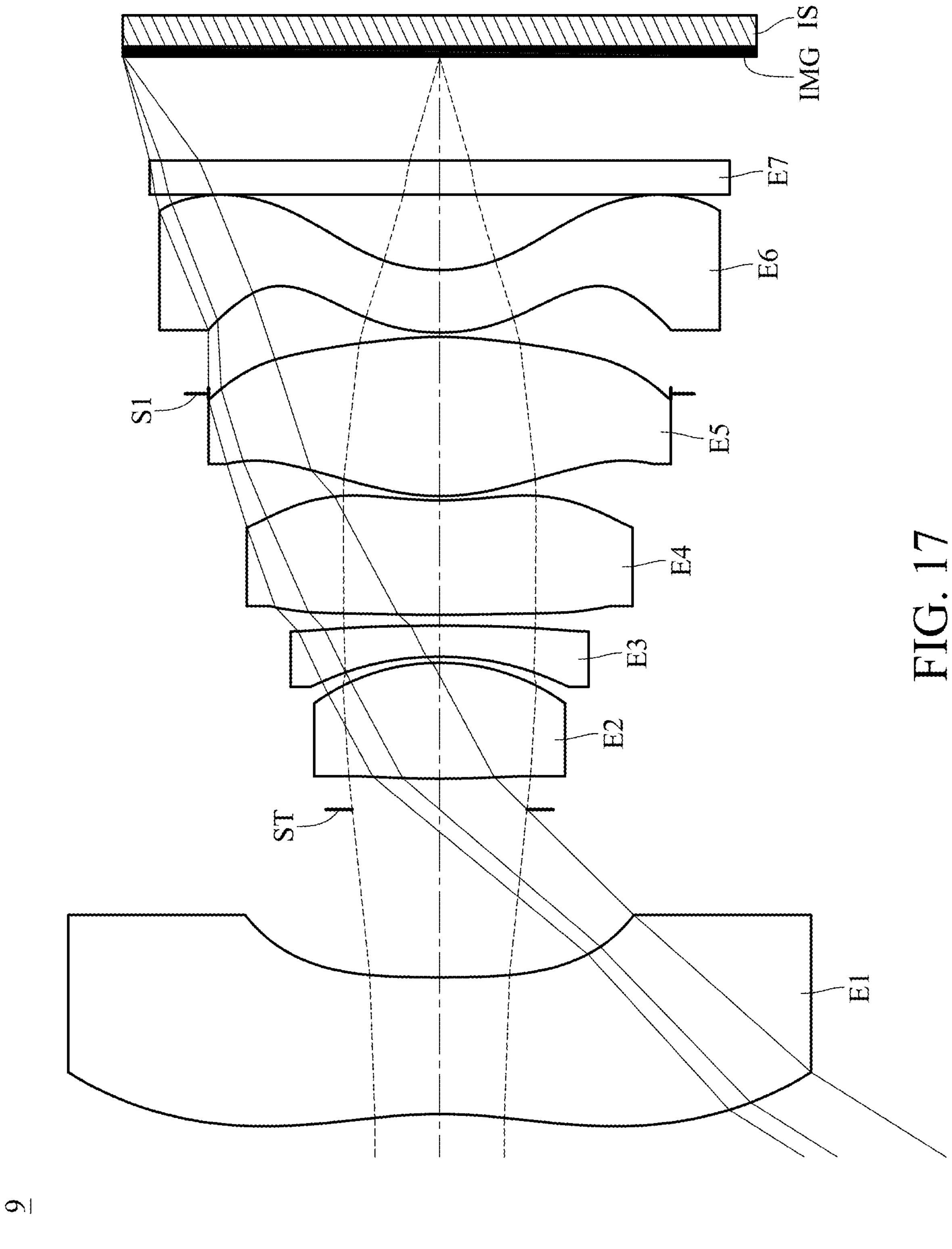
FIG. 17 is a schematic view of an image capturing unit according to the 9th embodiment of the present disclosure.
Figure 18:
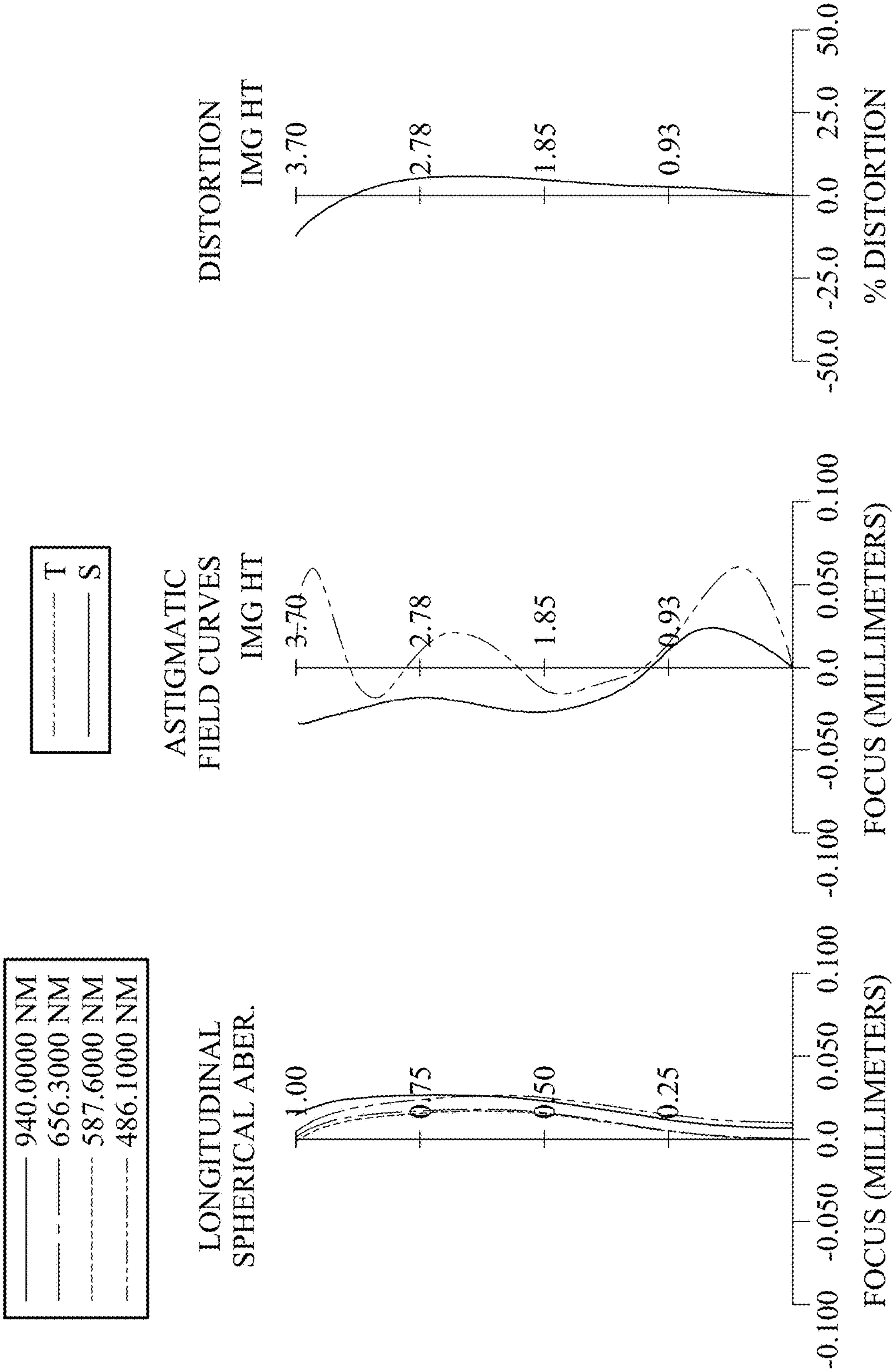
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The object-side surface of the first lens element E1 has one critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The object-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point. The object-side surface of the fifth lens element E5 has one critical point in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system.

The detailed optical data of the 9th embodiment are shown in Table 9A and the aspheric surface data are shown in Table 9B below.

TABLE 9A

9th Embodiment
fd = 2.64 mm, Fno = 1.75, HFOVd = 58.0 deg.

| Surface # | | Curvature Radius | | Thickness | Material | Index | Abbe # | Focal Length |
|---|---|---|---|---|---|---|---|---|
| 0 | Object | Infinity | | Infinity | | | | |
| 1 | Lens 1 | −5.5966 | (ASP) | 1.598 | Plastic | 1.544 | 56.0 | −7.97 |
| 2 | | 21.1422 | (ASP) | 1.961 | | | | |
| 3 | Ape. Stop | Plano | | 0.361 | | | | |
| 4 | Lens 2 | 11.3268 | (ASP) | 1.354 | Plastic | 1.562 | 44.6 | 4.00 |
| 5 | | −2.6819 | (ASP) | 0.072 | | | | |
| 6 | Lens 3 | −3.6798 | (ASP) | 0.362 | Plastic | 1.697 | 16.3 | −5.91 |
| 7 | | −35.5569 | (ASP) | 0.127 | | | | |
| 8 | Lens 4 | 18.0024 | (ASP) | 1.338 | Plastic | 1.551 | 44.8 | −10.25 |
| 9 | | 4.1842 | (ASP) | 0.050 | | | | |
| 10 | Lens 5 | 2.5220 | (ASP) | 1.862 | Plastic | 1.544 | 56.0 | 3.21 |
| 11 | | −4.1908 | (ASP) | −0.664 | | | | |
| 12 | Stop | Plano | | 0.714 | | | | |
| 13 | Lens 6 | 2.3048 | (ASP) | 0.731 | Plastic | 1.686 | 18.4 | 90.42 |
| 14 | | 2.0848 | (ASP) | 0.881 | | | | |
| 15 | Filter | Plano | | 0.400 | Glass | 1.517 | 64.2 | — |
| 16 | | Plano | | 1.213 | | | | |
| 17 | Image | Plano | | — | | | | |

Note:
Reference wavelength is 587.6 nm (d-line).
An effective radius of the stop S1 (Surface 12) is 2.702 mm.
TLd = 12.36 mm, SLd = 8.80 mm, and BLd = 2.49 mm.

TABLE 9B

| Aspheric Coefficients | | | | | | |
|---|---|---|---|---|---|---|
| Surface # | 1 | 2 | 4 | 5 | 6 | 7 |
| k = | 5.05023E−01 | −8.56042E+01 | −8.87976E+01 | −2.67700E+00 | −1.91394E+01 | −4.77608E+00 |
| A4 = | 2.24000E−02 | 2.51360E−02 | −7.85757E−03 | −4.74079E−02 | −6.92128E−02 | −8.45630E−03 |
| A6 = | −3.00000E−03 | 1.38336E−03 | 2.74976E−03 | 2.93494E−02 | 4.19098E−02 | 5.69009E−04 |
| A8 = | 3.58731E−04 | −2.07918E−03 | −4.67640E−03 | −1.34931E−02 | −1.99551E−02 | 4.61954E−04 |
| A10 = | −2.99415E−05 | 7.45687E−04 | 5.95332E−04 | 2.63384E−03 | 5.36563E−03 | 2.63597E−05 |
| A12 = | 1.63868E−06 | −1.16985E−04 | — | −2.03847E−04 | −5.33905E−04 | −1.19315E−05 |
| A14 = | −5.20362E−08 | 7.43075E−06 | — | — | — | — |
| A16 = | 7.31332E−10 | — | — | — | — | — |
| Surface # | 8 | 9 | 10 | 11 | 13 | 14 |
| k = | 3.89896E+01 | 9.62855E−01 | −1.27853E+00 | 3.68175E−01 | −2.16599E+00 | −1.79392E+00 |
| A4 = | −2.04103E−02 | −6.63397E−02 | −3.18716E−02 | 6.46192E−02 | 6.50495E−02 | 8.31113E−02 |
| A6 = | 7.43698E−03 | −8.22708E−03 | −2.10825E−03 | −4.38944E−02 | −4.29816E−02 | −5.59139E−02 |
| A8 = | −7.18906E−04 | 1.20750E−02 | 4.50740E−03 | 2.02124E−02 | 9.22594E−03 | 1.59243E−02 |
| A10 = | 7.23020E−06 | −4.68012E−03 | −1.58454E−03 | −5.79161E−03 | −3.61148E−04 | −2.80739E−03 |
| A12 = | 1.44138E−06 | 9.68736E−04 | 2.58354E−04 | 1.00055E−03 | −4.48609E−04 | 3.33987E−04 |
| A14 = | — | −1.10023E−04 | −2.13708E−05 | −1.02345E−04 | 1.44516E−04 | −2.75141E−05 |
| A16 = | — | 6.31794E−06 | 7.97907E−07 | 5.72523E−06 | −2.08213E−05 | 1.53432E−06 |
| A18 = | — | −1.39502E−07 | −6.47469E−09 | −1.34435E−07 | 1.50648E−06 | −5.24208E−08 |
| A20 = | — | — | — | — | −4.46235E−08 | 8.20694E−10 |

In the 9th embodiment, the equation of the aspheric surface profiles of the aforementioned lens elements is the same as the equation of the 1st embodiment. Also, the definitions of these parameters shown in Table 90 below are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

| Values of Optical and Physical Parameters/Definitions | | | |
|---|---|---|---|
| fd [mm] | 2.64 | \|f3d/f5d\| | 1.84 |
| Fno | 1.75 | ΣCT/TD | 0.73 |
| HFOVd [deg.] | 58.0 | CT4/CT2 | 0.99 |
| FOVd [deg.] | 116.0 | (CT2 + CT3)/CT4 | 1.28 |
| TLd [mm] | 12.36 | \|R8/R3\| | 0.37 |
| SLd [mm] | 8.80 | \|R8/R9\| | 1.66 |
| BLd [mm] | 2.49 | \|R9/R2\| | 0.12 |
| TLd/ImgH | 3.34 | (R5 + R6)/(R5 − R6) | −1.23 |
| BLd/ImgH | 0.67 | Vd5/Nd5 | 36.3 |
| TD/fd | 3.74 | Vd6/Nd6 | 10.9 |
| SLd/fd | 3.34 | ET5d/CT5 | 0.41 |
| SLd/TLd | 0.71 | SAG6R2d/CT6 | 0.95 |
| fd/f4d | −0.26 | — | — |

10th Embodiment

Figure 19:
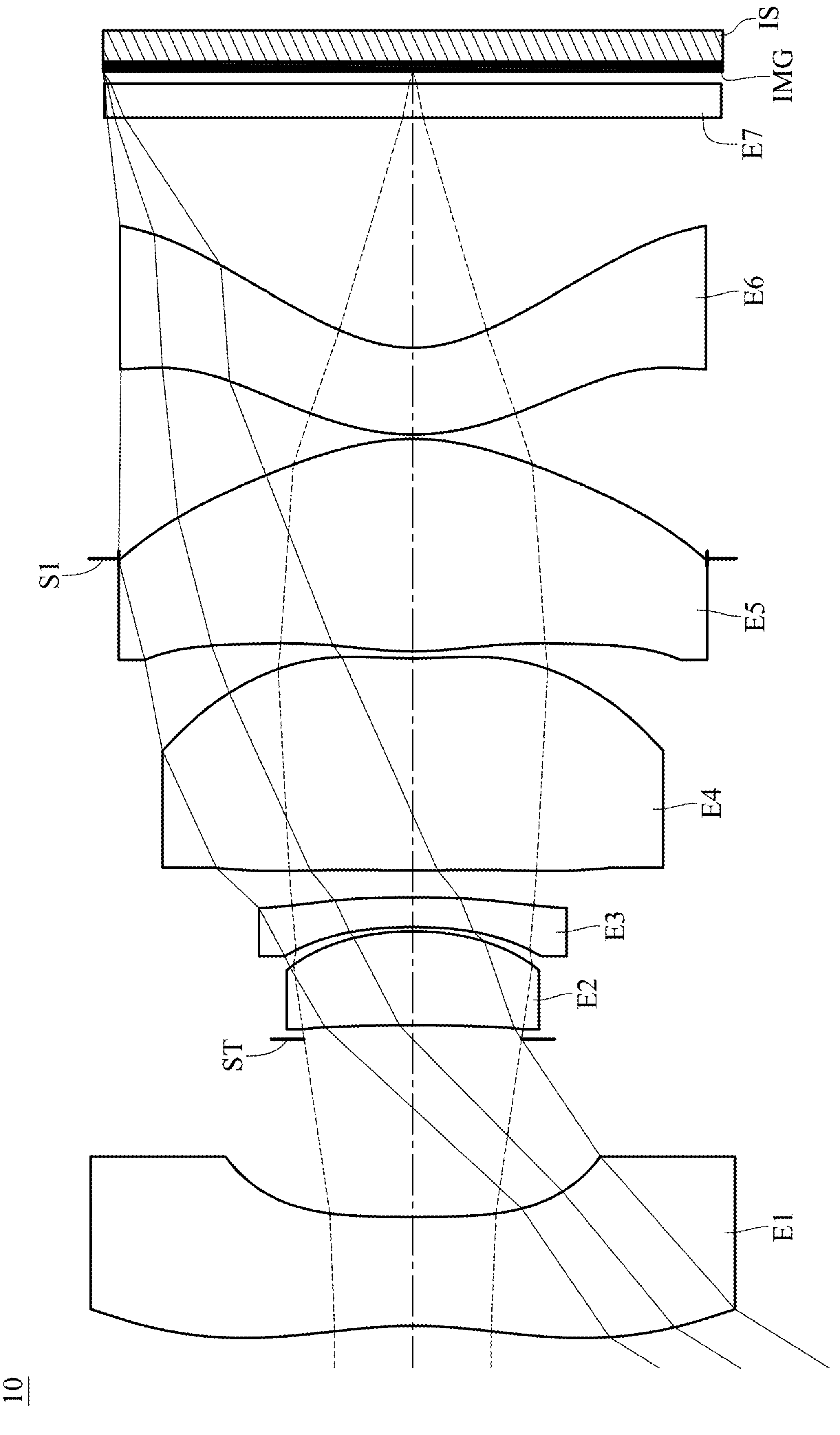
FIG. 19 is a schematic view of an image capturing unit according to the 10th embodiment of the present disclosure.
Figure 20:
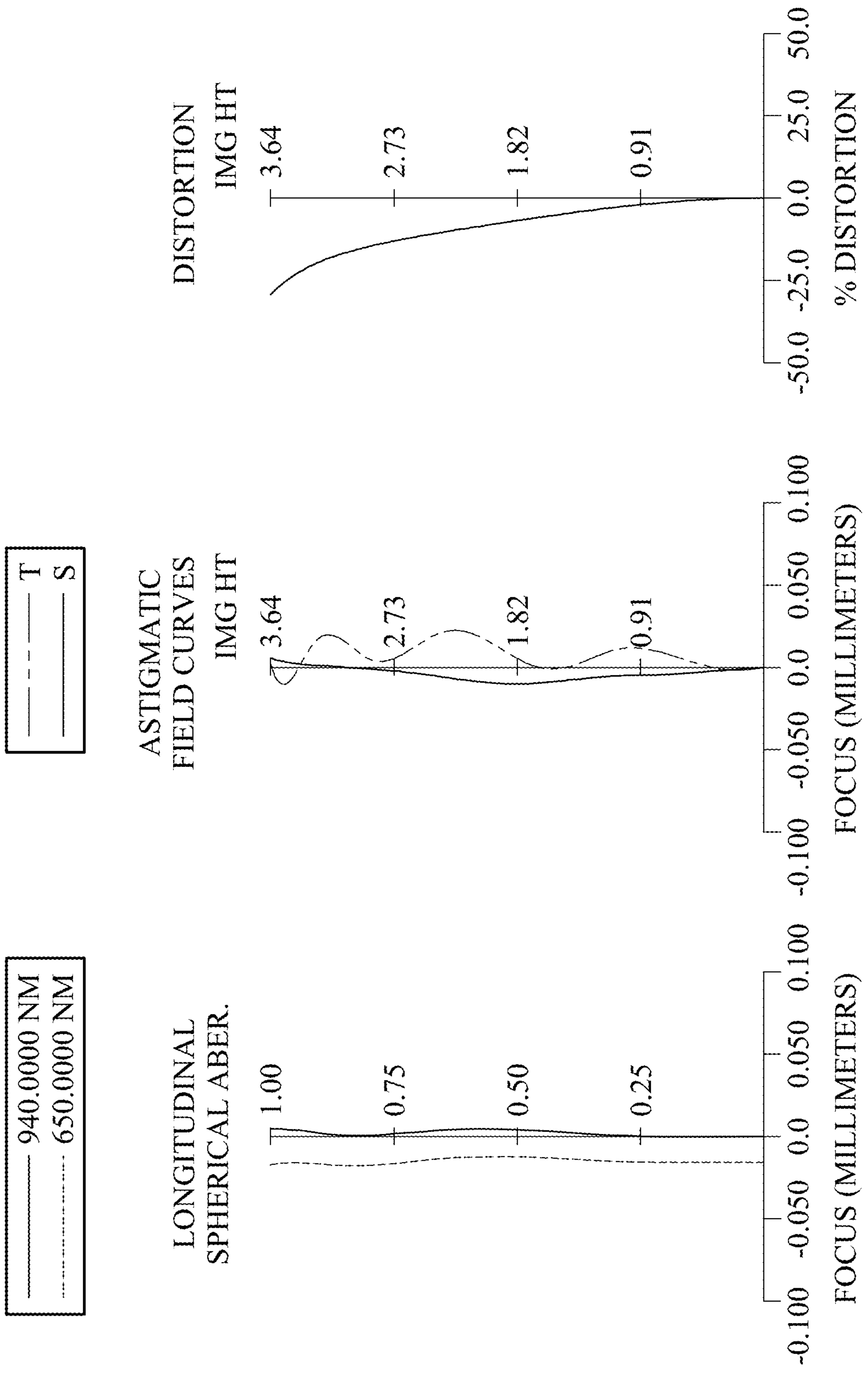
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point. The object-side surface of the fourth lens element E4 has two critical points in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system.

The detailed optical data of the 10th embodiment are shown in Table 10A and the aspheric surface data are shown in Table 10B below.

TABLE 10A

10th Embodiment
f = 3.22 mm, Fno = 1.75, HFOV = 58.0 deg.

| Surface # | | Curvature Radius | | Thickness | Material | Index 940.0 nm | Index d-line | Abbe # | Focal Length 940.0 nm | Focal Length d-line |
|---|---|---|---|---|---|---|---|---|---|---|
| 0 | Object | Infinity | | Infinity | | | | | | |
| 1 | Lens 1 | −5.2762 | (ASP) | 1.280 | Plastic | 1.594 | 1.614 | 26.0 | −7.56 | −7.31 |
| 2 | | 32.8196 | (ASP) | 2.092 | | | | | | |
| 3 | Ape. Stop | Plano | | 0.162 | | | | | | |
| 4 | Lens 2 | −24.3902 | (ASP) | 1.106 | Plastic | 1.526 | 1.534 | 56.0 | 6.88 | 6.77 |
| 5 | | −3.1997 | (ASP) | 0.050 | | | | | | |
| 6 | Lens 3 | −5.4101 | (ASP) | 0.350 | Plastic | 1.616 | 1.639 | 23.5 | −12.45 | −12.02 |
| 7 | | −18.8068 | (ASP) | 0.317 | | | | | | |
| 8 | Lens 4 | 28.3942 | (ASP) | 2.495 | Plastic | 1.540 | 1.551 | 44.8 | −16.64 | −16.32 |
| 9 | | 6.6145 | (ASP) | 0.082 | | | | | | |
| 10 | Lens 5 | 3.8137 | (ASP) | 2.500 | Plastic | 1.526 | 1.534 | 56.0 | 3.45 | 3.40 |
| 11 | | −2.6788 | (ASP) | −1.407 | | | | | | |
| 12 | Stop | Plano | | 1.457 | | | | | | |
| 13 | Lens 6 | 2.6202 | (ASP) | 1.020 | Plastic | 1.616 | 1.639 | 23.5 | −10.10 | −9.88 |
| 14 | | 1.5703 | (ASP) | 2.710 | | | | | | |
| 15 | Filter | Plano | | 0.400 | Glass | 1.508 | 1.517 | 64.2 | — | — |
| 16 | | Plano | | 0.141 | | | | | | |
| 17 | Image | Plano | | — | | | | | | |

Note:
Reference wavelength is 940.0 nm.
An effective radius of the stop S1 (Surface 12) is 3.462 mm.
When reference wavelength is 587.6 nm (d-line), fd = 3.15 mm, HFOVd = 59.5 degrees, TLd = 14.73 mm, SLd = 11.36 mm, and BLd = 3.23 mm.

TABLE 10B

Aspheric Coefficients

| Surface # | 1 | 2 | 4 | 5 | 6 | 7 |
|---|---|---|---|---|---|---|
| k = | 6.54228E−01 | −2.34265E+01 | 8.55887E+01 | −1.79730E+00 | −1.31415E+01 | −9.00000E+01 |
| A4 = | 2.54296E−02 | 2.98649E−02 | 1.30502E−03 | −2.62556E−02 | −5.02004E−02 | −3.38448E−02 |
| A6 = | −3.75318E−03 | −2.10384E−03 | −2.12153E−03 | 3.64925E−03 | 1.30285E−02 | 1.63523E−02 |
| A8 = | 5.34299E−04 | 1.42050E−04 | 9.07389E−04 | −1.20590E−03 | −1.53155E−03 | −3.05155E−03 |
| A10 = | −5.50008E−05 | 5.67497E−05 | −8.06477E−04 | −4.03704E−04 | −8.71984E−04 | 2.53406E−04 |
| A12 = | 3.75453E−06 | −5.42727E−06 | — | 8.16994E−05 | 2.37606E−04 | −5.74659E−06 |
| A14 = | −1.48602E−07 | 1.70290E−07 | — | — | — | — |
| A16 = | 2.59160E−09 | — | — | — | — | — |

| Surface # | 8 | 9 | 10 | 11 | 13 | 14 |
|---|---|---|---|---|---|---|
| k = | 9.00000E+01 | 2.68325E+00 | −9.35733E−01 | −5.27807E−01 | −1.76444E+00 | −3.14638E+00 |
| A4 = | −2.31486E−02 | −9.46858E−02 | −7.44584E−02 | 2.74534E−02 | −9.98184E−03 | 2.38086E−03 |
| A6 = | 8.80160E−03 | 2.73989E−02 | 2.32469E−02 | −5.09552E−03 | 1.68722E−03 | 1.11882E−04 |
| A8 = | −1.50163E−03 | −5.65656E−03 | −4.57407E−03 | 9.11259E−04 | −4.61794E−04 | −3.45109E−04 |
| A10 = | 1.29720E−04 | 7.71308E−04 | 5.76565E−04 | −1.13051E−04 | 6.33901E−05 | 7.36637E−05 |
| A12 = | −4.66943E−06 | −6.76072E−05 | −4.57832E−05 | 8.90665E−06 | −5.16194E−06 | −7.46123E−06 |
| A14 = | — | 3.43175E−06 | 2.05531E−06 | −4.01631E−07 | 2.52841E−07 | 3.79666E−07 |
| A16 = | — | −7.61950E−08 | −3.91664E−08 | 8.18709E−09 | −5.50560E−09 | −7.76285E−09 |

In the 10th embodiment, the equation of the aspheric surface profiles of the aforementioned lens elements is the same as the equation of the 1st embodiment. Also, the definitions of these parameters shown in Table 10C below are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE 10C

| Values of Optical and Physical Parameters/Definitions | | | |
|---|---|---|---|
| fd [mm] | 3.15 | \|f3d/f5d\| | 3.53 |
| Fno | 1.75 | ΣCT/TD | 0.76 |
| HFOVd [deg.] | 59.5 | CT4/CT2 | 2.26 |
| FOVd [deg.] | 119.0 | (CT2 + CT3)/CT4 | 0.58 |
| TLd [mm] | 14.73 | \|R8/R3\| | 0.27 |
| SLd [mm] | 11.36 | \|R8/R9\| | 1.73 |
| BLd [mm] | 3.23 | \|R9/R2\| | 0.12 |
| TLd/ImgH | 4.04 | (R5 + R6)/(R5 − R6) | −1.81 |
| BLd/ImgH | 0.89 | Vd5/Nd5 | 36.5 |
| TD/fd | 3.65 | Vd6/Nd6 | 14.3 |
| SLd/fd | 3.61 | ET5d/CT5 | 0.47 |
| SLd/TLd | 0.77 | SAG6R2d/CT6 | 1.41 |
| fd/f4d | −0.19 | — | — |

11th Embodiment

Figure 21:
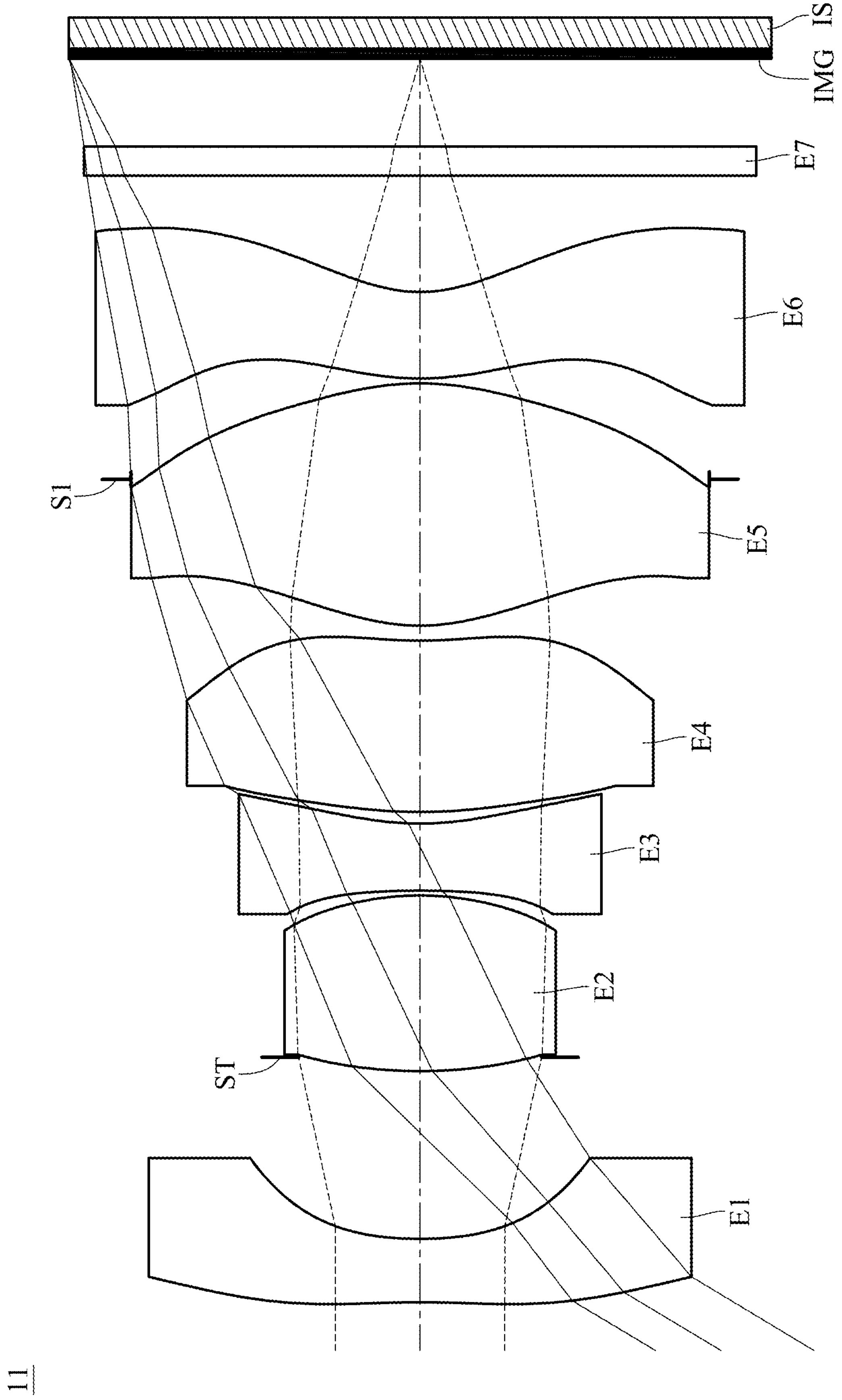
FIG. 21 is a schematic view of an image capturing unit according to the 11th embodiment of the present disclosure.
Figure 22:
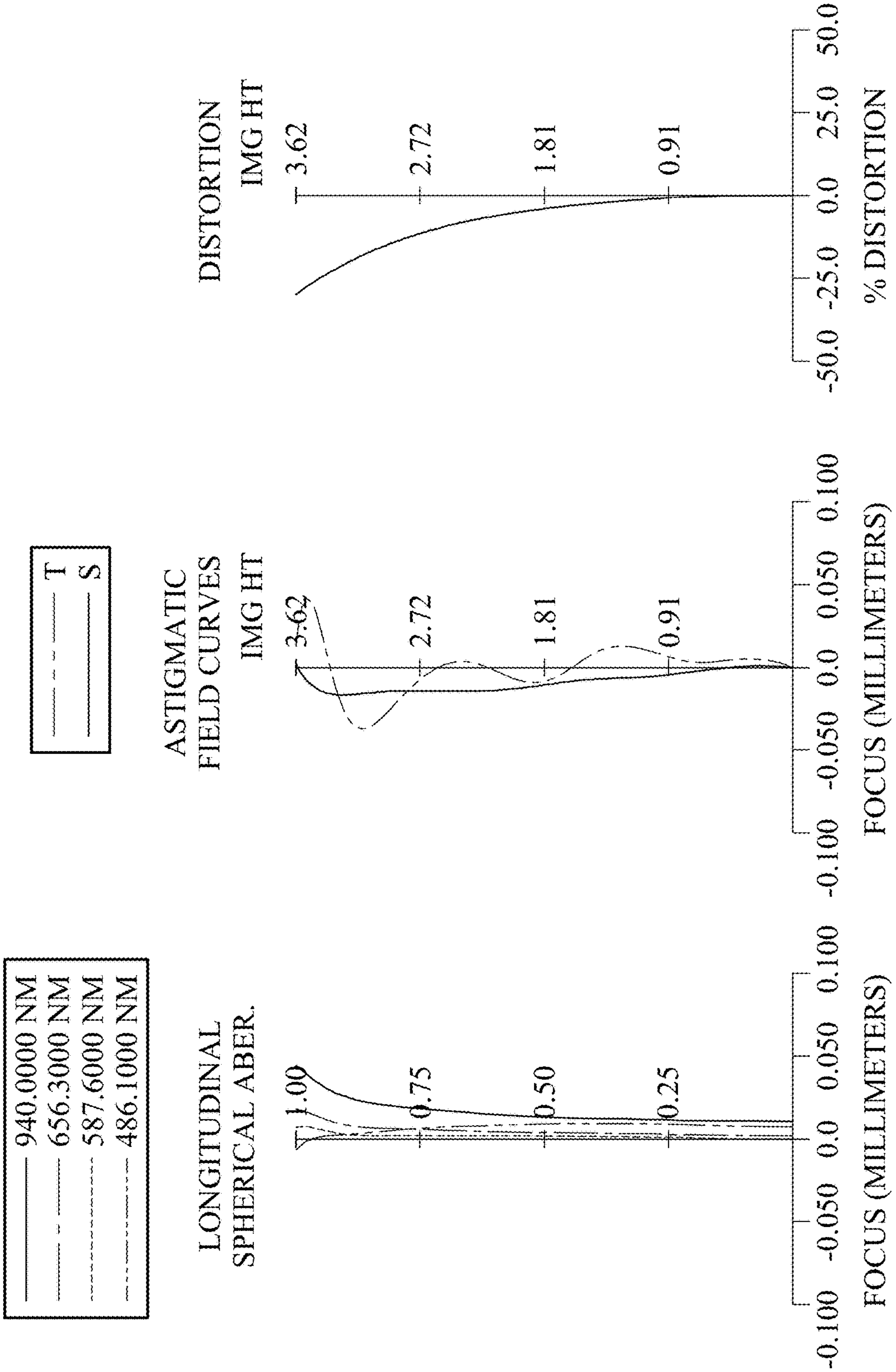
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit 11 includes the photographing optical system (its reference numeral is omitted) of the present disclosure and an image sensor IS. The photographing optical system includes, in order from an object side to an image side along an optical path, a first lens element E1, an aperture stop ST, a second lens element E2, a third lens element E3, a fourth lens element E4, a fifth lens element E5, a stop S1, a sixth lens element E6, a filter E7 and an image surface IMG. The photographing optical system includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The object-side surface of the first lens element E1 has one critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The image-side surface of the third lens element E3 has one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has three inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical system. The image sensor IS is disposed on or near the image surface IMG of the photographing optical system.

An axial distance between the first lens element E1 and the second lens element E2 is a maximum among axial distances between each of all adjacent lens elements of the photographing optical system.

The detailed optical data of the 11th embodiment are shown in Table 11A and the aspheric surface data are shown in Table 11B below.

TABLE 11A

| 11th Embodiment<br>f = 3.11 mm, Fno = 1.78, HFOV = 59.0 deg. | | | | | | | | |
|---|---|---|---|---|---|---|---|---|
| Surface # | | Curvature Radius | | Thickness | Material | Index | Abbe # | Focal Length |
| 0 | Object | Infinity | | Infinity | | | | |
| 1 | Lens 1 | −9.2412 | (ASP) | 0.654 | Plastic | 1.544 | 56.0 | −4.93 |
| 2 | | 3.8722 | (ASP) | 1.875 | | | | |

TABLE 11A-continued

| 11th Embodiment f = 3.11 mm, Fno = 1.78, HFOV = 59.0 deg. | | | | | | | | |
|---|---|---|---|---|---|---|---|---|
| Surface # | | Curvature Radius | | Thickness | Material | Index | Abbe # | Focal Length |
| 3 | Ape. Stop | Plano | | −0.144 | | | | |
| 4 | Lens 2 | 5.0343 | (ASP) | 1.812 | Plastic | 1.587 | 28.3 | 3.47 |
| 5 | | −2.9741 | (ASP) | 0.050 | | | | |
| 6 | Lens 3 | −9.8039 | (ASP) | 0.692 | Plastic | 1.669 | 19.5 | −3.36 |
| 7 | | 3.0026 | (ASP) | 0.120 | | | | |
| 8 | Lens 4 | 5.1506 | (ASP) | 1.769 | Plastic | 1.544 | 56.0 | 220.19 |
| 9 | | 4.7307 | (ASP) | 0.154 | | | | |
| 10 | Lens 5 | 2.1216 | (ASP) | 2.500 | Plastic | 1.544 | 56.0 | 2.71 |
| 11 | | −2.8394 | (ASP) | −0.989 | | | | |
| 12 | Stop | Plano | | 1.039 | | | | |
| 13 | Lens 6 | 2.8769 | (ASP) | 0.893 | Plastic | 1.669 | 19.5 | −6.15 |
| 14 | | 1.4825 | (ASP) | 1.200 | | | | |
| 15 | Filter | Plano | | 0.300 | Glass | 1.517 | 64.2 | — |
| 16 | | Plano | | 0.906 | | | | |
| 17 | Image | Plano | | — | | | | |

Note:
Reference wavelength is 587.6 nm (d-line).
An effective radius of the stop S1 (Surface 12) is 2.985 mm.
TLd = 12.83 mm, SLd = 10.30 mm, and BLd = 2.41 mm.

TABLE 11B

| Aspheric Coefficients | | | | | | |
|---|---|---|---|---|---|---|
| Surface # | 1 | 2 | 4 | 5 | 6 | 7 |
| k = | 6.16043E+00 | −3.66742E+01 | 7.53699E+00 | −5.90760E+00 | −9.00000E+01 | −8.25981E−01 |
| A4 = | 4.73499E−02 | 1.31679E−01 | −2.97813E−03 | −1.75650E−02 | −5.19122E−02 | −5.08701E−02 |
| A6 = | −1.48035E−02 | −6.12799E−02 | 6.11838E−04 | 4.78271E−03 | 1.75992E−02 | 1.58582E−02 |
| A8 = | 3.66916E−03 | 2.93190E−02 | −3.90450E−03 | −8.04083E−03 | −1.31818E−02 | −4.05879E−03 |
| A10 = | −6.33113E−04 | −9.04903E−03 | 2.30209E−03 | 2.57747E−03 | 3.78369E−03 | 7.25471E−04 |
| A12 = | 6.88935E−05 | 1.58875E−03 | −7.31776E−04 | −3.54803E−04 | −8.25776E−04 | −7.31361E−05 |
| A14 = | −4.19551E−06 | −1.19755E−04 | — | — | 9.50394E−05 | 2.79377E−06 |
| A16 = | 1.08635E−07 | — | — | — | — | — |
| Surface # | 8 | 9 | 10 | 11 | 13 | 14 |
| k = | 0.00000E+00 | −8.45455E−01 | −4.70832E+00 | −4.40319E−01 | −6.98061E+00 | −3.47729E+00 |
| A4 = | −1.32050E−02 | −8.93860E−02 | −1.50886E−02 | 3.42152E−02 | −1.75695E−02 | −2.19327E−02 |
| A6 = | −3.22257E−03 | 2.70417E−02 | 4.86474E−03 | −4.99290E−03 | −2.57926E−03 | 1.93355E−03 |
| A8 = | 2.67714E−03 | −9.19510E−03 | −1.43222E−03 | 4.61935E−05 | 6.13771E−04 | 3.92121E−04 |
| A10 = | −6.10031E−04 | 2.28856E−03 | 8.97449E−05 | 3.87653E−05 | −3.20212E−06 | −1.86567E−04 |
| A12 = | 6.36341E−05 | −3.49715E−04 | 4.60248E−05 | 9.19256E−06 | −1.20659E−05 | 3.35054E−05 |
| A14 = | −2.60877E−06 | 2.93612E−05 | −1.13947E−05 | −2.92442E−06 | 1.57751E−06 | −3.29473E−06 |
| A16 = | — | −1.00949E−06 | 1.02093E−06 | 2.62390E−07 | −6.44428E−08 | 1.75307E−07 |
| A18 = | — | — | −3.29248E−08 | −7.83128E−09 | — | −3.94763E−09 |

In the 11th embodiment, the equation of the aspheric surface profiles of the aforementioned lens elements is the same as the equation of the 1st embodiment. Also, the definitions of these parameters shown in Table 11C below are the same as those stated in the 1st embodiment with corresponding values for the 11th embodiment, so an explanation in this regard will not be provided again.

Moreover, these parameters can be calculated from Table 11A and Table 11B as the following values and satisfy the following conditions:

TABLE 11C

| Values of Optical and Physical Parameters/Definitions | | | |
|---|---|---|---|
| fd [mm] | 3.11 | \|f3d/f5d\| | 1.24 |
| Fno | 1.78 | ΣCT/TD | 0.80 |
| HFOVd [deg.] | 59.0 | CT4/CT2 | 0.98 |
| FOVd [deg.] | 118.0 | (CT2 + CT3)/CT4 | 1.42 |

TABLE 11C-continued

| Values of Optical and Physical Parameters/Definitions | | | |
|---|---|---|---|
| TLd [mm] | 12.83 | \|R8/R3\| | 0.94 |
| SLd [mm] | 10.30 | \|R8/R9\| | 2.23 |
| BLd [mm] | 2.41 | \|R9/R2\| | 0.55 |
| TLd/ImgH | 3.54 | (R5 + R6)/(R5 − R6) | 0.53 |
| BLd/ImgH | 0.66 | Vd5/Nd5 | 36.3 |
| TD/fd | 3.35 | Vd6/Nd6 | 11.7 |
| SLd/fd | 3.31 | ET5d/CT5 | 0.38 |
| SLd/TLd | 0.80 | SAG6R2d/CT6 | 0.70 |
| fd/f4d | 0.01 | — | — |

12th Embodiment

Figure 23:
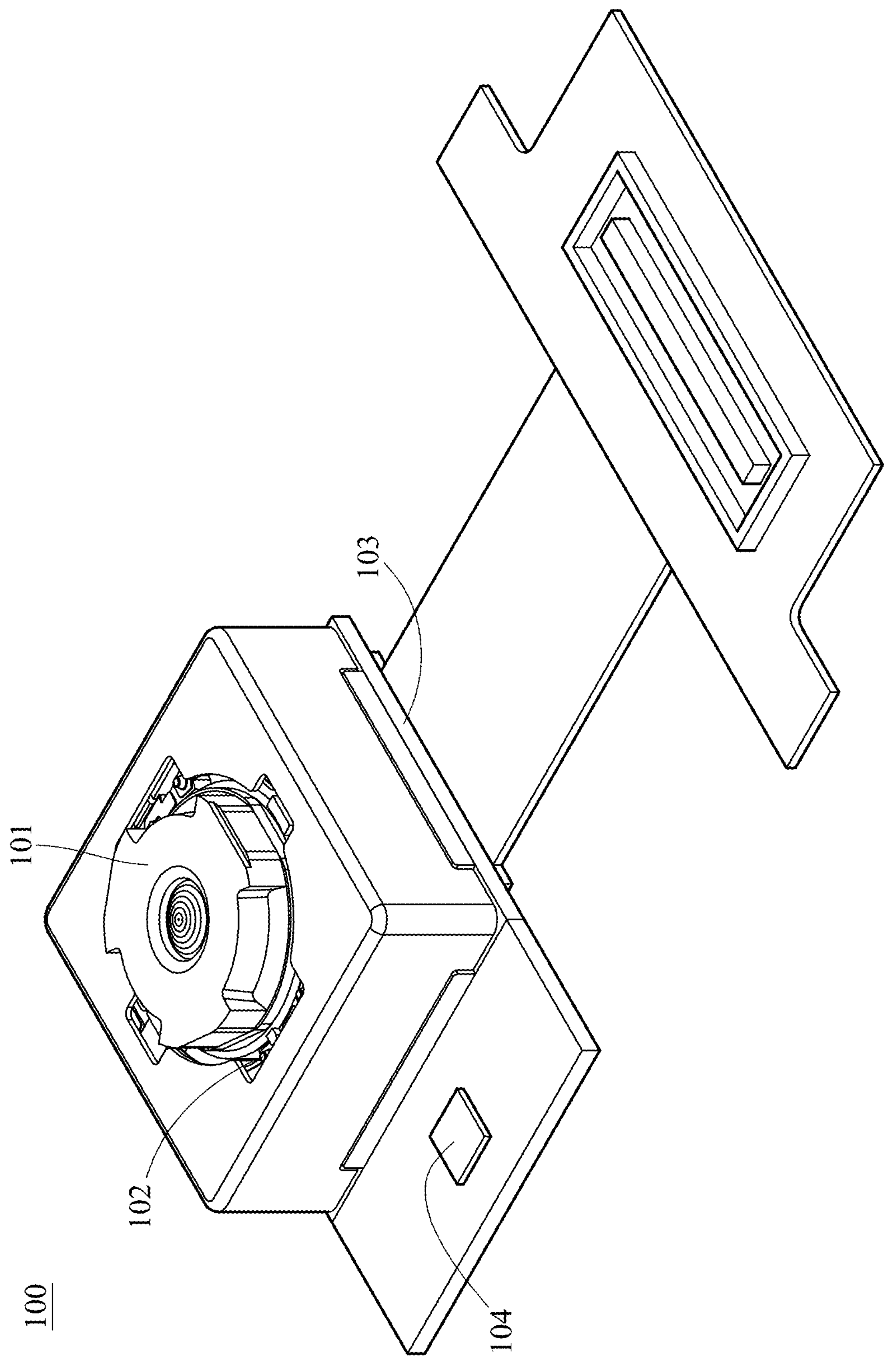
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 100 is a camera module including a lens unit 101, a driving device 102, an image sensor 103 and an image stabilizer 104. The lens unit 101 includes the photographing optical system as disclosed in the 1st embodiment, a barrel and a holder member (their reference numerals are omitted) for holding the photographing optical system. However, the lens unit 101 may alternatively be provided with the photographing optical system as disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CMOS or CCD), which can feature high photosensitivity and low noise, is disposed on the image surface of the photographing optical system to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

13th Embodiment

Figure 24:
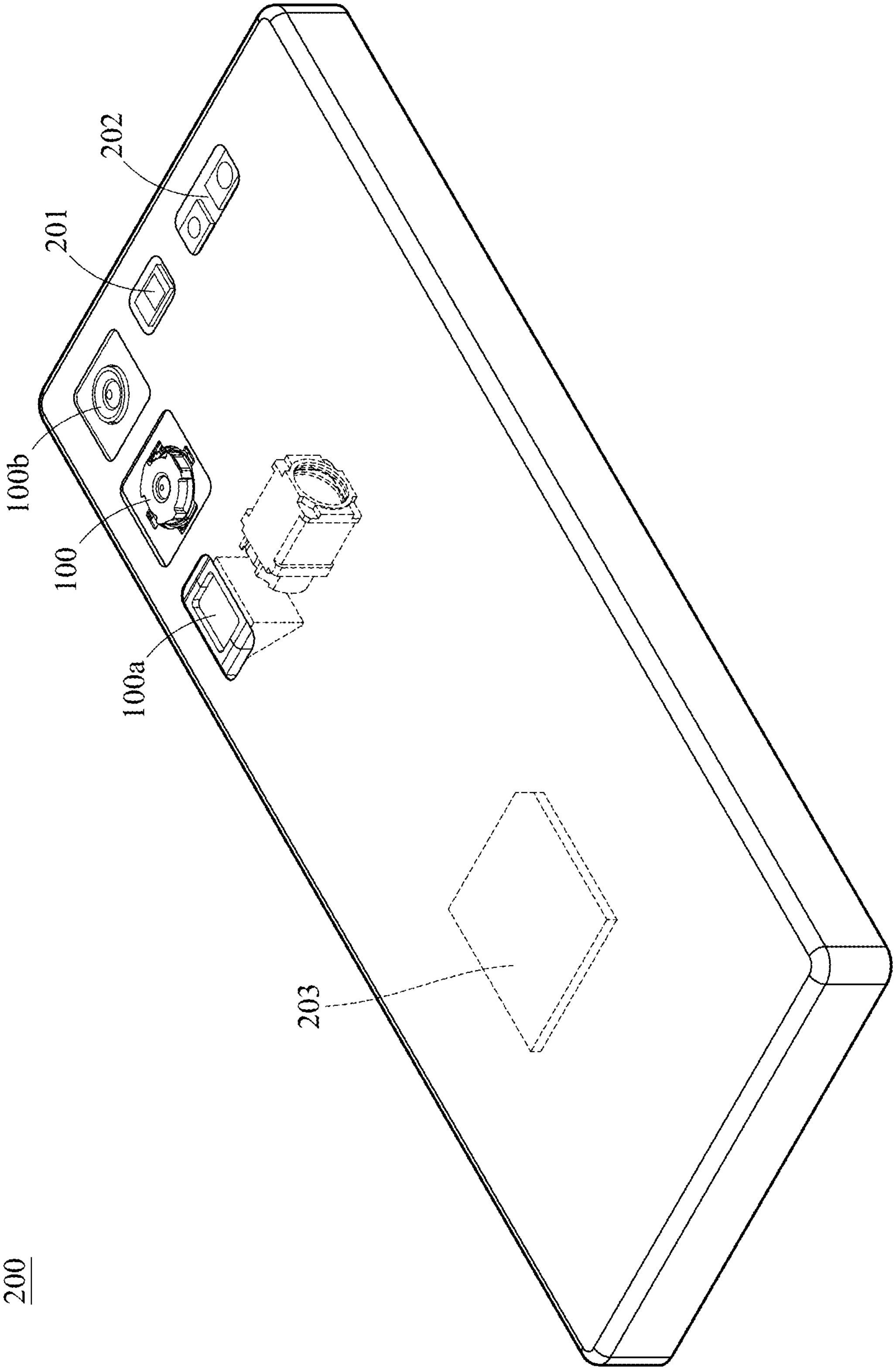
FIG. 24 is one perspective view of an electronic device according to the 13th embodiment of the present disclosure.
Figure 25:
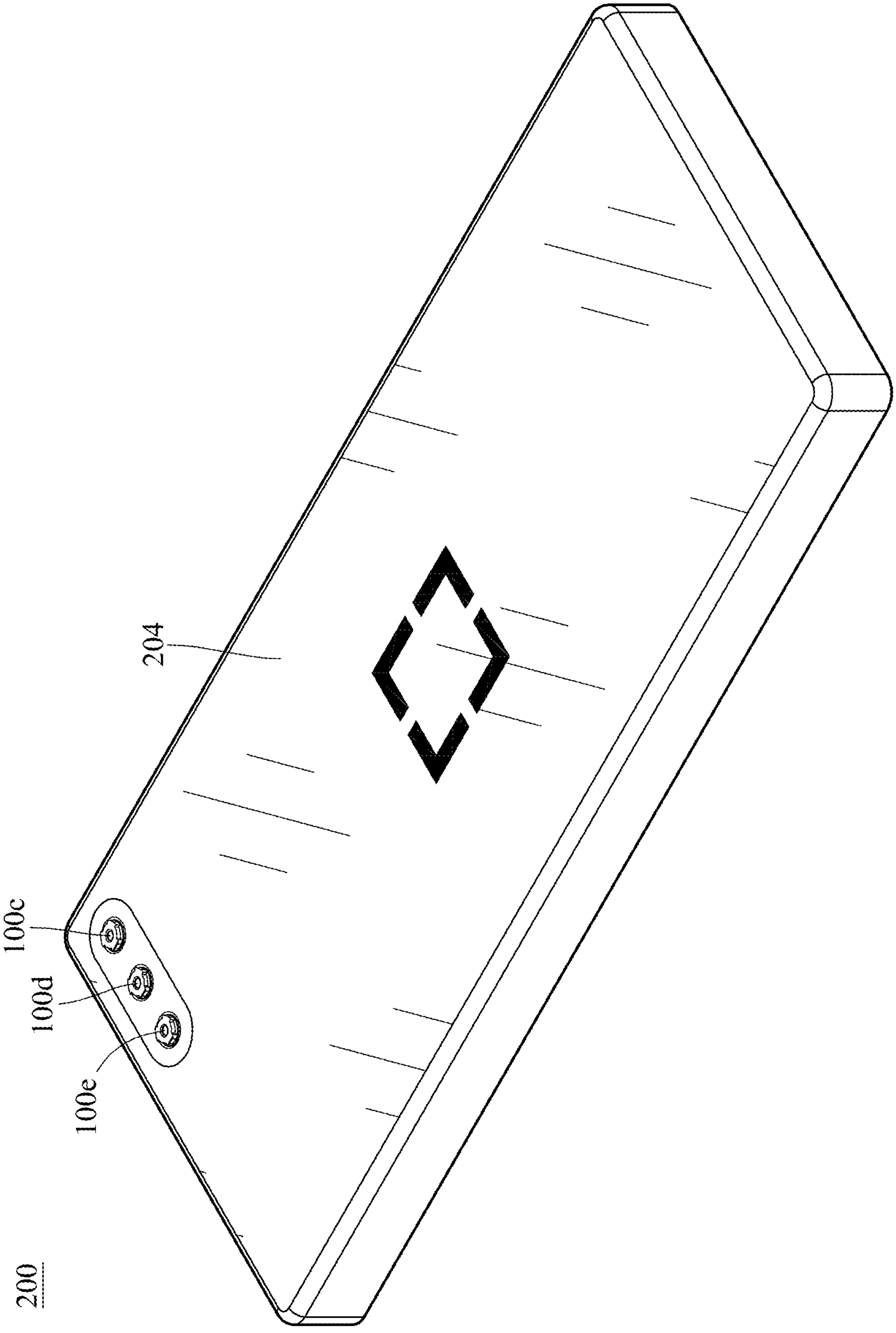
FIG. 25 is another perspective view of the electronic device in FIG. 24.
Figure 26:
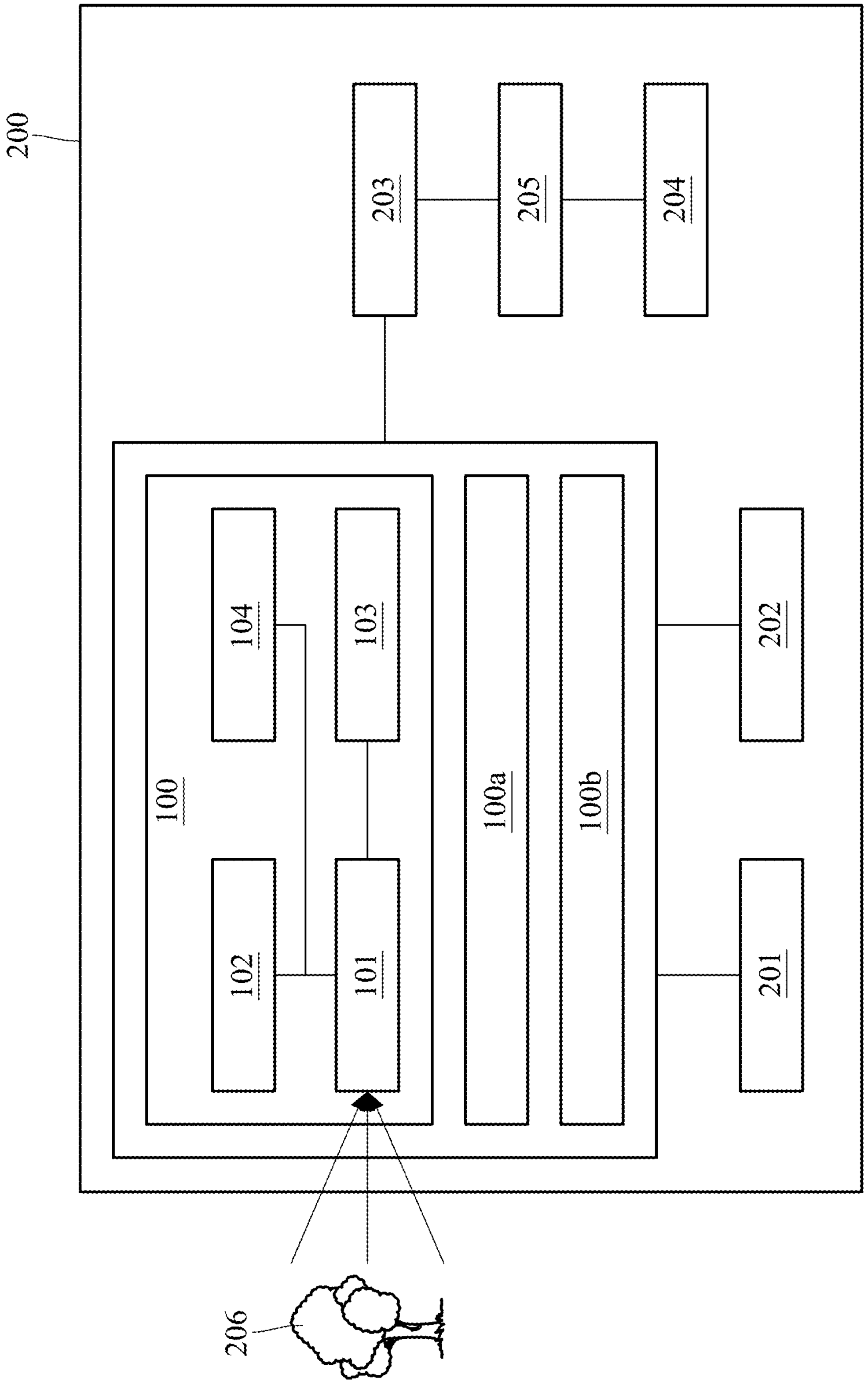
FIG. 26 is a block diagram of the electronic device in FIG. 24.

FIG. 24 is one perspective view of an electronic device according to the 13th embodiment of the present disclosure, FIG. 25 is another perspective view of the electronic device in FIG. 24, and FIG. 26 is a block diagram of the electronic device in FIG. 24.

In this embodiment, an electronic device 200 is a smartphone including the image capturing unit 100 as disclosed in the 12th embodiment, an image capturing unit 100*a*, an image capturing unit 100*b*, an image capturing unit 100*c*, an image capturing unit 100*d*, an image capturing unit 100*e*, a flash module 201, a focus assist module 202, an image signal processor 203, a display module 204 and an image software processor 205. The image capturing unit 100, the image capturing unit 100*a* and the image capturing unit 100*b* are disposed on the same side of the electronic device 200, and each of the image capturing units 100, 100*a* and 100*b* has a single focal point. The focus assist module 202 can be a laser rangefinder or a ToF (time of flight) module, but the present disclosure is not limited thereto. The image capturing unit 100*c*, the image capturing unit 100*d*, the image capturing unit 100*e* and the display module 204 are disposed on the opposite side of the electronic device 200, and the display module 204 can be a user interface, such that the image capturing units 100*c*, 100*d* and 100*e* can be front-facing cameras of the electronic device 200 for taking selfies, but the present disclosure is not limited thereto. Furthermore, each of the image capturing units 100*a*, 100*b*, 100*c*, 100*d* and 100*e* can include the photographing optical system of the present disclosure and can have a configuration similar to that of the image capturing unit 100. In detail, each of the image capturing units 100*a*, 100*b*, 100*c*, 100*d* and 100*e* can include a lens unit, a driving device, an image sensor and an image stabilizer, and can also include a light-folding element for folding optical path. In addition, each lens unit of the image capturing units 100*a*, 100*b*, 100*c*, 100*d* and 100*e* can include the photographing optical system of the present disclosure, a barrel and a holder member for holding the photographing optical system.

The image capturing unit 100 is a wide-angle image capturing unit, the image capturing unit 100*a* is a telephoto image capturing unit with optical path folding function, the image capturing unit 100*b* is an ultra-wide-angle image capturing unit, the image capturing unit 100*c* is a wide-angle image capturing unit, the image capturing unit 100*d* is an ultra-wide-angle image capturing unit, and the image capturing unit 100*e* is a ToF image capturing unit. In this embodiment, the image capturing units 100, 100*a* and 100*b* have different fields of view, such that the electronic device 200 can have various magnification ratios so as to meet the requirement of optical zoom functionality. In addition, the image capturing unit 100*e* can determine depth information of the imaged object. Moreover, the light-folding configuration of the image capturing unit 100*a* can be similar to, for example, one of the configurations as shown in FIG. 36 to FIG. 38, which can be referred to foregoing descriptions corresponding to FIG. 36 to FIG. 38, and the details in this regard will not be provided again. Moreover, each of the image capturing units 100, 100*b*, 100*c*, 100*d* and 100*e* can have a light-folding configuration similar to, for example, one of the configurations as shown in FIG. 36 to FIG. 38, which can be referred to foregoing descriptions corresponding to FIG. 36 to FIG. 38. In this embodiment, the electronic device 200 includes multiple image capturing units 100, 100*a*, 100*b*, 100*c*, 100*d* and 100*e*, but the present disclosure is not limited to the number and arrangement of image capturing units.

When a user captures images of an object 206, the light rays converge in the image capturing unit 100, the image capturing unit 100*a* or the image capturing unit 100*b* to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100*c*, 100*d* or 100*e* to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

14th Embodiment

Figure 27:
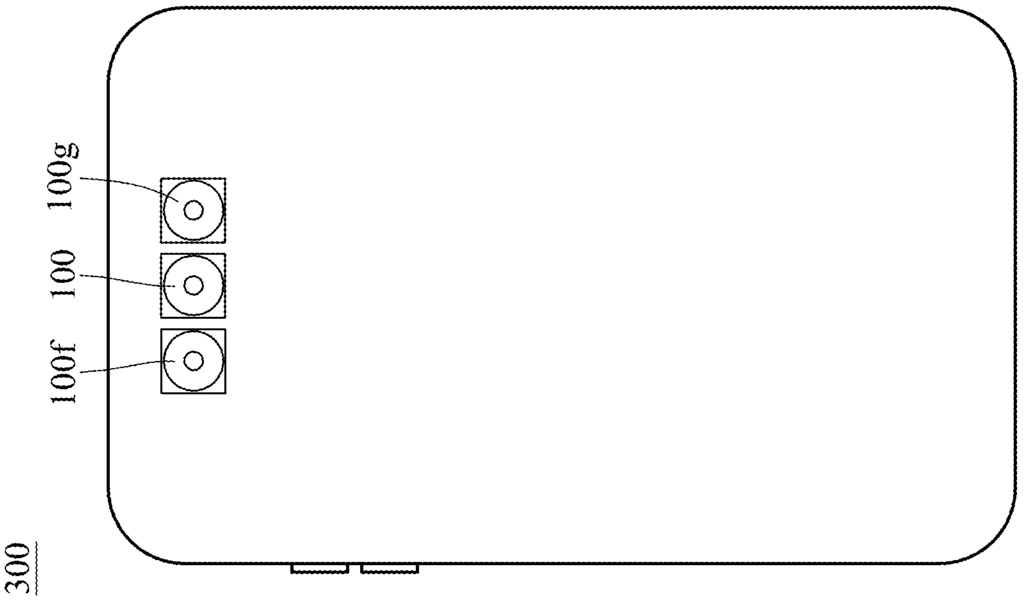
FIG. 27 is one schematic view of an electronic device according to the 14th embodiment of the present disclosure.
Figure 28:
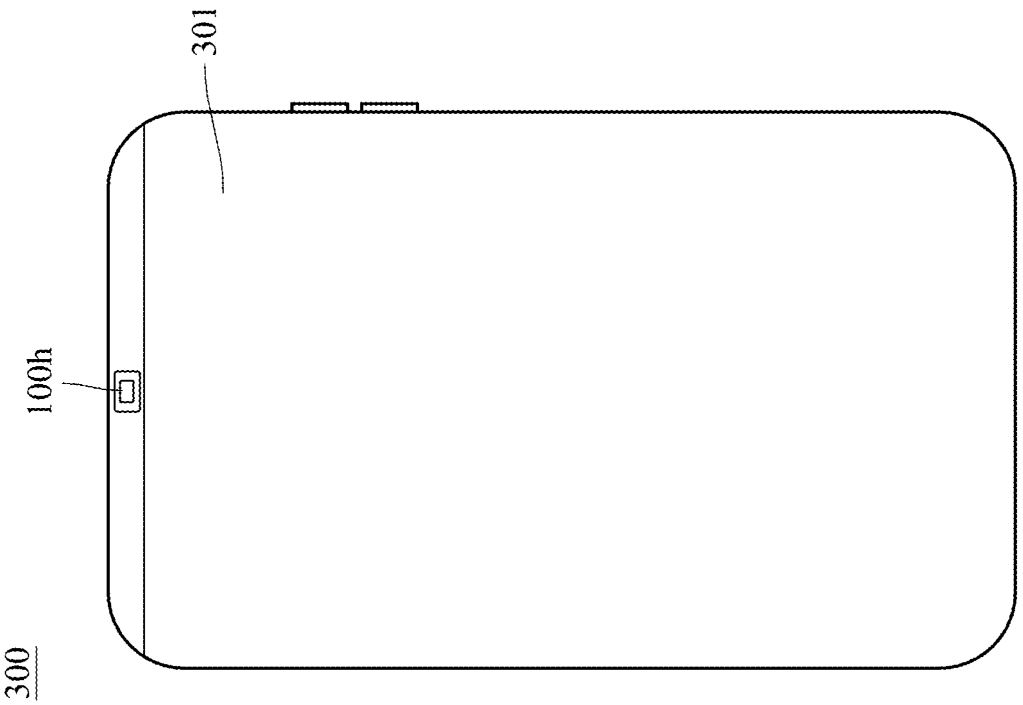
FIG. 28 is another schematic view of the electronic device in FIG. 27.

FIG. 27 is one schematic view of an electronic device according to the 14th embodiment of the present disclosure, and FIG. 28 is another schematic view of the electronic device in FIG. 27.

In this embodiment, an electronic device 300 is a smartphone including the image capturing unit 100 as disclosed in the 12th embodiment, an image capturing unit 100*f*, an image capturing unit 100*g*, an image capturing unit 100*h* and a display module 301. As shown in FIG. 27, the image capturing unit 100, the image capturing unit 100*f* and the image capturing unit 100*g* are disposed on the same side of the electronic device 300, and each of the image capturing units 100, 100*f* and 100*g* has a single focal point. As shown in FIG. 28, the image capturing unit 100*h* and the display module 301 are disposed on the opposite side of the electronic device 300, such that the image capturing unit 100*h* can be a front-facing camera of the electronic device 300 for taking selfies, but the present disclosure is not limited thereto. Furthermore, each of the image capturing units 100*f*, 100*g* and 100*h* can include the photographing optical system of the present disclosure and can have a configuration similar to that of the image capturing unit 100. In detail, each of the image capturing units 100*f*, 100*g* and 100*h* can include a lens unit, a driving device, an image sensor and an image stabilizer. In addition, each lens unit of the image capturing units 100*f*, 100*g* and 100*h* can include the photographing optical system of the present disclosure, a barrel and a holder member for holding the photographing optical system.

The image capturing unit 100 is a wide-angle image capturing unit, the image capturing unit 100*f* is a telephoto image capturing unit, the image capturing unit 100*g* is an ultra-wide-angle image capturing unit, and the image capturing unit 100*h* is a wide-angle image capturing unit. In this embodiment, the image capturing units 100, 100*f* and 100*g* have different fields of view, such that the electronic device 300 can have various magnification ratios so as to meet the requirement of optical zoom functionality. In this embodiment, the electronic device 300 includes multiple image capturing units 100, 100*f*, 100*g* and 100*h*, but the present disclosure is not limited to the number and arrangement of image capturing units.

15th Embodiment

Figure 29:
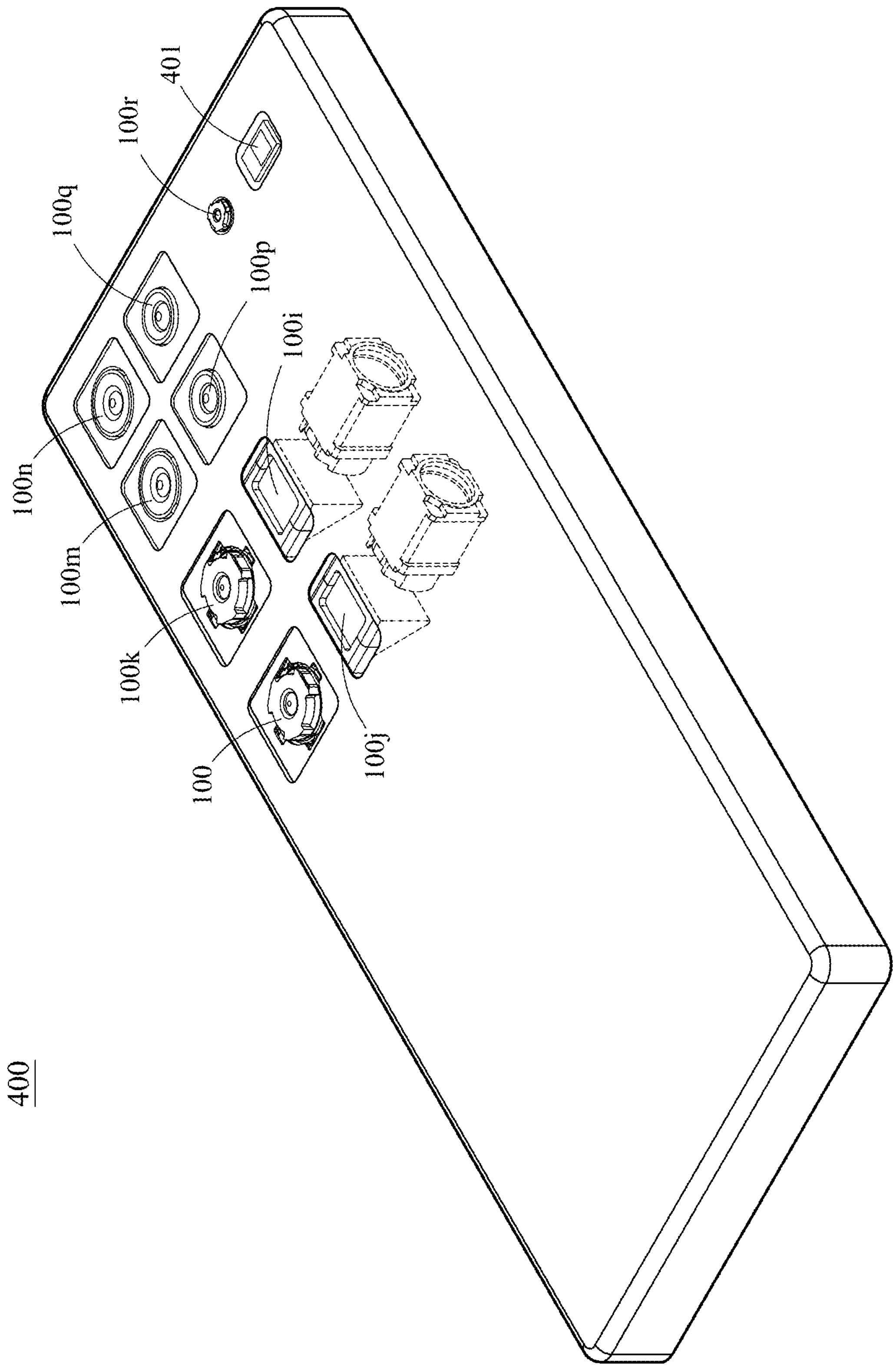
FIG. 29 is one perspective view of an electronic device according to the 15th embodiment of the present disclosure.

FIG. 29 is one perspective view of an electronic device according to the 15th embodiment of the present disclosure.

In this embodiment, an electronic device 400 is a smartphone including the image capturing unit 100 as disclosed in the 12th embodiment, an image capturing unit 100*i*, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, a flash module 401, a focus assist module, an image signal processor, a display module and an image software processor (not shown). The image capturing units 100, 100*i*, 100*j*, 100*k*, 100*m*, 100*n*, 100*p*, 100*q* and 100*r* are disposed on the same side of the electronic device 400, while the display module is disposed on the opposite side of the electronic device 400. Furthermore, each of the image capturing units 100*i*, 100*j*, 100*k*, 100*m*, 100*n*, 100*p*, 100*q* and 100*r* can include the photographing optical system of the present disclosure and can have a configuration similar to that of the image capturing unit 100, and the details in this regard will not be provided again.

The image capturing unit 100 is a wide-angle image capturing unit, the image capturing unit 100*i* is a telephoto image capturing unit with optical path folding function, the image capturing unit 100*j* is a telephoto image capturing unit with optical path folding function, the image capturing unit 100*k* is a wide-angle image capturing unit, the image capturing unit 100*m* is an ultra-wide-angle image capturing unit, the image capturing unit 100*n* is an ultra-wide-angle telephoto image capturing unit, the image capturing unit 100*p* is a telephoto image capturing unit, the image capturing unit 100*q* is a telephoto image capturing unit, and the image capturing unit 100*r* is a ToF image capturing unit. In this embodiment, the image capturing units 100, 100*i*, 100*j*, 100*k*, 100*m*, 100*n*, 100*p* and 100*q* have different fields of view, such that the electronic device 400 can have various magnification ratios so as to meet the requirement of optical zoom functionality. In addition, the image capturing unit 100*r* can determine depth information of the imaged object. Moreover, the light-folding configuration of the image capturing units 100*i* and 100*j* can be similar to, for example, one of the structures shown in FIG. 36 to FIG. 38, which can be referred to foregoing descriptions corresponding to FIG. 36 to FIG. 38, and the details in this regard will not be provided again. In this embodiment, the electronic device 400 includes multiple image capturing units 100, 100*i*, 100*j*, 100*k*, 100*m*, 100*n*, 100*p*, 100*q* and 100*r*, but the present disclosure is not limited to the number and arrangement of image capturing units. When a user captures images of an object, the light rays converge in the image capturing unit 100, 100*i*, 100*j*, 100*k*, 100*m*, 100*n*, 100*p*, 100*q* or 100*r* to generate images, and the flash module 401 is activated for light supplement. Further, the subsequent processes are performed in a manner similar to the abovementioned embodiments, and the details in this regard will not be provided again.

16th Embodiment

Figure 30:
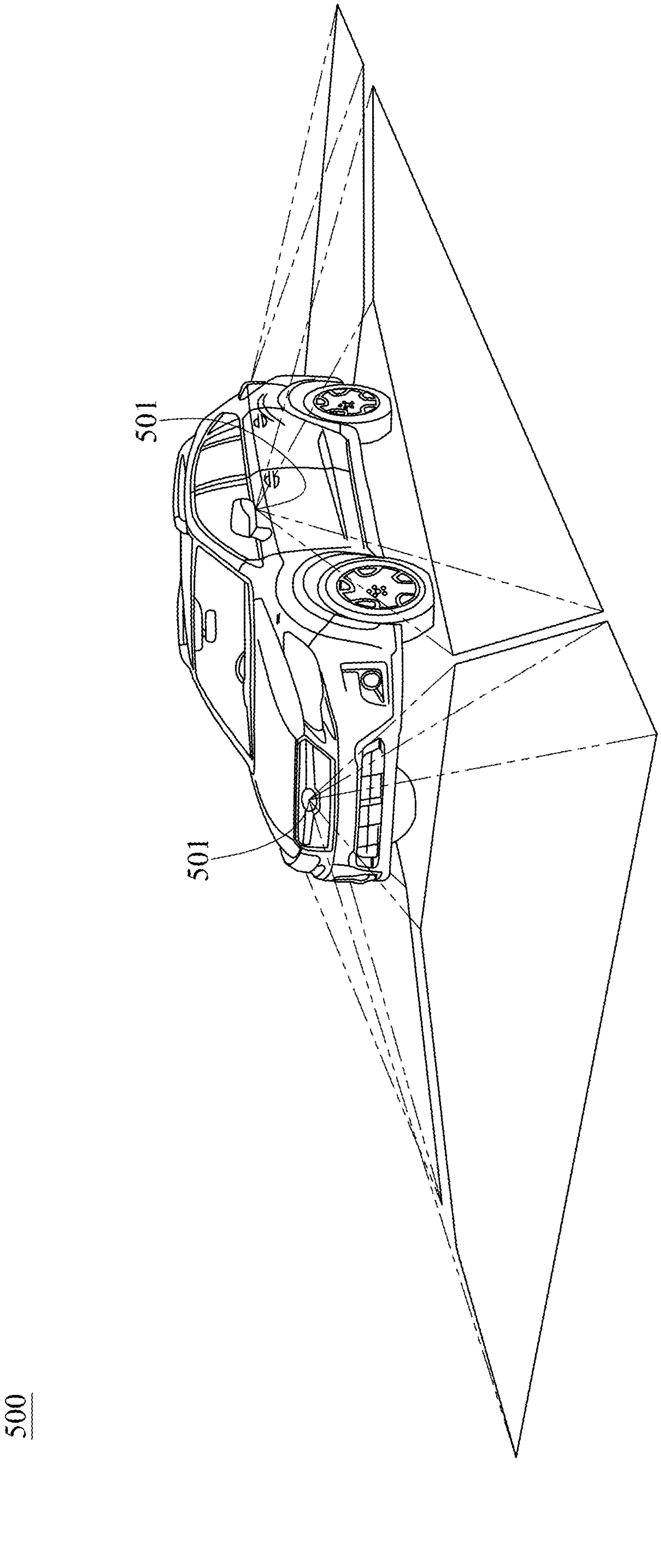
FIG. 30 is a perspective view of an electronic device according to the 16th embodiment of the present disclosure.
Figure 31:
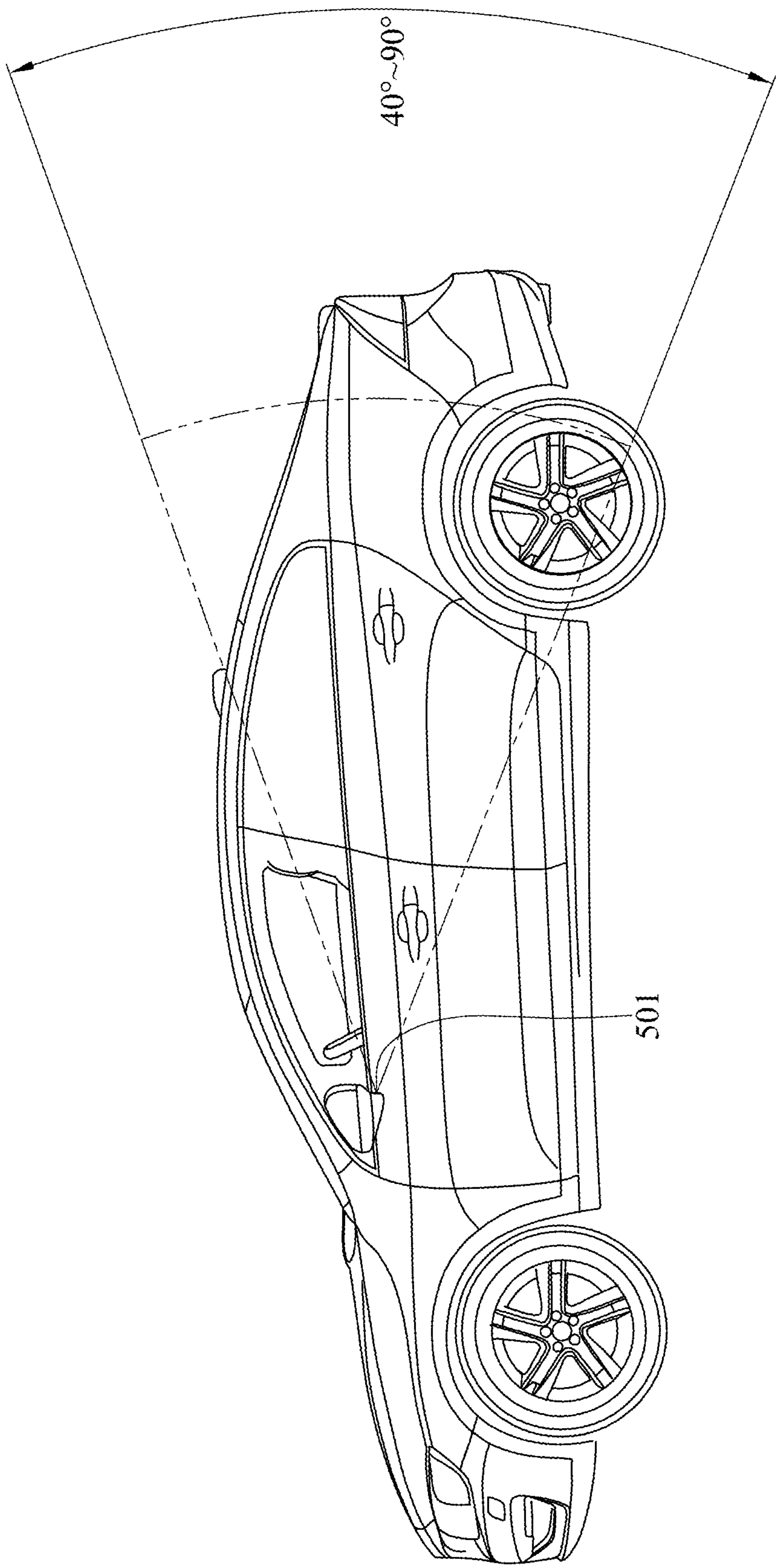
FIG. 31 is a side view of the electronic device in FIG. 30.
Figure 32:
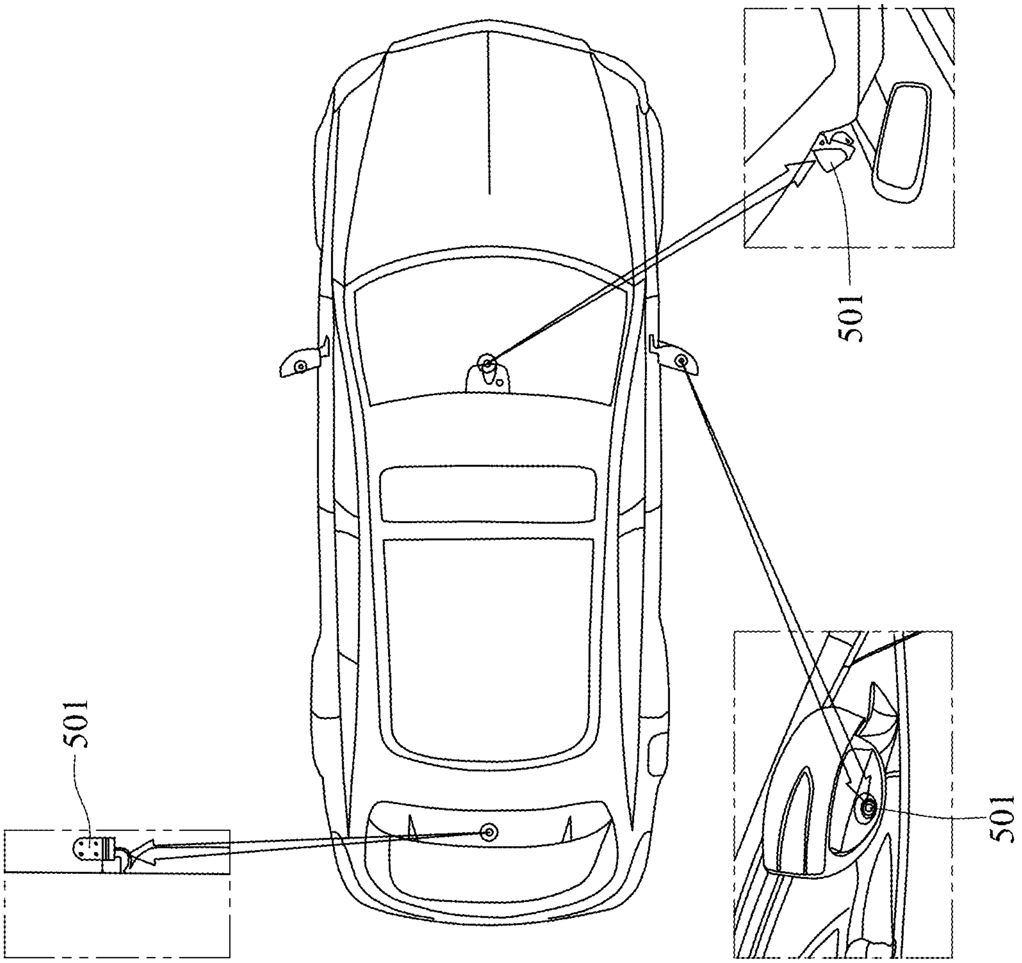
FIG. 32 is a top view of the electronic device in FIG. 30.

FIG. 30 is a perspective view of an electronic device according to the 16th embodiment of the present disclosure, FIG. 31 is a side view of the electronic device in FIG. 30, and FIG. 32 is a top view of the electronic device in FIG. 30.

In this embodiment, the electronic device 500 is a vehicle (e.g., an automobile). The electronic device 500 includes a plurality of image capturing units 501, and the image capturing units 501 each include the photographing optical system of the present disclosure. The image capturing units 501 can serve as, for example, panoramic view car cameras, dashboard cameras and vehicle backup cameras. The image capturing units 501 are, for example, wide-angle image capturing units.

As shown in FIG. 30 to FIG. 32, the image capturing units 501 are, for example, disposed at the front end, rear end, sides, rearview mirrors, and interior of the vehicle to capture images of the surrounding environment of the vehicle, which is favorable for recognizing external road conditions and thereby enables the implementation of automatic driver assistance functions. In addition, the images can be processed by an image software processor to create a panoramic view, providing the driver with images of blind spots, allowing the driver to monitor the surroundings of the vehicle, thereby favorable for driving and parking.

As shown in FIG. 31, the image capturing units 501 are, for example, respectively disposed on the lower portion of the side mirrors. A maximum field of view of the image capturing units 501 can be 40 degrees to 90 degrees for capturing images in regions on left and right lanes. As shown in FIG. 32, the image capturing units 501 can also be, for example, respectively disposed on the lower portion of the side mirrors and inside the front and rear windshields for providing external information to the driver, and also providing more viewing angles so as to reduce blind spots, thereby improving driving safety. The configuration and arrangement of the image capturing units shown in the figures is only exemplary. The number, position, and image capture direction of the image capturing units can be adjusted according to actual requirements.

17th Embodiment

Figure 33:
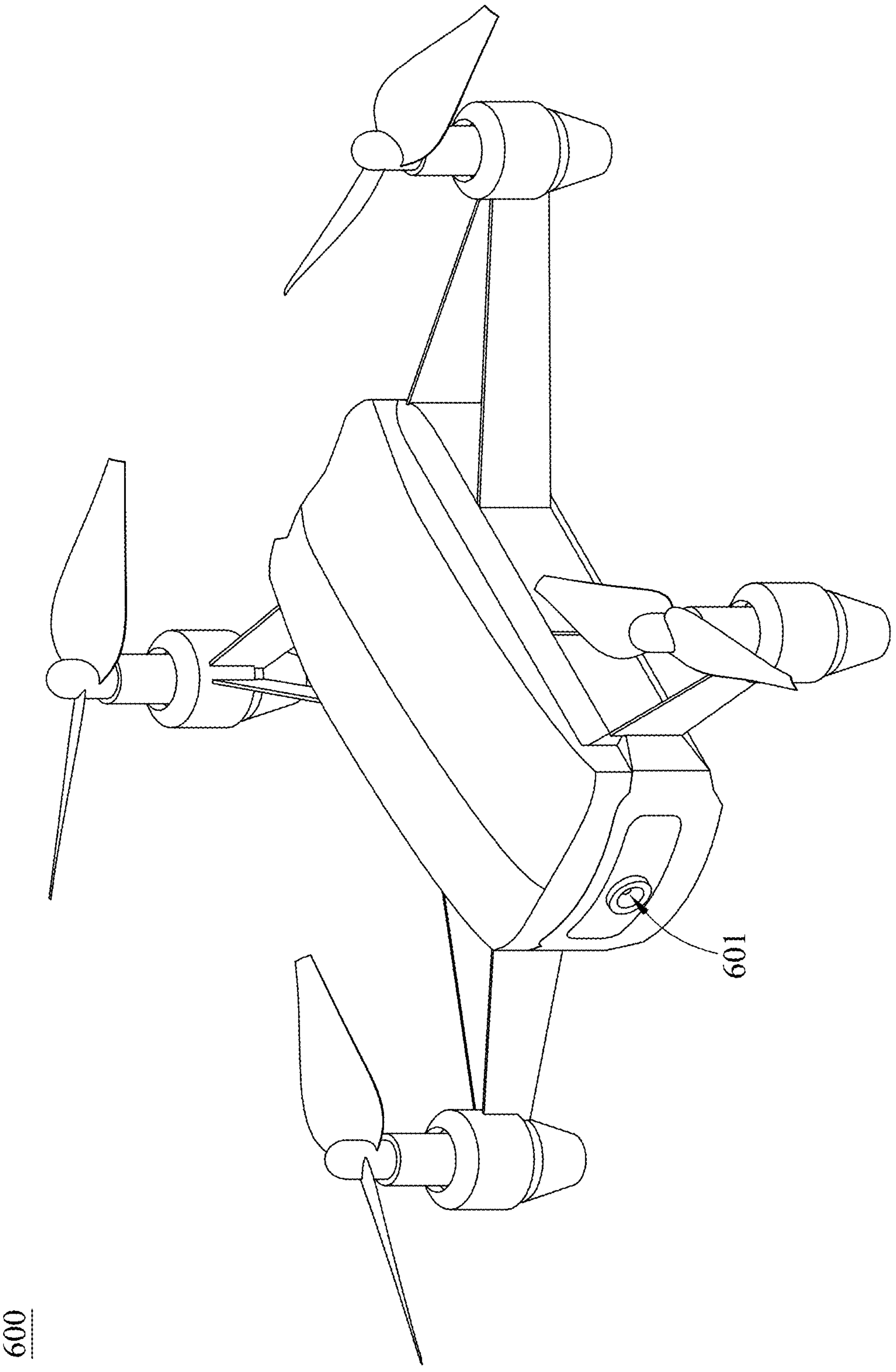
FIG. 33 is a perspective view of an electronic device according to the 17th embodiment of the present disclosure.

FIG. 33 is a perspective view of an electronic device according to the 17th embodiment of the present disclosure.

In this embodiment, an electronic device 600 is a lightweight unmanned aerial vehicle (e.g., a drone camera). The electronic device 600 includes an image capturing unit 601. The image capturing unit 601 includes the photographing optical system of the present disclosure, and the image capturing unit 601 can be a wide-angle image capturing unit. The image capturing unit 601, which is similar to the image capturing unit 100 as disclosed in the 12th embodiment, can further include a barrel, a holder member or a combination thereof. The electronic device 600 captures an image by the image capturing unit 601. Preferably, the electronic device may further include a control unit, a display unit, a storage unit, a random access memory unit (RAM) or a combination thereof. In this embodiment, the electronic device 600 includes a single image capturing unit 601 as exemplary, but the present disclosure is not limited to the number and arrangement of image capturing units.

The smartphones, vehicle, and unmanned aerial vehicle in the embodiments are only exemplary for showing the image capturing unit of the present disclosure installed in an electronic device, and the present disclosure is not limited thereto. The image capturing unit can be optionally applied to optical systems with a movable focus. Furthermore, the photographing optical system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices, portable video recorders, and other electronic imaging devices.

The foregoing description, for the purpose of explanation, has been described with reference to specific embodiments. It is to be noted that TABLES 1A-11C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical system comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has negative refractive power, the object-side surface of the first lens element is concave in a paraxial region thereof, the object-side surface of the first lens element has at least one inflection point, the third lens element has negative refractive power, the object-side surface of the third lens element is concave in a paraxial region thereof, the fifth lens element has positive refractive power, the object-side surface of the sixth lens element is convex in a paraxial region thereof, and the image-side surface of the sixth lens element is concave in a paraxial region thereof;

wherein the photographing optical system further comprises an aperture stop, a curvature radius of the image-side surface of the fourth lens element is R8, and a curvature radius of the object-side surface of the fifth lens element is R9; and with a wavelength of helium d-line as a reference wavelength for the photographing optical system, a focal length of the photographing optical system is fd, a focal length of the third lens element is f3d, a focal length of the fifth lens element is f5d, and an axial distance between the aperture stop and an image surface is SLd, and the following conditions are satisfied:

$$1.00 < |R8/R9| < 5.00;$$

$$0.20 < |f3d/f5d| < 7.00; \text{ and}$$

$$2.80 < SLd/fd < 4.50.$$

2. The photographing optical system of claim 1, wherein an f-number of the photographing optical system is Fno, and a maximum image height of the photographing optical system is ImgH; and with a wavelength of helium d-line as a reference wavelength for the photographing optical system, a maximum field of view of the photographing optical system is FOVd, and an axial distance between the object-side surface of the first lens element and the image surface is TLd, and the following conditions are satisfied:

$$Fno \leq 1.80;$$

$$90.0 \text{ degrees} < FOVd < 150.0 \text{ degrees; and}$$

$$3.00 < TLd/ImgH < 4.30.$$

3. The photographing optical system of claim 1, wherein an axial distance between the first lens element and the second lens element is a maximum among axial distances between each of all adjacent lens elements of the photographing optical system.

4. The photographing optical system of claim 1, wherein an axial distance between the object-side surface of the first lens element and the image-side surface of the sixth lens element is TD, a central thickness of the second lens element is CT2, and a central thickness of the fourth lens element is CT4; and with a wavelength of helium d-line as a reference wavelength for the photographing optical system, the focal length of the photographing optical system is fd, and the following conditions are satisfied:

$$3.00 < TD/fd < 4.30; \text{ and}$$

$$0.90 < CT4/CT2 < 4.50.$$

5. The photographing optical system of claim 1, wherein with a wavelength of helium d-line as a reference wavelength for the photographing optical system, the focal length of the photographing optical system is fd, and a focal length of the fourth lens element is f4d, and the following condition is satisfied:

$$-0.70 < fd/f4d < 0.60.$$

6. The photographing optical system of claim 1, wherein with a wavelength of helium d-line as a reference wavelength for the photographing optical system, the axial distance between the aperture stop and the image surface is SLd, and an axial distance between the object-side surface of the first lens element and the image surface is TLd, and the following condition is satisfied:

$$0.60 < SLd/TLd < 0.90.$$

7. The photographing optical system of claim 1, wherein a maximum image height of the photographing optical system is ImgH; and with a wavelength of helium d-line as a reference wavelength for the photographing optical system, an axial distance between the image-side surface of the sixth lens element and the image surface is BLd, and the following condition is satisfied:

$$0.50 < BLd/ImgH < 1.00.$$

8. The photographing optical system of claim 1, wherein a central thickness of the second lens element is CT2, a central thickness of the third lens element is CT3, a central thickness of the fourth lens element is CT4, a curvature radius of the object-side surface of the second lens element is R3, the curvature radius of the image-side surface of the fourth lens element is R8, and the following conditions are satisfied:

$$0.15 < (CT2 + CT3)/CT4 < 2.00; \text{ and}$$

$$0.00 < |R8/R3| < 150.$$

9. The photographing optical system of claim 1, wherein with a wavelength of helium d-line as a reference wavelength for the photographing optical system, an Abbe number of the fifth lens element is Vd5, and a refractive index of the fifth lens element is Nd5, and the following condition is satisfied:

$$20.0 < Vd5/Nd5 < 45.0.$$

10. The photographing optical system of claim 1, wherein a central thickness of the sixth lens element is CT6; and with a wavelength of helium d-line as a reference wavelength for the photographing optical system, a displacement in parallel with an optical axis from an axial vertex of the image-side surface of the sixth lens element to a maximum effective radius position of the image-side surface of the sixth lens element is SAG6R2d, and the following condition is satisfied:

$$0.65 < SAG6R2d/CT6 < 2.00.$$

11. The photographing optical system of claim 1, wherein a central thickness of the fifth lens element is CT5; and with a wavelength of helium d-line as a reference wavelength for the photographing optical system, a distance in parallel with an optical axis between a maximum effective radius position of the object-side surface of the fifth lens element and a maximum effective radius position of the image-side surface of the fifth lens element is ET5d, and the following condition is satisfied:

$$0.03 < ET5d/CT5 < 0.55.$$

12. An image capturing unit comprising:

the photographing optical system of claim 1; and an image sensor disposed on the image surface of the photographing optical system.

13. An electronic device comprising:

the image capturing unit of claim 12.

14. A photographing optical system comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has negative refractive power, the object-side surface of the first lens element is concave in a paraxial region thereof, the object-side surface of the first lens element has at least one inflection point, the third lens element has negative refractive power, the object-side surface of the third lens element is concave in a paraxial region thereof, the fifth lens element has positive refractive power, the object-side surface of the sixth lens element is convex in a paraxial region thereof, and the image-side surface of the sixth lens element is concave in a paraxial region thereof;

wherein a curvature radius of the image-side surface of the fourth lens element is R8, a curvature radius of the object-side surface of the fifth lens element is R9, an axial distance between the object-side surface of the first lens element and the image-side surface of the sixth lens element is TD, a central thickness of the second lens element is CT2, and a central thickness of the fourth lens element is CT4; and with a wavelength of helium d-line as a reference wavelength for the photographing optical system, a focal length of the photographing optical system is fd, a focal length of the third lens element is f3d, and a focal length of the fifth lens element is f5d, and the following conditions are satisfied:

$$1.00 < |R8/R9| < 5.00;$$

$$0.20 < |f3d/f5d| < 7.00;$$

$$2.50 < TD/fd < 4.50; \text{ and}$$

$$0.80 < CT4/CT2 < 5.00.$$

15. The photographing optical system of claim 14, wherein the object-side surface of the first lens element has at least one critical point in an off-axis region thereof, the second lens element has positive refractive power, and the object-side surface of the fifth lens element is convex in a paraxial region thereof.

16. The photographing optical system of claim 14, further comprising an aperture stop, wherein a maximum image height of the photographing optical system is ImgH; and with a wavelength of helium d-line as a reference wavelength for the photographing optical system, an axial distance between the aperture stop and an image surface is SLd, the focal length of the photographing optical system is fd, and an axial distance between the object-side surface of the first lens element and the image surface is TLd, and the following conditions are satisfied:

$$3.00 < SLd/fd < 4.00; \text{ and}$$

$$2.50 < TLd/ImgH < 4.50.$$

17. The photographing optical system of claim 14, wherein an f-number of the photographing optical system is Fno; and with a wavelength of helium d-line as a reference wavelength for the photographing optical system, a maximum field of view of the photographing optical system is FOVd, and the following conditions are satisfied:

$$100.0 \text{ degrees} < FOVd < 140.0 \text{ degrees; and}$$

$$Fno \leq 1.90.$$

18. The photographing optical system of claim 14, wherein with a wavelength of helium d-line as a reference wavelength for the photographing optical system, the focal length of the third lens element is f3d, and the focal length of the fifth lens element is f5d, and the following condition is satisfied:

$$0.70 < |f3d/f5d| < 6.00.$$

19. The photographing optical system of claim 14, wherein a curvature radius of the object-side surface of the third lens element is R5, a curvature radius of the image-side surface of the third lens element is R6, and the following condition is satisfied:

$$-8.00 < (R5+R6)/(R5-R6) < 0.80.$$

20. The photographing optical system of claim 14, wherein the central thickness of the second lens element is CT2, a central thickness of the third lens element is CT3, the central thickness of the fourth lens element is CT4, and the following condition is satisfied:

$$0.30 < (CT2+CT3)/CT4 < 1.50.$$

21. The photographing optical system of claim 14, wherein a curvature radius of the image-side surface of the first lens element is R2, the curvature radius of the object-side surface of the fifth lens element is R9, and the following condition is satisfied:

$$0.00 < |R9/R2| < 1.00.$$

22. The photographing optical system of claim 14, wherein with a wavelength of helium d-line as a reference wavelength for the photographing optical system, an Abbe number of the sixth lens element is Vd6, and a refractive index of the sixth lens element is Nd6, and the following condition is satisfied:

$$5.0 < Vd6/Nd6 < 20.0.$$

23. The photographing optical system of claim 14, wherein a sum of central thicknesses of all lens elements of the photographing optical system is ΣCT, the axial distance between the object-side surface of the first lens element and the image-side surface of the sixth lens element is TD, and the following condition is satisfied:

$$0.65 < \sum CT/TD < 0.90.$$

24. The photographing optical system of claim 14, further comprising an aperture stop, wherein the axial distance between the object-side surface of the first lens element and the image-side surface of the sixth lens element is TD, the central thickness of the second lens element is CT2, the central thickness of the fourth lens element is CT4, the curvature radius of the image-side surface of the fourth lens element is R8, and the curvature radius of the object-side surface of the fifth lens element is R9; and with a wavelength of helium d-line as a reference wavelength for the photographing optical system, the focal length of the photographing optical system is fd, the focal length of the third lens element is f3d, the focal length of the fifth lens element is f5d, and an axial distance between the aperture stop and an image surface is SLd, and the following conditions are satisfied:

$$3.35 \leq TD/fd \leq 4.04;$$

$$3.29 \leq SLd/fd \leq 3.89;$$

$$0.98 \leq CT4/CT2 \leq 3.78;$$

$$1.54 \leq |R8/R9| \leq 2.23; \text{ and}$$

$$1.24 \leq |f3d/f5d| \leq 4.25.$$

* * * * *